(12) United States Patent
Leon

(10) Patent No.: US 10,873,584 B2
(45) Date of Patent: Dec. 22, 2020

(54) SECURE NETWORK-ACCESSIBLE SYSTEM FOR EXECUTING REMOTE APPLICATIONS

(71) Applicant: ORock Technologies, Inc., Reston, VA (US)

(72) Inventor: John Leon, Glendale, CA (US)

(73) Assignee: ORock Technologies, Inc., Reston, VA (US)

( * ) Notice: Subject to any disclaimer, the term of this patent is extended or adjusted under 35 U.S.C. 154(b) by 0 days.

(21) Appl. No.: 16/002,738

(22) Filed: Jun. 7, 2018

(65) Prior Publication Data

US 2018/0359259 A1 Dec. 13, 2018

Related U.S. Application Data

(60) Provisional application No. 62/517,712, filed on Jun. 9, 2017.

(51) Int. Cl.
*G06F 21/62* (2013.01)
*H04L 29/06* (2006.01)
*G06F 9/445* (2018.01)
*H04W 4/70* (2018.01)

(52) U.S. Cl.
CPC .......... *H04L 63/102* (2013.01); *G06F 9/445* (2013.01); *G06F 21/6218* (2013.01); *H04L 63/0428* (2013.01); *H04L 63/062* (2013.01); *H04L 63/1416* (2013.01); *H04W 4/70* (2018.02)

(58) Field of Classification Search
CPC .... H04L 63/10; H04L 63/102; G06F 21/6218
See application file for complete search history.

(56) References Cited

U.S. PATENT DOCUMENTS

| 9,355,248 B1 | 5/2016 | Wiest et al. |
| 9,864,874 B1 | 1/2018 | Shanbhag et al. |
| 2008/0198270 A1* | 8/2008 | Hobbs .................... H04N 19/44 348/708 |
| 2008/0247544 A1 | 10/2008 | Candelore et al. |
| 2011/0247045 A1* | 10/2011 | Rajagopal ............... H04L 63/08 726/1 |

(Continued)

OTHER PUBLICATIONS

International Search Report and Written Opinion for International Application No. PCT/US2018/036205, Notification dated Aug. 8, 2018.

*Primary Examiner* — David J Pearson
(74) *Attorney, Agent, or Firm* — Knobbe, Martens, Olson & Bear, LLP

(57) ABSTRACT

A plurality of system nodes coupled via a dedicated private network is described herein. The nodes offer an end-to-end solution for protecting against network-based attacks. The nodes can also execute applications locally at the request of a user device such that a user operating the user device can use the applications executed locally on the nodes as if the applications were executing locally on the user device. To protect user data, the nodes may not transmit any user data to the user device. Rather, a node can generate a graphical representation of the environment in which the applications are executed, and transmit the graphical representation to the user device. As the user performs actions that result in a change of a graphical view of the environment in which the applications are executed, the node can generate and transmit new graphical representations of the environment to the user device.

18 Claims, 34 Drawing Sheets

(56) References Cited

U.S. PATENT DOCUMENTS

| | | | |
|---|---|---|---|
| 2011/0265164 A1* | 10/2011 | Lucovsky | G06F 9/45533 |
| | | | 726/7 |
| 2013/0246513 A1* | 9/2013 | Zaveri | G06F 3/067 |
| | | | 709/203 |
| 2014/0122875 A1* | 5/2014 | Pizi | G06F 21/6209 |
| | | | 713/164 |
| 2015/0058923 A1 | 2/2015 | Rajagopal et al. | |
| 2015/0215312 A1 | 7/2015 | Cesnik | |
| 2015/0244703 A1 | 8/2015 | Lee | |
| 2016/0330138 A1* | 11/2016 | Thomason | H04L 67/10 |
| 2016/0359981 A1* | 12/2016 | Ulatoski | H04L 63/08 |
| 2017/0147825 A1 | 5/2017 | Barton et al. | |
| 2017/0193611 A1* | 7/2017 | Vassilev | G06Q 50/01 |
| 2017/0220368 A1* | 8/2017 | Tse | G06F 9/45558 |
| 2017/0353496 A1* | 12/2017 | Pai | G06F 21/53 |

* cited by examiner

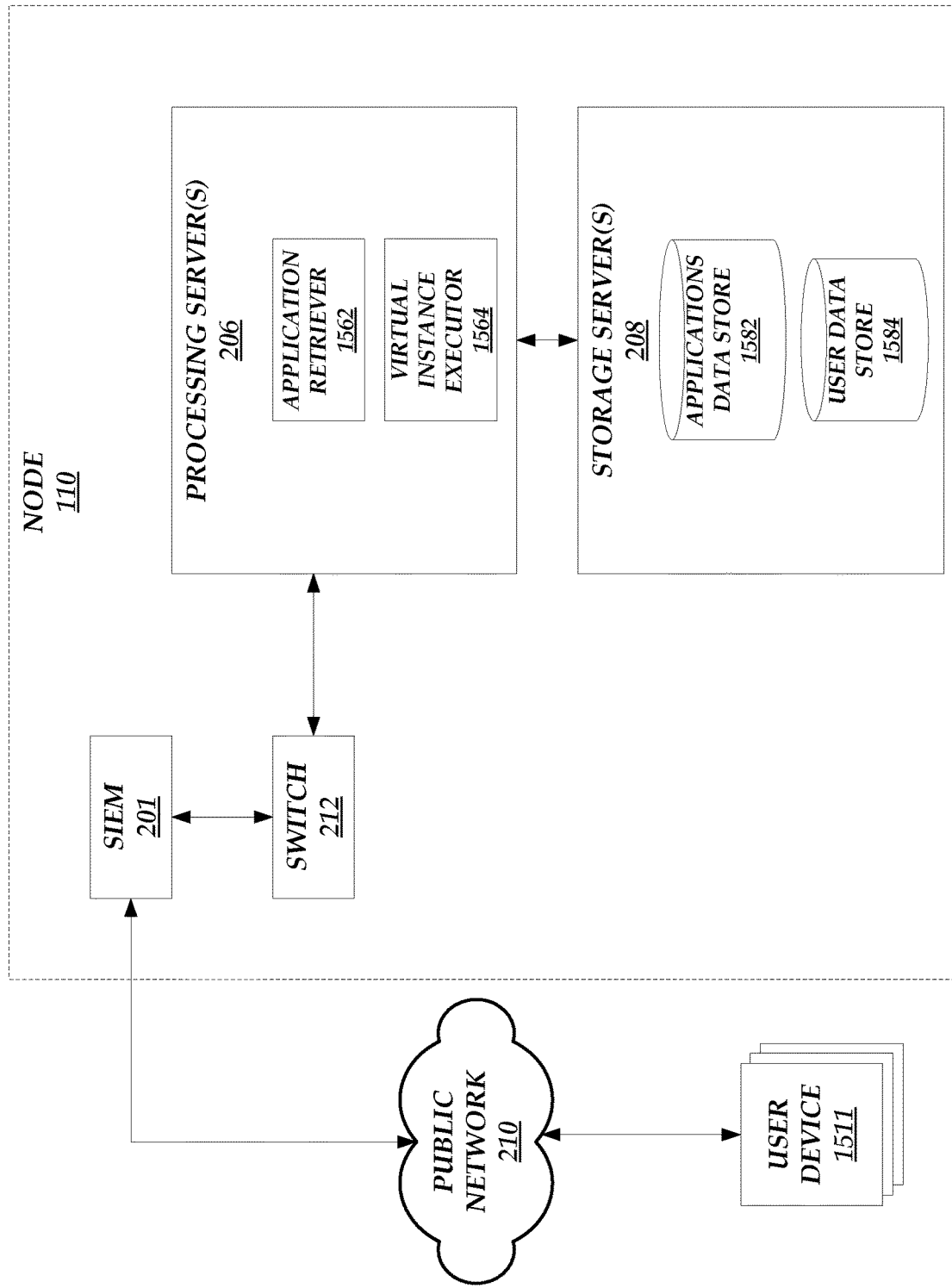

SECURE NETWORK-ACCESSIBLE SYSTEM FOR EXECUTING REMOTE APPLICATIONS

CROSS-REFERENCE TO RELATED APPLICATIONS

This application claims priority under 35 U.S.C. § 119(e) to U.S. Provisional Patent Application No. 62/517,712, entitled "SYSTEM FOR PROVIDING END-TO-END PROTECTION AGAINST NETWORK-BASED ATTACKS" and filed on Jun. 9, 2017, the entire disclosure of which is hereby incorporated by reference herein.

BACKGROUND

Many electronic devices operated by users have access to or can be accessed via a network. For example, a user can use one electronic device (e.g., a computer) to access another electronic device (e.g., a set-top box) via a network. Typically, usernames and passwords are used to restrict access to network-accessible electronic devices. For example, the data associated with an electronic device may only be accessed if a user provides the correct username and password.

However, usernames and passwords offer little protection against network-based attacks. Users often select simple or common passwords that are easily deciphered by an unauthorized user. Once deciphered, the unauthorized user may have access to sensitive data and can cause physical, emotional, and/or monetary harm.

SUMMARY

One aspect of the disclosure provides a system for executing remote applications. The system comprises an applications data store; and a processor in communication with the applications data store and configured with computer-executable instructions. The computer-executable instructions, when executed, cause the processor to: process a request to access a first application received from a local application running on a user device via a network; retrieve first source files for the first application from the applications data store; initialize a virtual instance; cause the virtual instance to load the first application using the first source files; generate a graphical representation of the virtual instance; and transmit the graphical representation of the virtual instance to the user device, wherein reception of the graphical representation of the virtual instance causes the local application to display the graphical representation of the virtual instance such that the first application appears to be available locally on the user device.

The system of the preceding paragraph can include any sub-combination of the following features: where the virtual instance comprises one of a first container or a virtual machine instance in which a second container is initialized; where the computer-executable instructions, when executed, further cause the processor to: process an instruction to open the first application received from the local application, cause the virtual instance to open the first application, generate a second graphical representation of the virtual instance, and transmit the second graphical representation of the virtual instance, wherein reception of the second graphical representation of the virtual instance causes the local application to display the second graphical representation of the virtual instance in place of the graphical representation of the virtual instance; where the virtual instance comprises a container, and wherein the computer-executable instructions, when executed, further cause the processor to: determine that a connection with the user device is terminated, and store at least one of a container image or a top container layer corresponding to the container in a user data store in response to the determination that the connection with the user device is terminated to preserve an access state of a user operating the user device; where the computer-executable instructions, when executed, further cause the processor to: determine that the connection with the user device is established, retrieve at least one of the container image or the top container layer from the user data store, initialize the virtual instance using at least one of the container image or the top container layer such that the virtual instance is initialized with the access state of the user, generate a third graphical representation of the virtual instance, and transmit the third graphical representation of the virtual instance to the user device, wherein reception of the third graphical representation of the virtual instance causes the local application to display the third graphical representation of the virtual instance; where reception of the second graphical representation of the virtual instance further causes the local application to delete the graphical representation of the virtual instance; where the computer-executable instructions, when executed, further cause the processor to determine that the user device is authorized to access the first application; where the computer-executable instructions, when executed, further cause the processor to: encrypt the graphical representation of the virtual instance, and transmit the encrypted graphical representation of the virtual instance to the user device; and where the computer-executable instructions, when executed, further cause the processor to cause the virtual instance to load the first application at an access level associated with the user device.

Another aspect of the disclosure provides a computer-implemented method for executing remote applications. The computer-implemented method comprises: as performed by a computing system comprising a processor and accessible via a network, receiving, from a local application running on a user device via the network, a request to access a first application; retrieving first source files for the first application; initializing a virtual instance; causing the virtual instance to load the first application using the first source files; generating a graphical representation of the virtual instance; and transmitting the graphical representation of the virtual instance to the user device, wherein reception of the graphical representation of the virtual instance causes the local application to display the graphical representation of the virtual instance such that the first application appears to be available locally on the user device.

The computer-implemented method of the preceding paragraph can include any sub-combination of the following features: where the virtual instance comprises one of a first container or a virtual machine instance in which a second container is initialized; where the computer-implemented method further comprises: receiving, from the local application, an instruction to open the first application, causing the virtual instance to open the first application, generating a second graphical representation of the virtual instance, and transmitting the second graphical representation of the virtual instance, wherein reception of the second graphical representation of the virtual instance causes the local application to display the second graphical representation of the virtual instance in place of the graphical representation of the virtual instance; where the virtual instance comprises a container, and wherein the computer-implemented method further comprises: determining that a connection with the user device is terminated, and storing at least one of a container image or a top container layer corresponding to the container in a user data store in response to the determination that the connection with the user device is terminated to preserve an access state of a user operating the user device; where the computer-implemented method further comprises: determining that the connection with the user device is established, retrieving at least one of the container image or the top container layer from the user data store, initializing the virtual instance using at least one of the container image or the top container layer such that the virtual instance is initialized with the access state of the user, generating a third graphical representation of the virtual instance, and transmitting the third graphical representation of the virtual instance to the user device, wherein reception of the third graphical representation of the virtual instance causes the local application to display the third graphical representation of the virtual instance; where reception of the second graphical representation of the virtual instance further causes the local application to delete the graphical representation of the virtual instance; and where the computer-implemented method further comprises: encrypting the graphical representation of the virtual instance, and transmitting the encrypted graphical representation of the virtual instance to the user device.

Another aspect of the disclosure provides non-transitory, computer-readable storage media comprising computer-executable instructions for executing remote applications, wherein the computer-executable instructions, when executed by a computer system accessible via a network, cause the computer system to perform operations comprising: processing a request to access a first application received from the user device via the network; retrieving first source files for the first application; initializing a virtual instance; causing the virtual instance to load the first application using the first source files; generating a graphical representation of the virtual instance; and transmitting the graphical representation of the virtual instance to the user device, wherein reception of the graphical representation of the virtual instance causes the user device to display the graphical representation of the virtual instance; where the computer-executable instructions, when executed, further cause the computer system to perform operations comprising: processing an instruction to open the first application received from the user device, causing the virtual instance to open the first application, generating a second graphical representation of the virtual instance, and transmitting the second graphical representation of the virtual instance, wherein reception of the second graphical representation of the virtual instance causes the user device to display the second graphical representation of the virtual instance in place of the graphical representation of the virtual instance; where the virtual instance comprises a container, and wherein the computer-executable instructions, when executed, further cause the computer system to perform operations comprising: determining that a connection with the user device is terminated, and storing at least one of a container image or a top container layer corresponding to the container in a user data store in response to the determination that the connection with the user device is terminated to preserve an access state of a user operating the user device; and where the computer-executable instructions, when executed, further cause the computer system to perform operations comprising: determining that the connection with the user device is established, retrieving at least one of the container image or the top container layer from the user data store, initializing the virtual instance using at least one of the container image or the top container layer such that the virtual instance is initialized with the access state of the user, generating a third graphical representation of the virtual instance, and transmitting the third graphical representation of the virtual instance to the user device, wherein reception of the third graphical representation of the virtual instance causes the local application to display the third graphical representation of the virtual instance.

Another aspect of the disclosure provides a system for measuring and transmitting data. The system comprises: an edge router in a network, wherein the edge router is configured to provide an interface between a computing system that stores data and devices that access the computing system via the network; and a computing device comprising a processor and memory. The computing devices is configured with computer-executable instructions that, when executed, cause the computing device to: process an instruction received from the edge router to store temporarily measured data during a network disruption; measure first data; determine, at a first time, that a connection to the network is unavailable; store the first data in the memory in accordance with the instruction received from the edge router; determine, at a second time after the first time, that the connection to the network is established; transmit the first data to the edge router; and delete the first data from the memory.

The system of the preceding paragraph can include any sub-combination of the following features: where the computer-executable instructions, when executed, further cause the computing device to: measure second data, determine, at a third time, that the connection to the network is established, and transmit the second data to the edge router, wherein the computing device does not temporarily store the second data in the memory prior to the transmission of the second data; where the computing device comprises an Internet of Things (IoT) device located remote from the computing system; where the edge router transmits the first data to the computing system; and where the instruction comprises a software-defined network policy.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 15 illustrates a block diagram of an environment for accessing applications operating within the multi-node environment of FIG. 1.

DETAILED DESCRIPTION OF SPECIFIC EMBODIMENTS

Introduction

As discussed above, usernames and passwords provide little protection against network-based attacks. Conventional data network systems offer solutions to secure electronic devices and/or the channel by which electronic devices communicate over a network from unwanted intrusions, but such solutions leave gaps that can be exploited by unauthorized users. Thus, a system that offers end-to-end protection against network-based attacks may be desirable. This may be especially true given the proliferation of network-accessible data storage systems, where valuable information is stored and accessed via a network, and/or network-accessible electronic devices.

Accordingly, a multi-node environment is described herein in which a plurality of nodes coupled via a dedicated private network offer an end-to-end solution for protecting against network-based attacks. For example, a single node can receive and store user data via a data flow that passes through various components of the node. The node can be designed such that communications internal to the node, such as the transmission of encryption keys, are partitioned or walled off from the components of the node that handle the publicly accessible data flow. The node also includes a key management subsystem to facilitate the use of encryption keys to encrypt user data.

Multi-Node Architecture Overview

Figure 1:
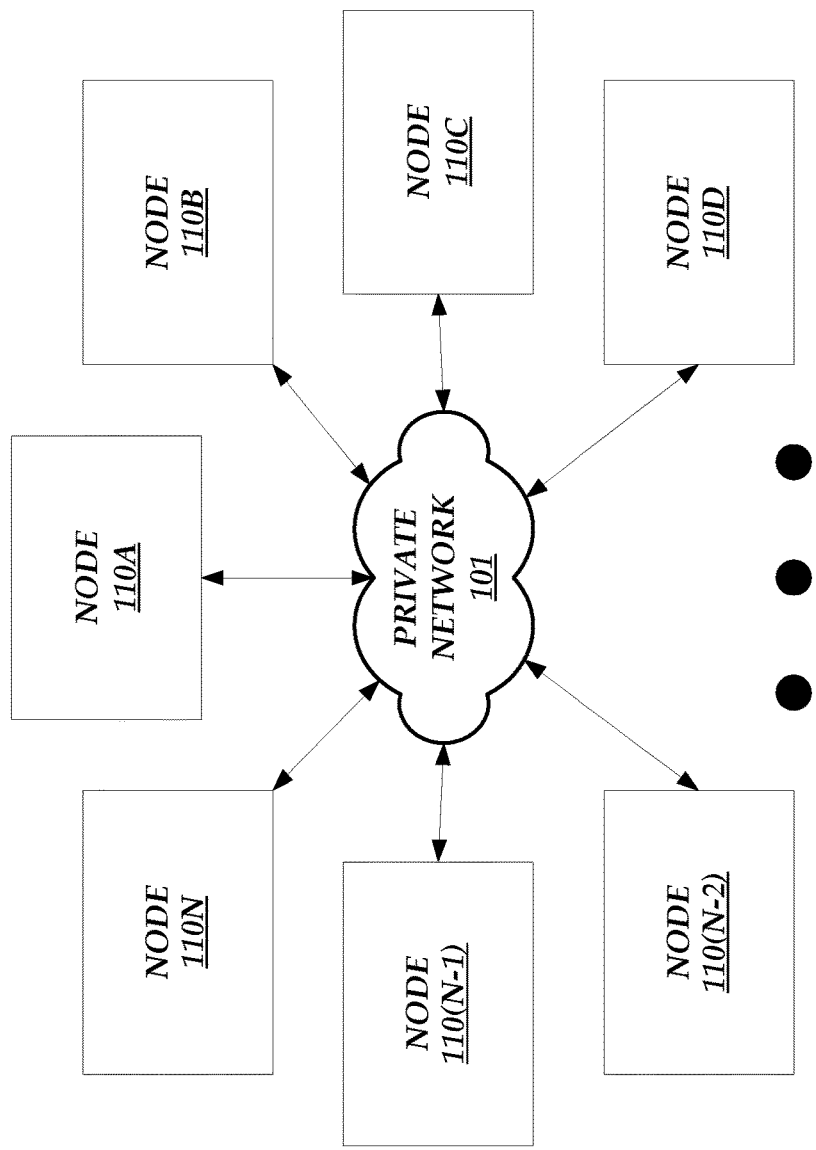
FIG. 1 illustrates a multi-node environment.

FIG. 1 illustrates a multi-node environment. As shown in FIG. 1, the multi-node environment includes a plurality of nodes 110A-N that communicate with each other via a dedicated private network 101. Each node 110A-N can be a system that includes a variety of electronic devices and/or components, as described in greater detail below with respect to FIGS. 2A-6. The nodes 110A-N can be configured to control user devices, detect inconsistencies in the operation of one or more user devices, store user data, and/or protect stored user data from network-based attacks.

The private network 101 can be a privately accessible network of linked networks, possibly operated by various distinct parties, such as a personal area network, local area network, wide area network, cable network, satellite network, cellular telephone network, etc. or combination thereof, each with access to and/or from the Internet. The private network 101 can provide superior network performance through dedicated bandwidth and low latency as compared to other publicly available networks, such as the Internet. For example, the private network 101 can provide a direct connection between the various nodes 110A-N in the multi-node environment, where the communication channel providing the direct connection cannot be accessed by electronic devices that are configured to access a publicly available network. Because access to the private network 101 is restricted to just the nodes 110A-N, the risk of a network-based intrusion of the nodes 110A-N or the data transmitted between the nodes 110A-N is greatly diminished.

In some embodiments, as discussed below, the nodes 110A-N also have access to publicly accessible networks, such as the Internet. Each node 110A-N can include an access server and/or router that enforces a separation between the publicly accessible network and the private network 101.

Each node 110A-N can be located in a different geographic location. For example, the node 110A can be located in a first country (e.g., the United States of America), the node 110B can be located in a second country (e.g., the United Kingdom), and so on. Alternatively, each node 110A-N may reside at a common geographic location.

In an embodiment, each node 110A-N is identical in composition and operation. The nodes 110A-N can operate in real-time to replicate data between or among the various nodes 110A-N to ensure that the sum of aggregate data is present in both or all node 110A-N locations. This redundancy not only improves the reliability of the multi-node environment, but also enhances the threat-detecting capability of the nodes 110A-N. For example, the nodes 110A-N may independently identify Internet Protocol (IP) addresses from which one or more attacks on the respective node 110A-N (e.g., to disable or impair the functionality of the respective node 110A-N) or attempted intrusions into the respective node 110A-N have originated. A node, such as the node 110A, may transmit a routing table that includes the IP addresses that the node 110A has identified as a threat to one or more of the other nodes 110B-N so that the other nodes 110B-N can update their routing tables accordingly. Thus, by sharing routing tables between nodes 110A-N, an address identified as a threat at one node can be blocked by the other nodes in the environment.

The similarity in architecture between various nodes 110A-N may enable any node 110A-N to serve as the secondary storage and/or processing site for any other node 110A-N. Thus, a multi-node environment that includes identically constructed nodes 110A-N may have a built-in secondary storage site to permit the storage and/or recovery of information. In other words, the nodes 110A-N may be redundant. The actual pairing of primary and secondary storage sites may be determined by taking into account a variety of factors, such as regional legal requirements, latency, and/or the like. The secondary storage site can have information security safeguards equivalent to or nearly equivalent to those of the primary site and can maintain connectivity to the primary site. Such a multi-node environment may also include an inherent secondary processing site to permit the resumption of system operations when primary processing capabilities become unavailable. The secondary processing site can have information security safeguards equivalent to or nearly equivalent to those of the primary site. The redundancy of the nodes 110A-N is described in greater detail below with respect to FIGS. 2A-B and 6.

In other embodiments, the nodes 110A-N are not identical in composition and/or operation. For example, the nodes 110A-N may include additional components required by the jurisdiction in which the respective node 110A-N resides to comply with one or more security standards (or may not include components that cannot be included in the respective node 110A-N in order to comply with one or more security standards).

Node Composition

Figure 2A:
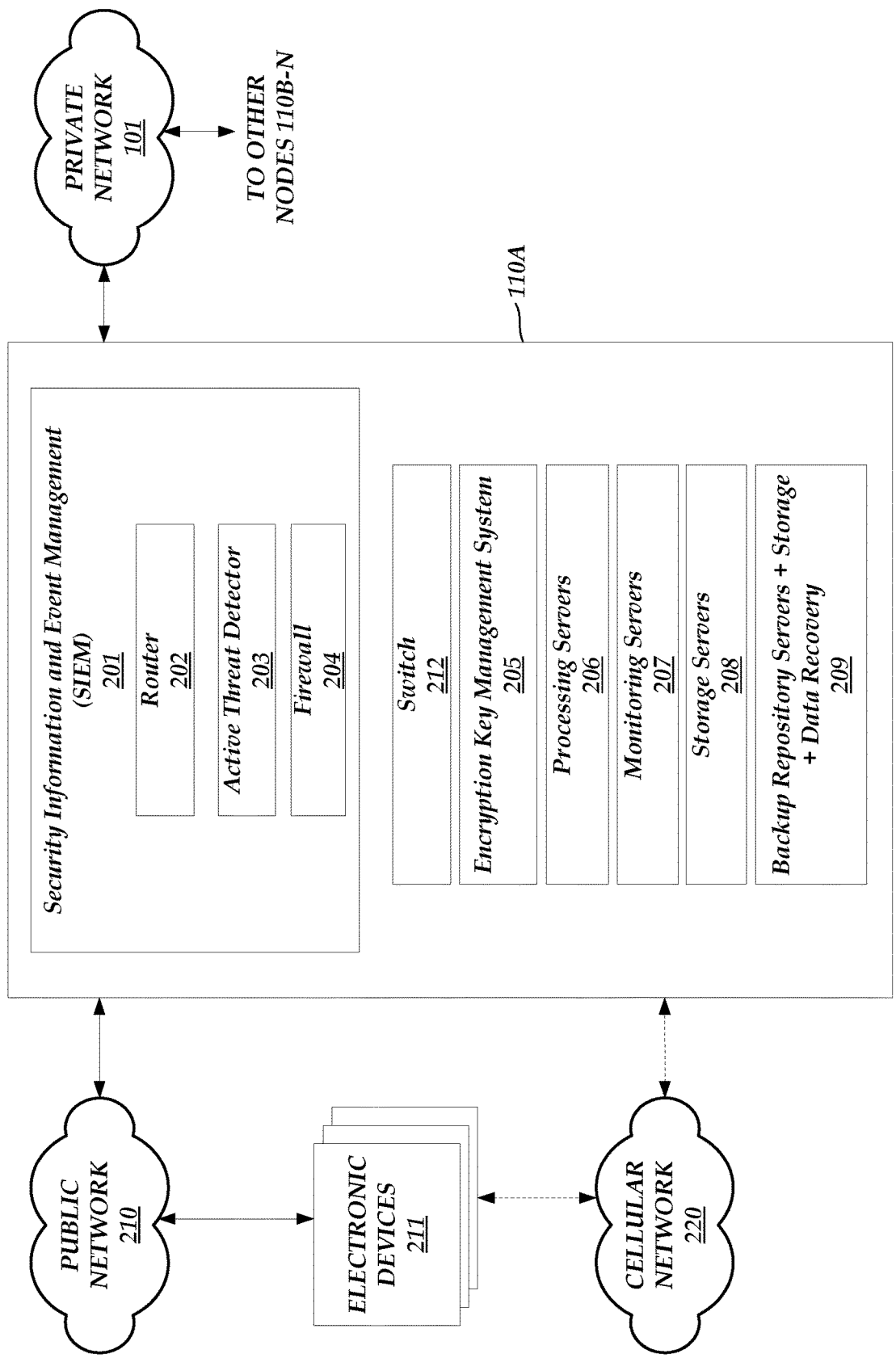
FIG. 2A-2B illustrate the components of an exemplary node in the multi-node environment of FIG. 1.
Figure 2B:
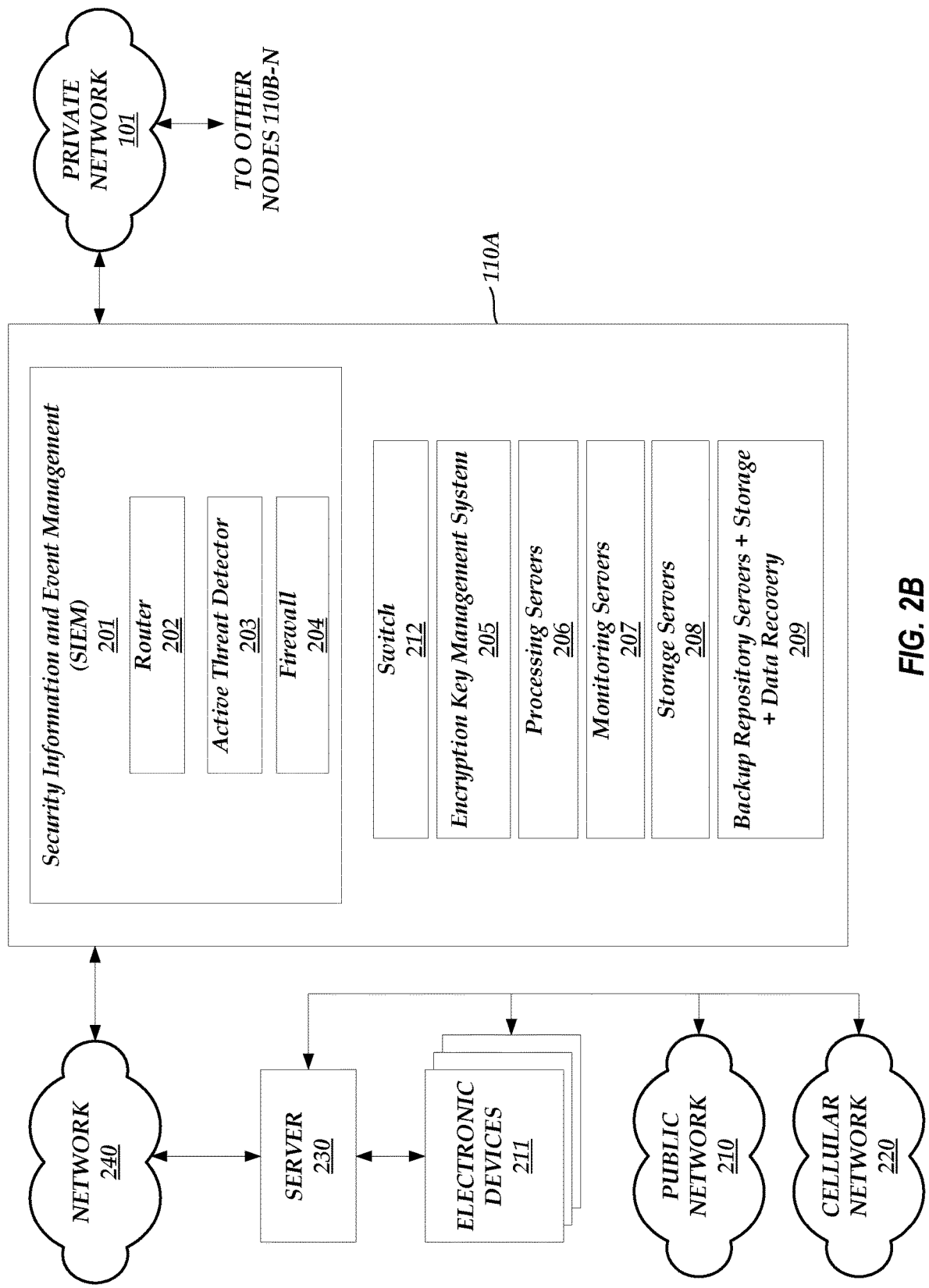

FIGS. 2A-2B illustrate the components of an exemplary node 110A in the multi-node environment of FIG. 1. Any of a variety of alternate node architectures may alternatively be used for some or all of the nodes 110A-N. Alternatively or in addition, the architecture of the node 110A can be similar to the architecture of the nodes 110B-N and/or the operations performed by the node 110A can also be performed by the nodes 110B-N. As shown in FIGS. 2A-B, the node 110A can include a security information and event management (SIEM) system 201, a switch 212 (e.g., a CISCO CATALYST 3650 Series switch, a CISCO CATALYST 4500 Series switch, etc.), an encryption key management system 205 (e.g., two HP Enterprise Secure Key Managers), one or more processing servers 206 (e.g., ten HP DL380 servers), one or more monitoring servers 207 (e.g., two HP DL380 servers), one or more storage servers 208 (e.g., an HP 3PAR STORESERV system), and one or more backup repository servers 209 (e.g., an HP 3PAR STORESERV system). The SIEM system 201 can include a router 202 (e.g., a CISCO ASR Boundary Device), an active threat detector 203 (e.g., a RAYTHEON SUREVIEW Threat Detector), and a firewall 204 (e.g., a FORTINET firewall, a PALO ALTO NETWORKS 5000 Series firewall, etc.). Some or all of the components of the node 110A can reside at a common geographic location and may be interconnected on a local area network.

The SIEM system 201 may provide boundary security. Within the SIEM system 201, individual intrusion detection tools can be integrated into a system-wide intrusion detection sub-system. The router 202 can interface with the external world and transfer data between the node 110A and the external world. For example, the router 202 can transfer data between the node 110A and other nodes 110B-110N via the private network 101. As illustrated in FIG. 2A, the router 202 can also transfer data between the node 110A and electronic devices 211 via a public network 210 (e.g., a publicly accessible network of linked networks, such as the Internet) and/or a cellular network 220 (e.g., a private network operated by a cellular carrier or operator). Alternatively or in addition, as illustrated in FIG. 2B, the router 202 can transfer data between the node 110A and a server 230 via a network 240 (e.g., a public and/or private network similar to the public network 210, the cellular network 220, and/or the private network 101). The server 230 can be a computing system that manages one or more of the electronic devices 211 and that communicates with the electronic devices 211 via the public network 210 and/or the cellular network 220. Alternatively or in addition, the server 230 can communicate with the electronic devices 211 via a private network, such as a local area network (not shown). The node 110A can communicate with electronic devices 211 via the server 230. Here, because the node 110A communicates with the server 230 via the network 240 (which can be a private network) and the communication channel is encrypted and secure due to the security techniques implemented by the node 110A, any unauthorized users would not detect and cannot interfere with instructions transmitted by the node 110A to the server 230. In the situation that the network 240 is a private network, unauthorized users would not even have the ability to access the network 240. Thus, the node 110A can communicate securely with the server 230 without the unauthorized user having the ability to reject, prevent, and/or manipulate the communication.

The active threat detector 203 can monitor network activities and/or detect abnormal events and/or abnormal patterns of activities. The active threat detector 203 may receive third party threat data from external sources (e.g., via the public network 210) to enhance the monitoring and detection functionality. For example, the active threat detector 203 may periodically receive updated lists or ranges of Internet Protocol (IP) addresses that have been identified as suspicious or from which malicious activity has originated (e.g., by malware analysis software). The lists may be in the form of a routing table (e.g., an internal address resolution protocol (ARP) routing table) that the active threat detector 203 can use to compare with the source and/or destination address of incoming packets. The active threat detector 203 can be automatically updated each time the third party threat data is received from external sources. Alternatively, the active threat detector 203 can be updated once the received third party threat data is approved for use by an administrator. In an embodiment, the nodes 110A-N can share such received third party threat data via the private network 101. Thus, if access to the external sources is severed for one node 110A-N, that node 110A-N can receive the third party threat data from another node 110A-N instead.

The firewall 204 can control network activities and/or work in tandem with real-time threat detection performed by the active threat detector 203. Like with the active threat detector 203, the firewall 204 can also receive third party threat data from external sources (e.g., via the public network 210) to enhance the control of network activities. The third party threat data may be received from the same external sources as the active threat detector 203 or from different external sources. The third party threat data may be in the form of routing tables and/or lists or ranges of suspicious or malicious IP addresses and may be used in the same manner as the active threat detector 203 as described above. The third party threat data can also be shared between the nodes 110A-N via the private network 101. The threat detection activities of the active threat detector 203 and/or the firewall 204 are described in greater detail below with respect to FIG. 8.

In an embodiment, the SIEM system 201 components 202-204 correlate information to provide a more robust security scheme. For example, the SIEM system 201 uses information generated by the router 202, the active threat detector 203, and/or the firewall 204 to protect data from unauthorized access, modification, and/or deletion. If one of the active threat detector 203 or the firewall 204 identifies malicious activity that originates from an IP address that otherwise was not identified in the data received from the external sources, the active threat detector 203 and/or the firewall 204 flags the IP address as a malicious address. The active threat detector 203 and/or the firewall 204 may then notify the other nodes 110A-N (via the router 202) of this newly identified IP address so that the other nodes 110A-N can be prepared to block and/or analyze a packet that originates from or is destined for the newly identified IP address. In this way, if one node 110A identifies a threat, the other nodes 110B-N can be automatically updated to recognize and prepare for the same threat.

Thus, the SIEM system 201 can support both external threat detection (e.g., using third party threat data) and internal threat detection (e.g., threats identified by a node 110A-N). Both the third party threat data and the threat data identified by a single node 110A-N can be shared with the other nodes 110A-N via the private network 101 (e.g., as routing tables or updates to routing tables) such that the routers 202, the active threat detectors 203, and/or the firewalls 204 of each of the nodes 110A-N are configured with the same, updated threat information.

The SIEM system 201 can support a dedicated connection within the multi-node environment to maintain a separate network within the multi-node environment (e.g., as represented by the private network 101). The separate network (e.g., the private network 101) can be dedicated to a single user or entity to implement the particular technical requirements desired by the user or entity. In an embodiment, the SIEM system 201 uses Border Gateway Protocol (BGP) to switch and/or route traffic across the private network 101, the public network 210, and/or other private or public networks not shown (e.g., dedicated network connections, such as tunneled connections, to an enterprise network).

The one or more processing servers 206 can execute applications, virtual machines, and/or the like that are requested by users attempting to access the node 110A. The one or more processing servers 206 can also perform analytics on user data. For example, the one or more processing servers 206 can track historical data, scheduling data, and/or the like and provide statistical information derived from such data. The one or more processing servers 206 can derive this information in real-time (e.g., as the data is received and processed by the node 110A) or on-demand (e.g., when requested by a user) to allow a user to review events that have already occurred. Alternatively, another server (not shown) within the node 110A can track historical data, scheduling data, and/or the like and provide statistical information derived from such data.

The one or more monitoring servers 207 can be configured to monitor the one or more processing servers 206 to ensure that the applications executed by the one or more processing servers 206 are running properly. The one or more monitoring servers 207 can start, restart, stop, and/or pause any applications executed by the one or more processing servers 206 for diagnostic purposes. The one or more monitoring servers 207 may also control and monitor the power, cooling, and/or other environmental elements of the node 110A. The one or more monitoring servers 207 may also perform authentication monitoring to ensure that users are only provided access to the node 110A after being successfully authenticated (e.g., the one or more monitoring servers 207 can include or act as a lightweight directory access protocol (LDAP) server).

The one or more storage servers 208 can include one or more self-encrypting drives (SEDs) that are each non-transitory storage mediums (e.g., magnetic disk drives, solid state memory drives, etc.) configured to encrypt and store received data using encryption keys provided by another component (e.g., the encryption key management system 205 in this case).

In some embodiments, the one or more backup repository servers 209 are configured to store data backups and to perform disaster recovery (e.g., data recovery) operations. In other embodiments, the one or more backup repository servers 209 are only configured to store data backups. The one or more backup repository servers 209 can store backups of data associated with the SIEM system 201, the switch 212, the encryption key management system 205, the one or more processing servers 206, the one or more monitoring servers 207, and/or the one or more storage servers 208.

In an embodiment, the one or more backup repository servers 209 of one node, such as node 110A, stores data backups of data associated with another node, such as node 110B. Likewise, the one or more backup repository servers 209 of the node 110B stores data backups of data associated with the node 110A. Thus, the data backup stored in one node is a mirror of the data of another node (and allows the node with the stored data backup to act as a redundant node). A circuit, such as a virtual circuit (not shown) can monitor the status of each of the nodes 110A-N. If a first node becomes inactive, the circuit notifies a second node that stores the data backup of the inactive first node and the second node temporarily operates as the first node (and the second node). Thus, if the node 110A becomes inactive, the one or more backup repository servers 209 of the node 110B operate as the node 110A, providing the functionality that the node 110A normally would provide.

While the backup node operates as the inactive node, the backup node may store data, change settings, and/or make other changes that have not been introduced in the inactive node. Before the inactive node becomes fully active and starts operating as normal, the backup node and the inactive node may be synced. For example, once the inactive node becomes active again, the circuit notifies the backup node, the backup node updates the inactive node to include any changes that occurred since the inactive node became inactive, and the inactive node begins operating under normal conditions again. Thus, if the node 110A becomes active again, the one or more backup repository servers 209 of the node 110B updates any or all components of the node 110A such that the node 110A and the data in the one or more backup repository servers 209 associated with the node 110A are synched, and the node 110A then begins normal operations (and the one or more backup repository servers 209 of the node 110B cease operating as the node 110A and merely provide backup services as before).

In alternate embodiments, the one or more backup repository servers 209 of a node store data backups of data associated with that same node. If the node becomes inactive, the one or more backup repository servers 209 of the node may operate as described above to provide services until the node becomes active again.

In an embodiment, a node, such as the node 110A, includes components to separate user functionality (including user interface services) from system management functionality. For example, a multi-node environment may utilize sub-networks for publicly accessible system components and logically separate those components from system-internal networks and/or functions. A node can also include components to prevent unauthorized and/or unintended information from being transferred through shared multi-node environment resources. A node can include components to partition stored information into various components residing in separate physical domains or environments. In some embodiments, in addition to the physical separation of stored information, the multi-node environment maintains a separate execution domain for each executing process running in the nodes 110A-N of the multi-node environment.

Each node 110A-N may be a single computing device or may include multiple distinct computing devices, such as computer servers, logically or physically grouped together to collectively operate as a system. The components of each node 110A-N can each be implemented in application-specific hardware (e.g., a server computing device with one or more ASICs) such that no software is necessary, or as a combination of hardware and software. In addition, the modules and components of each node 110A-N can be combined on one server computing device or separated individually or into groups on several server computing devices. In some embodiments, each node 110A-N may include additional or fewer components than illustrated in FIGS. 2A-2B.

In some embodiments, the features and services provided by each node 110A-N may be implemented as web services consumable via the public network 210 and/or the cellular network 220. In further embodiments, each node 110A-N is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Each electronic or user device 211 can be an Internet of Things (IoT) device. As used herein, an IoT device can be any electronic device that can collect and/or exchange data via a network and/or that can be sensed or controlled remotely via a network. For example, an IoT device can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, home automation devices (e.g., "smart thermostats" or "smart meters"), sensors (e.g., sensors that measure physical data like voltage, current, pressure, temperature, soil acidity, heart rate, blood pressure, etc.), transportation vehicles (e.g., automobiles, train cars, airplanes, helicopters, bicycles, motorcycles, ships, etc.), robots, digital signs, automated teller machines, set-top boxes, gaming consoles, entertainment systems, televisions with network access and program execution capabilities (e.g., "smart TVs"), and various other electronic devices and appliances. Individual IoT devices may execute a browser application to communicate via the public network 210 and/or the cellular network 220 with other computing systems, such as the node 110A or the other nodes 110B-110N, in order to transmit and/or receive data (e.g., settings or device parameter information) and/or in order to be sensed or controlled remotely. Alternatively, an electronic device 211 can be a device other than an IoT device (e.g., a device that does not collect or exchange data and/or that is not sensed or controlled remotely via a network, such as a non-network-enabled device).

As described herein, a user can access one or more nodes 110A-N via a user device (e.g., a computing device, like an electronic device 211 or a non-IoT device, that is or is not being monitored by the nodes 110A-N). For example, the nodes 110A-N may be located so that they are close (in either a geographical or networking sense) to groups of user devices. In such a configuration, a user device may be provided access to the node 110A-N to which it is closest and/or to the node 110A-N that shares a geographic region with the user device, rather than all user devices being provided access to a single node 110A-N. If the node 110A-N to which a user device is closest and/or to that shares a geographic region with the user device is offline (e.g., due to an outage, maintenance, etc.), then the user device may be provided access to the next closest node 110A-N, the node 110A-N assigned to be a backup of the offline node, and/or the like.

Figure 3A:
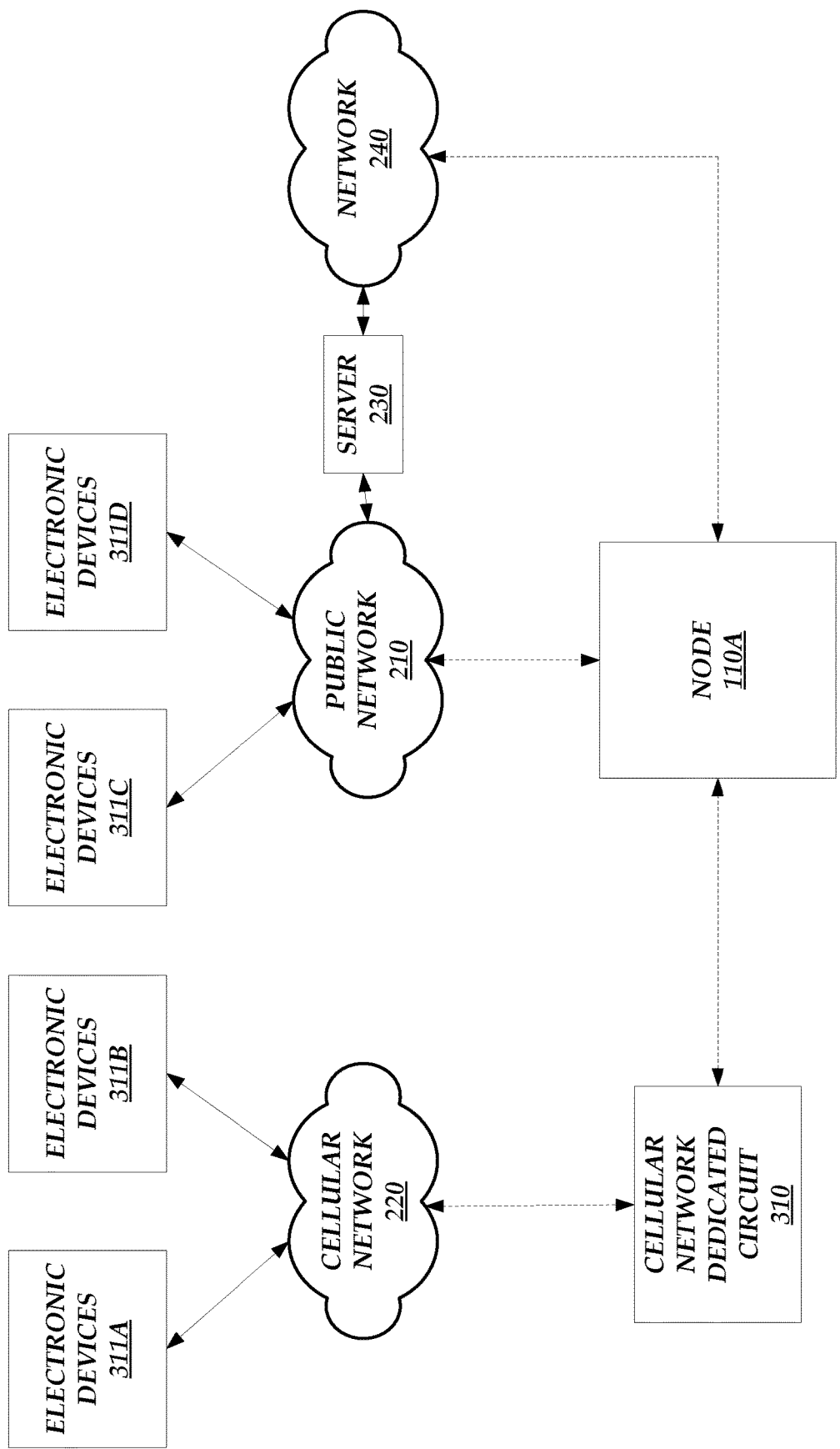
FIG. 3A illustrates an example data flow between electronic devices and a node of FIG. 1.

FIG. 3A illustrates an example data flow between IoT devices, such as electronic devices 311, and the node 110A. While FIG. 3A illustrates three different ways that the node 110A can communicate with various electronic devices 311, this is not meant to be limiting. The node 110A can communicate with electronic devices 311 using any combination of the different ways illustrated in FIG. 3A. For example, the node 110A can communicate with electronic devices 311A-B via a cellular network dedicated circuit 310 and the cellular network 220. The cellular network dedicated circuit 310 may provide an interface between the node 110A and the internal networking components of the cellular network 220. This example is described in greater detail below with respect to FIG. 3B. As another example, the node 110A can communicate with electronic devices 311C-D via the public network 210. This example is described in greater detail below with respect to FIG. 3C. As another example, the node 110A can communicate with the electronic devices 311C-D via the network 240 and the server 230.

Figure 3B:
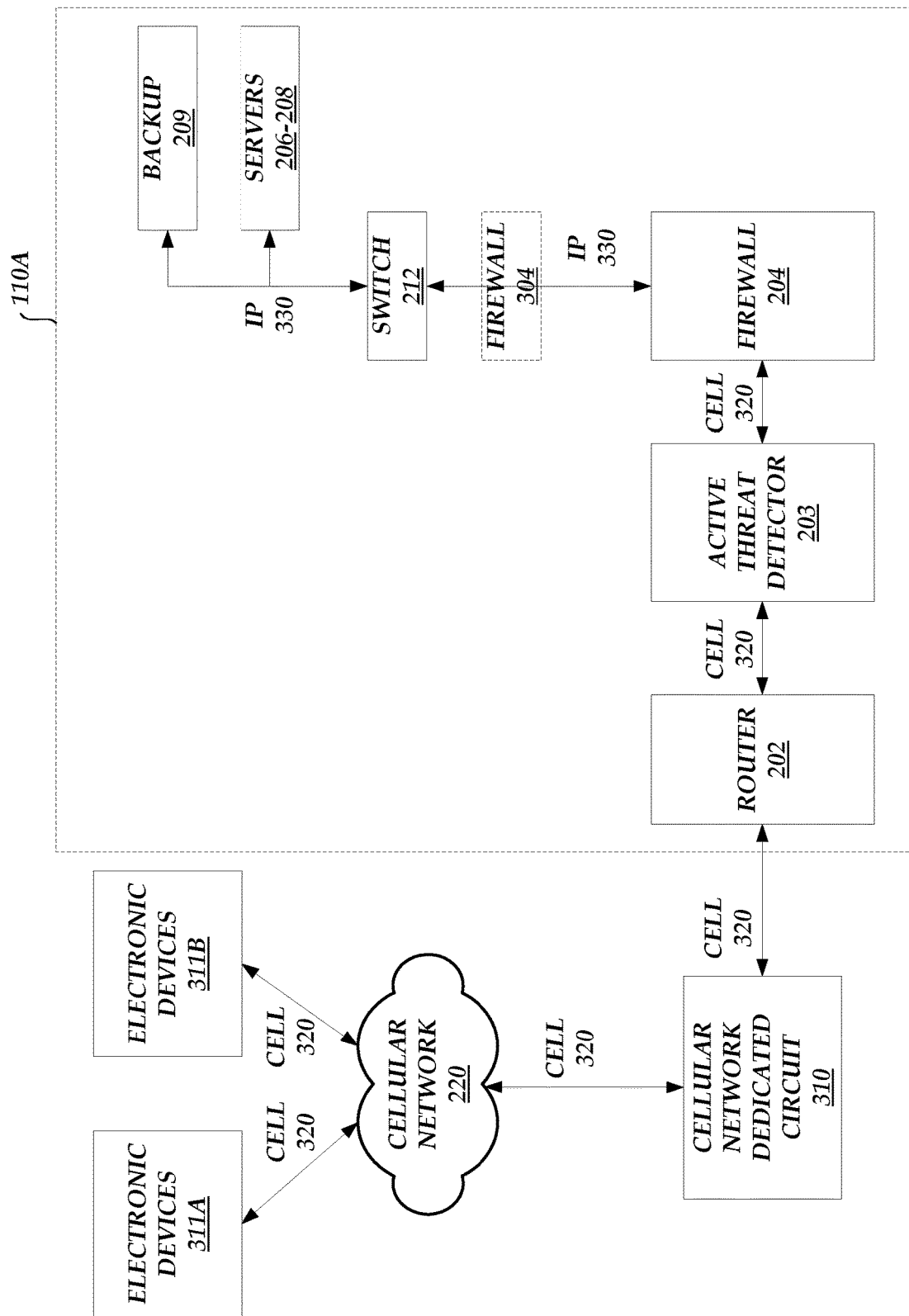
FIG. 3B illustrates an example data flow between electronic devices and the components in a node of FIG. 1 via a cellular network.

FIG. 3B illustrates an example data flow between IoT devices, such as the electronic devices 311A-B, and the components in node 110A via the cellular network 220. As illustrated in FIG. 3B, the router 202 can receive communications from and transmit communications to the cellular network dedicated circuit 310. The communications may be encapsulated according to a cellular carrier protocol 320. In an embodiment, the electronic devices 311A-B are capable of communicating via the cellular network 220. Thus, the data transmitted between the electronic devices 311A-B and the router 202 are encapsulated according to the cellular carrier protocol 320. In addition, the router 202 may route such data to the active threat detector 203 and the active threat detector 203 may route such data (e.g., after filtering none, some, or all of the data) to the firewall 204. The data transmitted between these components 202-204 may still be encapsulated according to the cellular carrier protocol 320.

In an embodiment, the firewall 204 converts the data from the cellular carrier protocol 320 to an Internet protocol (IP) 330 or another similar network-based protocol. The data may pass through another firewall 304 before reaching the switch 212. The switch 212 then routes the data encapsulated according to the IP 330 to one of the servers 206-208 or the one or more backup repository servers 209.

Likewise, data from the one or more backup repository servers 209 or one of the servers 206-208 can be transmitted to the switch 212 and can be encapsulated according to the IP 330. The switch 212 can forward the data to the firewall 204. The firewall 204 can then convert the data from the IP 330 to the cellular carrier protocol 320 and the re-encapsulated data can then be forwarded to the active threat detector 203, the router 202, and the cellular network dedicated circuit 310 before reaching the cellular network 220 and eventually one of the electronic devices 311A or 311B.

Figure 3C:
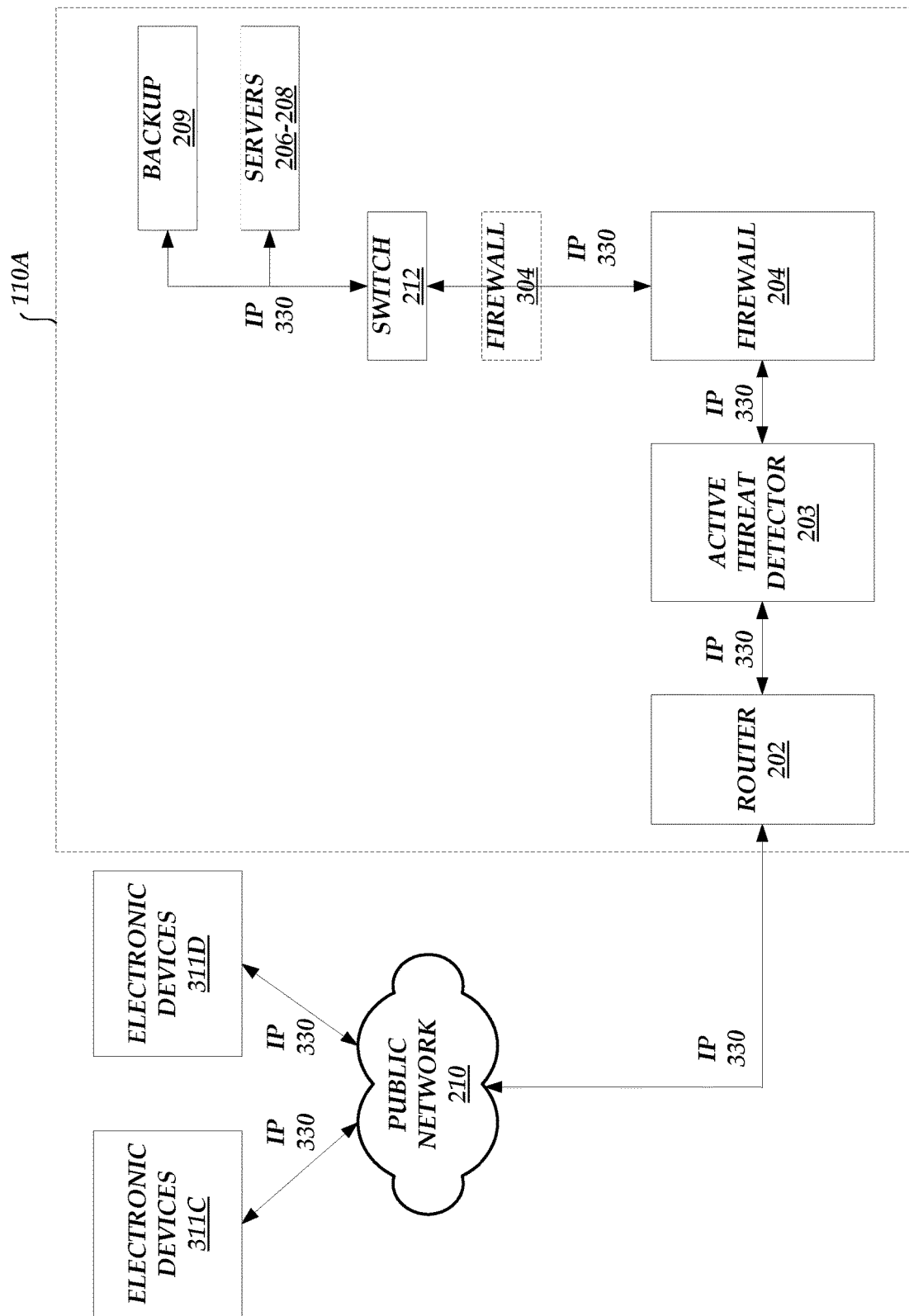
FIG. 3C illustrates an example data flow between electronic devices and the components in a node of FIG. 1 via a public network.

FIG. 3C illustrates an example data flow between IoT devices, such as the electronic devices 311C-D, and the components in the node 110A via the public network 210. Unlike the example illustrated in FIG. 3B, all data transmitted between the electronic devices 311C-D and one of the servers 206-208 or the one or more backup repository servers 209 are encapsulated according to the IP 330. While FIGS. 3B and 3C are illustrated as separate examples, this is not meant to be limiting. The node 110A can handle data encapsulated according to the IP 330 received from and transmitted to the public network 210, data encapsulated according to the cellular carrier protocol 320 received from and transmitted to the cellular network dedicated circuit 310, and/or data encapsulated according to any proprietary protocol received from and transmitted to the network 240.

End-to-End Protection

As described above, conventional data network systems may have gaps in their security schemes. Some conventional data network systems may allow data to be transmitted in an unsecured manner over a public network, such as the Internet, leaving open the possibility that the data can be captured, snooped, or otherwise accessed by an unauthorized user. Some conventional data network systems may store or transmit encryption keys together with encrypted data, allowing the encrypted data to be easily compromised. The multi-node environment described herein seeks to close such security gaps.

For example, a node, such as one of the nodes 110A-N, implements security protocols at an interface between the private network 101 and the public network 210 and the internal components of the respective node 110A-N (e.g., the SIEM system 201) to guard against external cyberattacks. Security solutions at the network interface work in tandem with system-internal controls to enforce information flow through secure connections and configurations. As an example, Secure Socket Layer (SSL) encryption can be used to secure data that is transmitted between electronic devices 211 and the node 110A via the public network 210. The node 110A can perform SSL decryption within a secure boundary (e.g., the SIEM system 201) in which the decrypted and/or clear-text data only exists for a finite duration of time. The node 110A can re-encrypt the decrypted data using encryption keys securely generated by the encryption key management system 205. The node 110A can employ a robust encryption algorithm, such as AES-256, to encrypt the data as the data is stored onto a storage drive, such as a storage drive included in the storage servers 208. In an alternative embodiment, a tunnel encryption, such as a Virtual Private Network (VPN) encryption, protects data transmission between electronic devices 211 and the node 110A. Communications that are entirely within the node 110A can also be encrypted.

In an embodiment, the SIEM system 201 is configured to perform threat detection, real-time response, automatic event logging, and/or post-event analysis. For example, the node 110A (e.g., the SIEM system 201) can detect some or all unauthorized access attempts and enforce appropriate security responses (e.g., disabling access after multiple access failures within a predetermined period of time). The node 110A (e.g., the SIEM system 201) can perform automatic logging of some or all security-related system events, including successful and/or unsuccessful account login events, account management events, object access, policy change, privilege functions, process tracking, and/or system events. The node 110A (e.g., the SIEM system 201) can also perform automatic logging of some or all security-related web-application events, including some or all administrator activity, authentication checks, authorization checks, data deletions, data access, data changes, permission changes, remote connections to the node 110A, and/or some or all unauthorized access attempts. An event monitor and analyzer within the node 110A (e.g., within the SIEM system 201) can perform post-event analysis and permit comprehensive security auditing and process management.

The operations performed by the SIEM system 201 at the network interface of the node 110A include monitoring and controlling communications sent and received via the various networks 101 and 210. Such operations performed by the SIEM system 201 may work in tandem with internal security techniques implemented by other components of the node 110A that monitor and control communications at key internal boundaries within the node 110A. The SIEM system 201 may implement a wireless intrusion detection system to identify rogue wireless devices and to detect attack attempts and potential compromises/breaches to the information system.

The node 110A can enforce encryption on some or all remote access connections, whether initiated by a user or a system administrator. Some or all data can be encrypted. Further, in some embodiments, the node 110A configures some or all secure connections to use managed entry points that employ boundary protection devices (e.g., SIEMs).

In an embodiment, the node 110A (e.g., the one or more monitoring servers 207) employs a multi-factor authentication scheme to prevent unauthorized access. For example, the multi-factor authentication can include a username and password, a secure code separately transmitted to a first user device associated with a user that is attempting to access the node 110A via a second user device, biometrics (e.g., a fingerprint, a vein map, a behavioral signature, such as physiological characteristics of a user that describe a way the user interacts with an input device (e.g., a keyboard, touch pad, mouse, etc.), etc.), and/or the like. Through authentication, the node 110A can uniquely identify and authenticate users and/or user processes with unique identifiers and enforce specific strength requirements on the identifiers. The node 110A can also require users to be authorized with the node 110A before assigning accounts. In an embodiment, the node 110A may, in an emergency or extraordinary situation, temporarily permit an individual to be authenticated with an authenticator with a reduced number of factors compared with normal operation. In some embodiments, multi-factor login verification data is encrypted for confidentiality.

Figure 4:
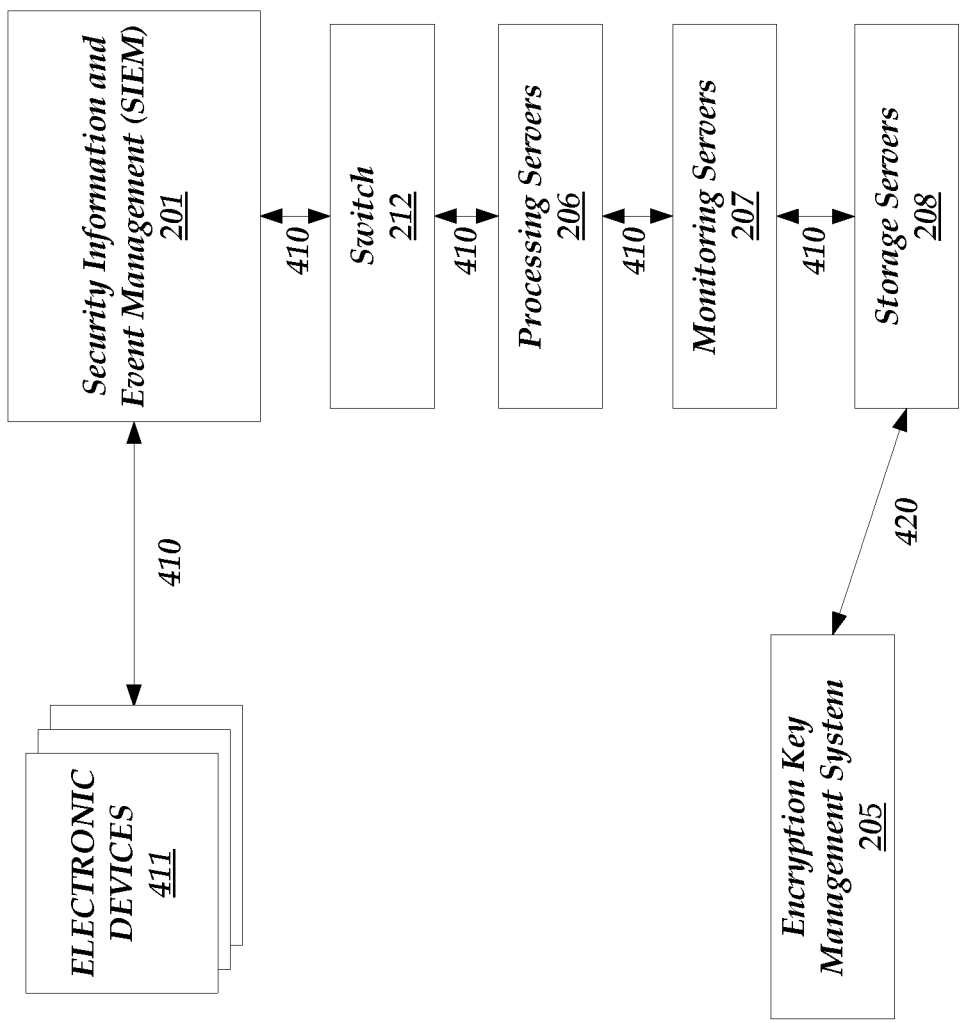
FIG. 4 illustrates an example data flow between an electronic device and the components in a node of FIG. 1.

As described herein, the node 110A can be designed such that communications internal to the node 110A are partitioned or walled off from publically accessible node 110A components. A multi-tier architecture of the node 110A (e.g., the components within the SIEM system 201) can segment contact between application-specific information (e.g., user data) and other system information (e.g., encryption keys). For example, FIG. 4 illustrates an example data flow between an electronic device 211 and the components in the node 110A. As illustrated in FIG. 4, a first data path 410 includes communications between the electronic device 211 and the SIEM system 201, between the SIEM system 201 and the switch 212, between the switch 212 and the one or more processing servers 206, between the one or more processing servers 206 and the one or more monitoring servers 207, and between the one or more monitoring servers 207 and the one or more storage servers 208. A second data path 420 includes communications (e.g., the transmission of encryption keys) between the encryption key management system 205 and the one or more storage servers 208. The first data path 410 and the second data path 420 do not overlap and/or do not share communication interfaces such that the information transmitted over one data path cannot be accessed by components in the other data path.

Encryption Key Management (EKM) System

Figure 5:
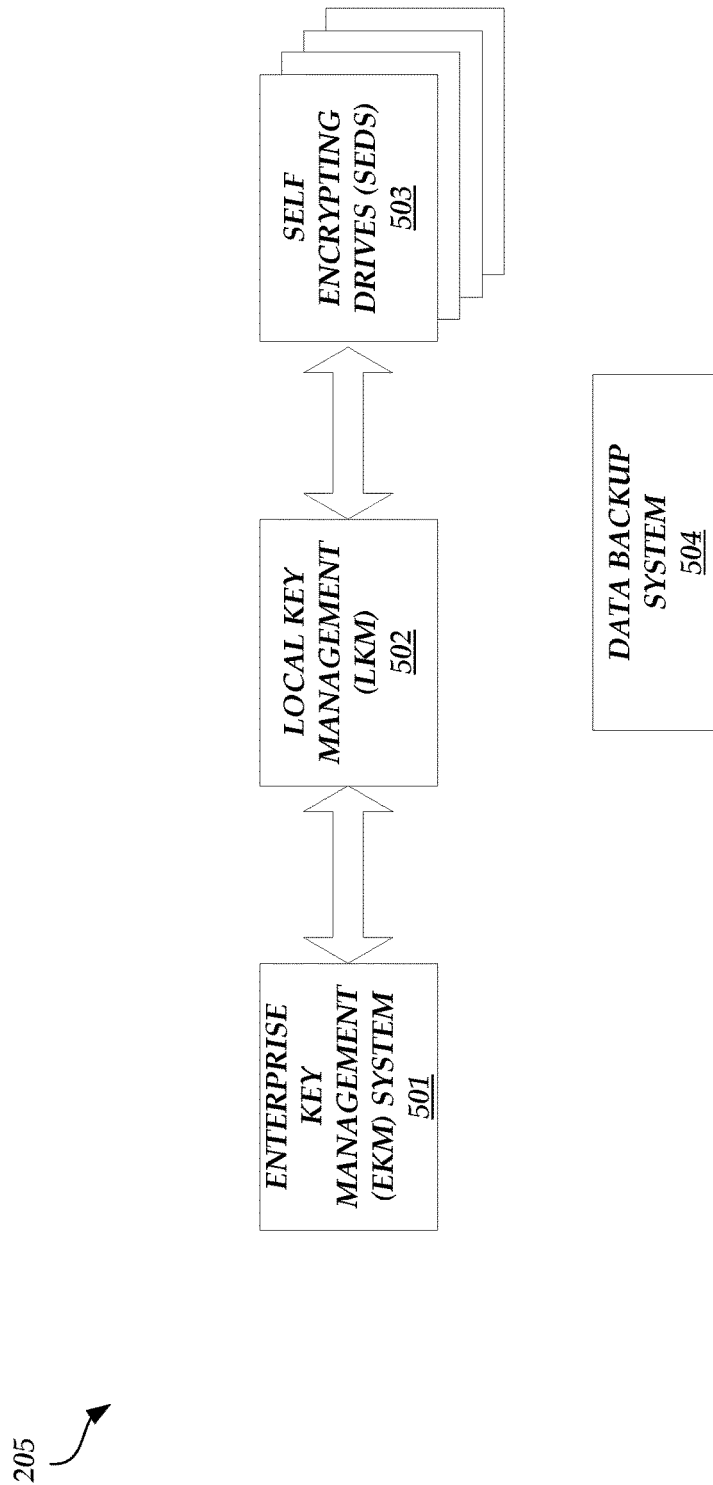
FIG. 5 illustrates a detailed block diagram of the encryption key management system of a node of FIG. 1.

FIG. 5 illustrates a detailed block diagram of the encryption key management system 205 of the node 110A. The encryption key management system 205 includes a key management subsystem to facilitate the use of encryption keys to encrypt user data. For example, as illustrated in FIG. 5, the encryption key management system 205 includes an enterprise key management (EKM) system 501, a local key management (LKM) system 502, and one or more self encrypting drives (SEDs) 503. While FIG. 5 illustrates a single LKM system 502, this is not meant to be limiting. The EKM system 501 may be associated with a plurality of LKM systems 502, and each LKM system 502 may be associated with a separate set of SEDs 503.

In an embodiment, the multi-node environment employs cryptographic security controls to protect the confidentiality and integrity of transmitted information through the deployment of hardware and software solutions. The multi-node environment can enforce cryptographic protection throughout the environment except where the information is otherwise protected within the private network 101. For example, the information may otherwise be protected when a node 110A-N decrypts data encrypted using an SSL channel encryption scheme and re-encrypts the data using a storage drive encryption scheme or decrypts data using a storage drive encryption scheme and re-encrypts the data using an SSL channel encryption scheme.

The encryption of data files within a node 110A-N can be performed in a variety of ways. One approach, for example, may follow standards outlined in NIST FIPS 140-2 documentation where all encryption keys are stored in a depository separate from a location where the encrypted files are stored, backed up, and/or accessed. The EKM system 501 can be configured to serve as the depository that generates and stores all encryption keys. The EKM system 501 can enforce encryption using the encryption keys through native hardware control. The EKM system 501 may then communicate with other hardware components that use encryption keys. The LKM System 502 can manage requests from and transfers of encryption keys to multiple storage drives (e.g., SEDs 503). For example, the LKM system 502 can store information that indicates which encryption keys are being used and/or have been used by a given SED 503, how often an encryption key has been used to encrypt data, encryption key rotation information, and/or the like. The SEDs 503 can be configured to automatically encrypt data using provided encryption keys and store such encrypted data. The SEDs 503 can use embedded hardware to enforce in-line encryption and/or decryption. In some embodiments, clear-text data cannot be extracted from SEDs 503. The use of in-line hardware can minimize the delay associated with encryption and/or decryption operations. The smaller delay, together with key generation and/or management functions included within the encryption key management system 205, can render the encryption process transparent to users (e.g., the user is unaware of the encryption keys used to encrypt user data). This transparency may increase user-friendliness and data security because critical encryption keys never leave the secure domain of the node 110A.

As an example, the EKM system 501 may generate one or more encryption keys. A SED 503 can request an encryption key to be used for encrypting data received from an electronic device 211 associated with a user via the public network 210. The request from the SED 503 can be received by the LKM system 502. The LKM system 502 can then request a new encryption key from the EKM system 501. The EKM system 501 can transmit the encryption key to the LKM system 502 and the LKM system 502 can forward the encryption key to the SED 503. The LKM system 502 can store information indicating that the specific encryption key was sent to the specific SED 503. The LKM system 502 can use this information along with an encryption key rotation policy to anticipate when a new encryption key may be needed for a SED 503. Once the requested encryption key is received by the SED 503, the SED 503 can encrypt and/or decrypt data received from the electronic device 211. The SED 503 may encrypt data as data is received from the electronic device 211. Alternatively, the SED 503 may encrypt data at regular intervals or at a set time.

The data backup system 504 can be configured to back up data stored in the SEDs 503. The data backup system 504 can store backup data on the SED 503 associated with the backup (and the stored backup data can be encrypted by the SED 503 using the same encryption key as used to encrypt the other data stored on the SED 503). For example, the data backup system 504 can receive, from the LKM system 502, the encryption key currently being used by the SED 503 to encrypt and decrypt data. The data backup system 504 can use the encryption key to decrypt the encrypted data already stored on the SED 503. The data backup system 504 can then extract encrypted backup data from the decrypted data of the entire SED 503 and decrypt the backup data using a key previously used by the data backup system 504 to encrypt the backup data. The data backup system 504 can then perform a data backup of the SED 503 (e.g., a data backup of the encrypted data or a data backup of the decrypted data, where the data backup system 504 decrypts the encrypted data using the received encryption key) and replace the old decrypted backup data with new backup data. The data backup system 504 can receive another encryption key from the LKM system 502 or another LKM system local to the data backup system 504 and use this encryption key to encrypt the new data backup before storing the new, encrypted data backup on the SED 503. The new, encrypted data backup on the SED 503 may be stored with a different encryption flag to identify the data as being encrypted with a different key than the key used to encrypt the other data stored on the SED 503. The data on the SED 503, including (or not including) the new, encrypted data backup, may then be encrypted using a new key provided by the LKM system 502.

If the user requests a data restore, the data backup system 504 can use the encryption key to decrypt the encrypted data already stored on the SED 503. The data backup system 504 can then extract encrypted backup data from the decrypted data of the entire SED 503 and decrypt the backup data using a key previously used by the data backup system 504 to encrypt the backup data. The data backup system 504 can then initiate a restore of the decrypted backup data. The backup data can be restored to the SED 503 and/or transmitted to the user. Once the restore is complete, the data backup system 504 can re-encrypt the decrypted backup data and store the encrypted backup data on the SED 503 (and re-encrypt all of the data stored on the SED 503 as described above).

Thus, in some embodiments, the data backup is encrypted by the data backup system 504 using a first encryption key and then the encrypted data backup (along with the other data stored on the SED 503) is encrypted again by the SED 503 using a second encryption key. The data backup system 504 can be a standalone component in the encryption key management system 205 or the functionality described above for the data backup system 504 can be performed by the one or more backup repository servers 209.

In an embodiment, the encryption key management system 205 produces, controls, and/or distributes symmetric encryption keys using NIST FIPS-compliant key management technology and processes. The encryption key management system 205 can also produce, control, and/or distribute asymmetric encryption keys using NSA-approved key management technology and processes. The encryption key management system 205 may obtain public key certificates under an appropriate certificate policy from an approved service provider.

In an embodiment, the multi-node environment employs cryptographic security controls to protect the confidentiality and integrity of data through the deployment of hardware and software solutions throughout the environment. The cryptographic security controls protect data, whether at rest or in transit.

Encryption Key Management System Redundancy

Figure 6:
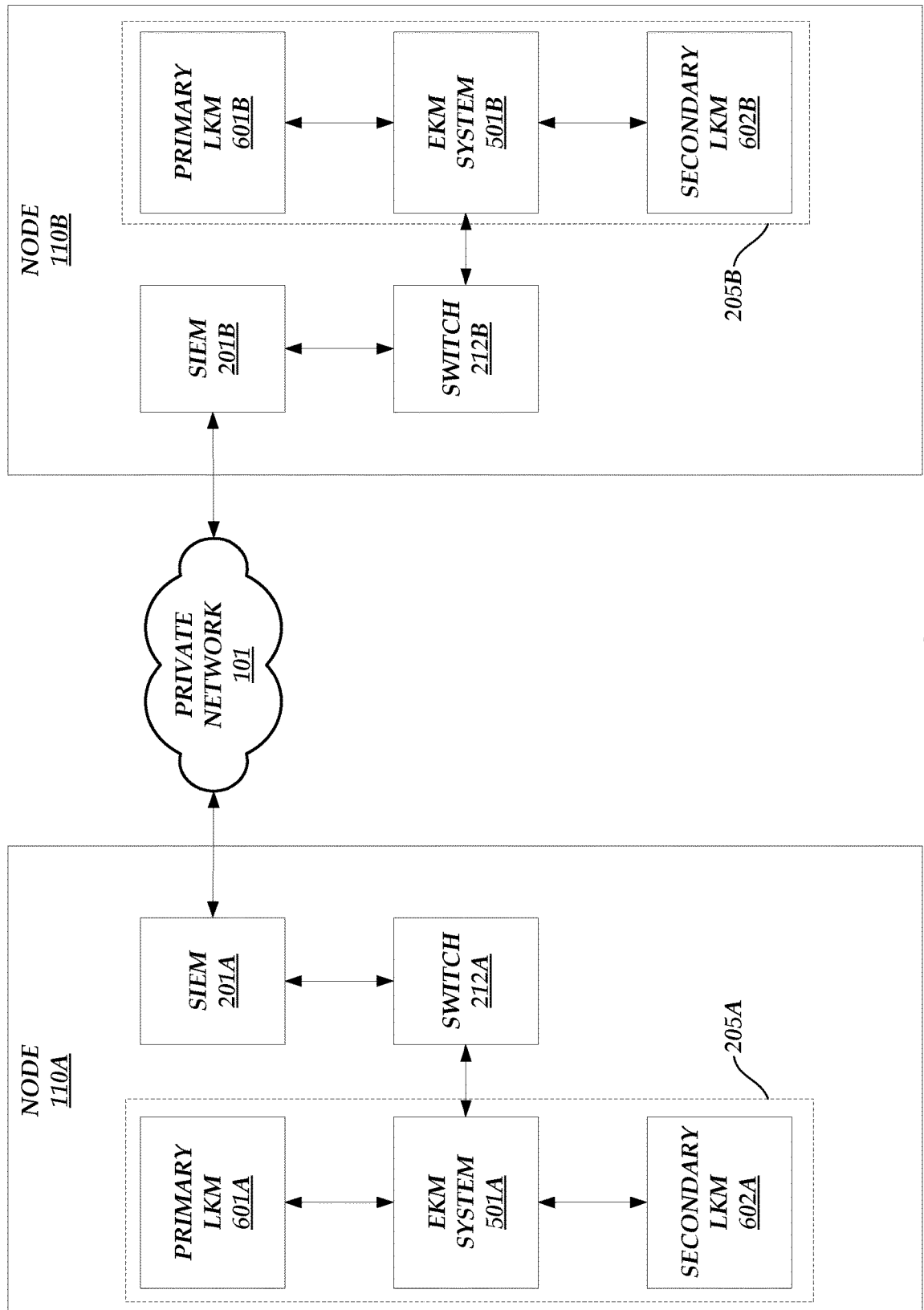
FIG. 6 illustrates the redundancy of the encryption key management systems of FIGS. 2A-2B between the nodes of FIG. 1.

FIG. 6 illustrates the redundancy of the encryption key management systems 205A-B between nodes 110A-B. FIG. 6 illustrates the interaction between the encryption key management systems 205A-B of nodes 110A-B, respectively, but the techniques disclosed herein can apply to any pair or set of nodes 110A-N. As illustrated in FIG. 6, the node 110A includes an encryption key management system 205A that includes an EKM system 501A, a primary LKM 601A, and a secondary LKM 602A. Similarly, the node 110B includes an encryption key management system 205B that includes an EKM system 501B, a primary LKM 601B, and a secondary LKM 602B.

In an embodiment, the primary LKMs 601A-B are active in normal operation and the secondary LKMs 602A-B are used for disaster recovery. The EKM system 501A can communicate with the EKM system 501B (and any other EKM system of any other node 110C-N) via the switch 212A, the SIEM system 201A, the private network 101, the SIEM system 201B, and the switch 212B. The EKM systems 501A-B can communicate, for example, so that both EKM systems 501A-B include the encryption keys generated by the other EKM system 501A-B (and/or the other EKM systems in the multi-node environment) so that an encryption key management system of one node can operate in place of another encryption key management system of another node when that encryption key management system in the other node is down or inactive.

For example, the secondary LKM 602A may be a backup copy of the primary LKM 601B. Similarly, the secondary LKM 602B may be a backup copy of the primary LKM 601A. The primary LKMs 601A-B may periodically be backed up so that the secondary LKMs 602A-B have current data. The EKM system 501A and/or the primary LKM 601A (via the EKM system 501A) of the node 110A can monitor the primary LKM 601B of the node 110B by periodically polling the primary LKM 601B (e.g., and determining that the LKM 601B is active if a response to the poll is received). If the primary LKM 601B becomes unavailable or inactive (as determined by the polling of the primary LKM 601B), the primary LKM 601A and/or the EKM system 501A activates the secondary LKM 602A, which then functions as the primary LKM of the node 110B. The secondary LKM 602A can operate as the primary LKM of the node 110B because of the exchange of encryption keys between the EKM systems 501A-B and/or because of the periodic backups of the primary LKM 601B (which are stored in the secondary LKM 602A).

If the primary LKM 601B becomes active again (as determined by the polling of the primary LKM 601B), the secondary LKM 602A synchs with the primary LKM 601B so that the primary LKM 601B has the most up-to-date information. The secondary LKM 602A then ceases to function as the primary LKM of the node 110B and the primary LKM 601B resumes normal operation as described herein.

Example Process for Providing an Encryption Key to an SED

Figure 7:
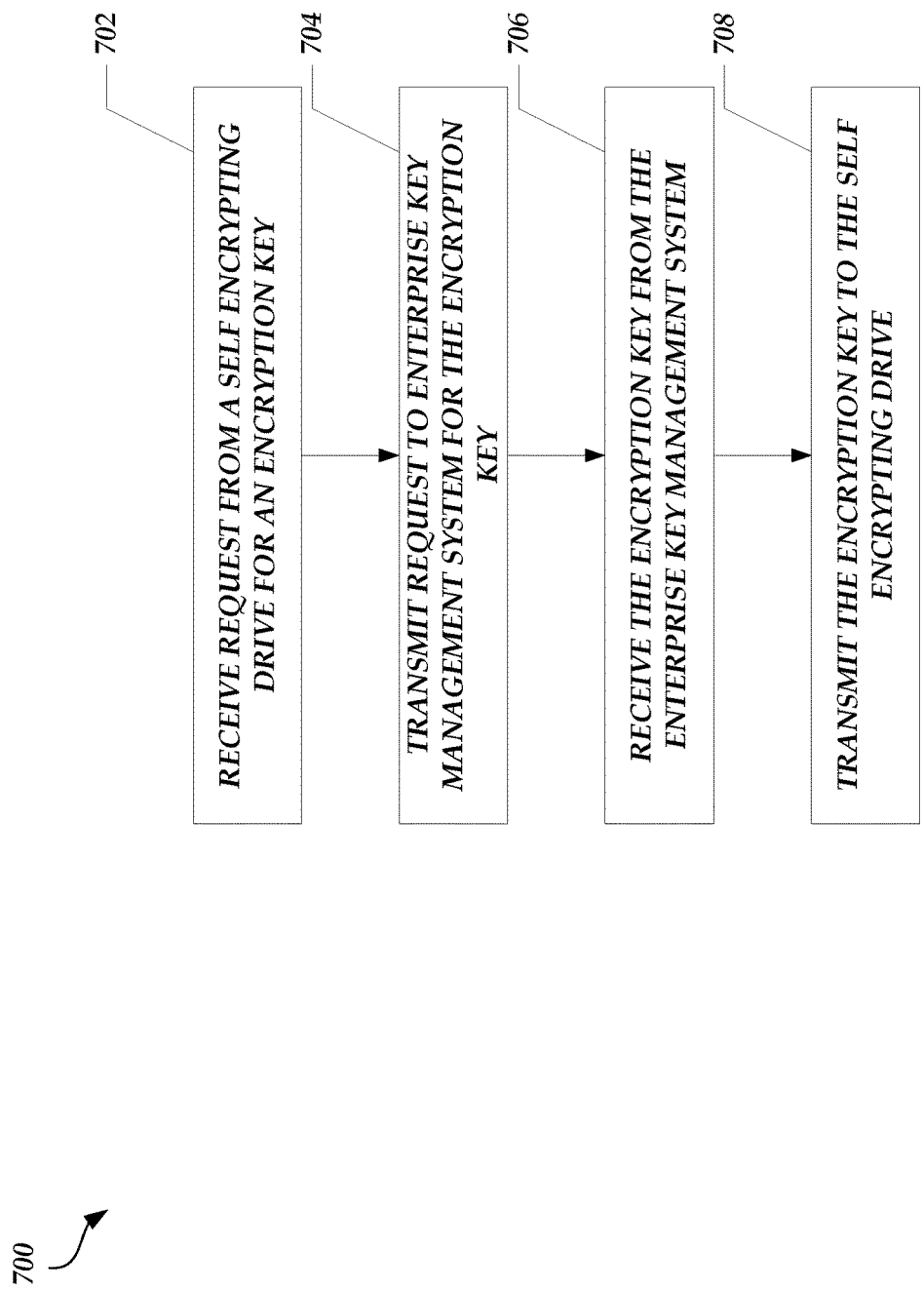
FIG. 7 illustrates a process that may be implemented by a local key management (LKM) system of FIG. 5 to provide an encryption key to an self-encrypting drive (SED), such as the SED of FIG. 5.

FIG. 7 illustrates a process 700 that may be implemented by the LKM system 502 to provide an encryption key to an SED, such as the SED 503. The process 700 begins at block 702.

At block 702, a request for an encryption key is received from a self-encrypting drive. The self encrypting drive may request the encryption key to encrypt data received from an IoT device, such as the electronic device 211 (e.g., settings or device parameter information).

At block 704, a request for the encryption key is transmitted to the enterprise key management system. The request may be transmitted to the enterprise key management system in response to receiving the request from the self encrypting drive.

At block 706, the encryption key is received from the enterprise key management system. In an embodiment, the LKM system 502 stores information associating the received encryption key with the self encrypting drive that requested the encryption key. Such information can include an encryption key identifier, a rotation policy associated with the encryption key, and/or the like.

At block 708, the encryption key is transmitted to the self encrypting drive. The self encrypting drive may use the encryption key to encrypt and/or decrypt data stored in the self encrypting drive.

Example Data Packet Analysis

Figure 8:
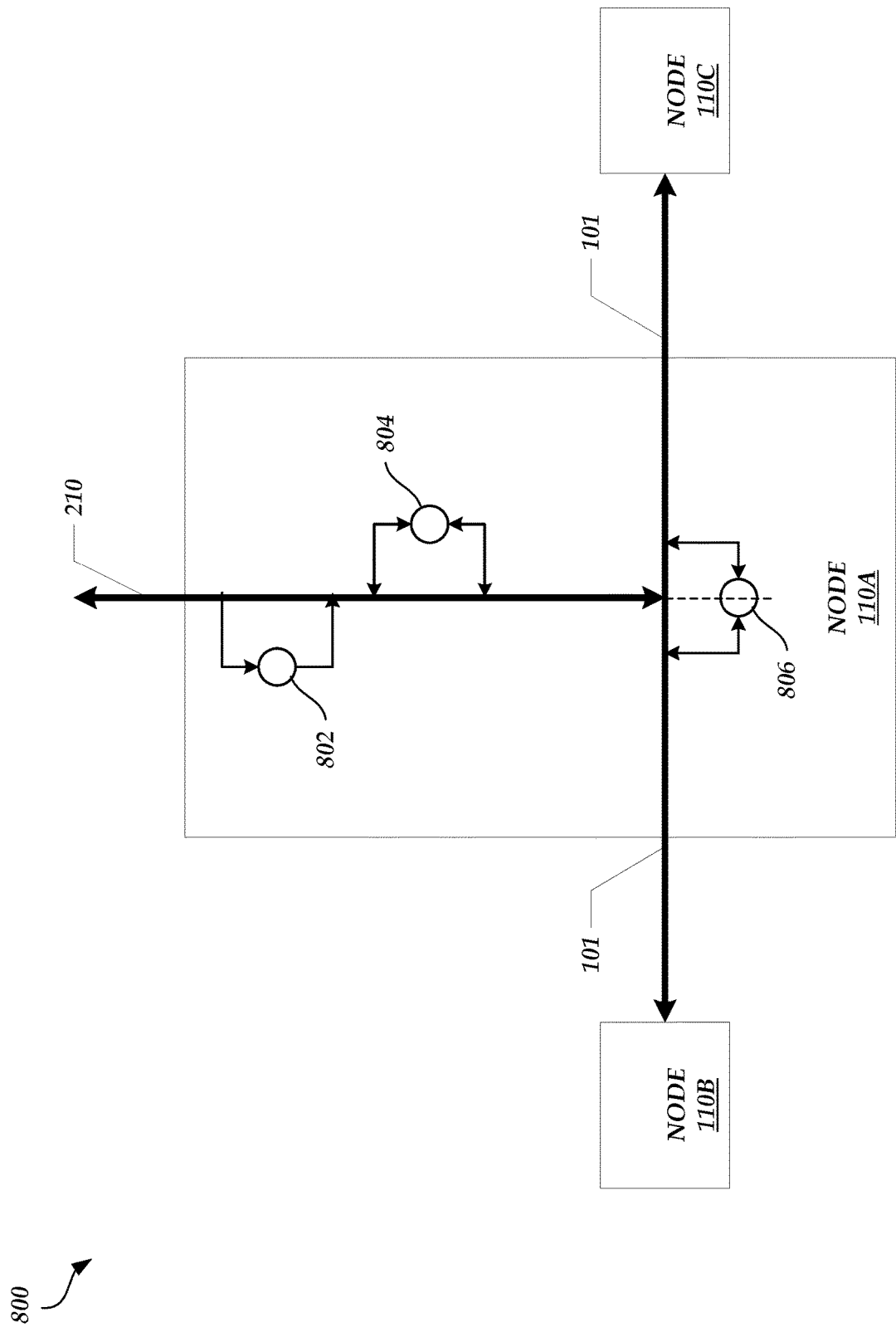
FIG. 8 illustrates an example data packet analysis through a security information and event management (SIEM) system within a node.

FIG. 8 illustrates an example data packet inspection flow 800 that may be implemented in any node, such as node 110A. As illustrated in FIG. 8 and described herein, the node 110A can receive and transmit data packets via the private network 101 and/or via the public network 210. The node 110A may analyze these data packets for threat detection purposes. For example, the SIEM system 201 (e.g., the active threat detector 203 and/or the firewall 204) of the node 110A performs the data packet analysis.

In some embodiments, the node 110A performs a different type of data packet analysis based on the source and/or destination of the respective data packet. For example, if a data packet originates from another node (e.g., node 110B, node 110C, etc.) and is transmitted over the private network 101, then the SIEM system 201 performs a first type of analysis, conceptually represented at location 806. If a data packet originates from an external device (e.g., one of electronic devices 211) and is transmitted over the public network 210 or cellular network 220 (not shown), then the SIEM system 201 performs a second type of analysis, conceptually represented at location 802, and/or a third type of analysis, conceptually represented at location 804. Details on the differences between the different types of analyses are described below.

The SIEM system 201 may dedicate computing resources to perform one or more of the analyses. For example, to perform an analysis, the SIEM system 201 can create an isolated environment to which a set of computing resources, such as computer memory, processing power, etc., is dedicated. The computing resources may be used by the SIEM system 201 to execute, inspect, or otherwise process the contents of data packets. The isolated environment may help prevent the contents of such data packets from accessing other resources in the node 110A and/or may help prevent unauthorized or unintended actions from being executed by the contents of such data packets.

The computing resources dedicated to an isolated environment may be different depending on the type of analysis to be performed using the computing resources. For example, because the analysis performed by the SIEM system 201 may be different depending on the source and/or destination of a data packet, different computing resources can be dedicated for a particular type of analysis such that the SIEM system 201 can perform specific and different functions that are tailored toward the types of threats that may originate from transmissions via the private network 101 and/or transmissions via the public network 210 or cellular network 220 (not shown).

As described herein, the node 110A may receive data packets from external devices through the public network 210 or through the cellular network 220 (not shown). In some instances, such data packets may be unsecure—the contents of the data packets may include malware, corrupted data, or otherwise suspicious information. The second type of analysis performed by the SIEM system 201, conceptually represented at the location 802, may be deployed to analyze inbound data packets transmitted over the public network 210 and/or the cellular network 220 (not shown) for threats. During the second type of analysis, the SIEM system 201 can retrieve the third party threat data received from external sources. The SIEM system 201 may then perform external threat management by, for example, analyzing the inbound data packets using the third party threat data. For example, the third party threat data can include lists or ranges of suspicious or malicious IP addresses and the SIEM system 201 can compare the inbound data packets with these IP addresses to identify suspicious data packets (e.g., the SIEM system 201 can analyze the header of an inbound data packet to see if the header includes a malicious IP address as a source address or destination address). If a match is found, the corresponding data packet or packets are dropped and blocked from further entry into the node 110A. As another example, the third party threat data can include threat signatures, which are digital signatures of existing, known threats that can be received from external sources and stored in the node 110A (e.g., in a data storage device accessible by the active threat detector 203 and/or the firewall 204). The SIEM system 201 can generate signatures of inbound data packets (e.g., using the same digital signature algorithm as used to generate the threat signatures) and compare the generated signatures with the threat signatures. If a match is found, the corresponding data packet or packets are dropped and blocked from further entry into the node 110A. The SIEM system 201 may use one of a plurality of digital signature algorithms, such as the Digital Signature Algorithm (DSA) specified in FIPS 186-1 or its successors, a message digest algorithm such as MD5, or other like algorithms to generate the inbound data packet signatures.

One or more data packets that are not dropped or blocked based on the second type of analysis may be further inspected by the SIEM system 201 using the third type of analysis, conceptually represented at the location 804. During the third type of analysis, the SIEM system 201 may perform malware and/or behavioral analysis, which takes into account parameters and constraints of the node 110A and/or the public network 210 or the cellular network 220 (not shown). For example, the SIEM system 201 may store behavior information related to the types of data packets normally transmitted and received via the public network 210 (or the cellular network 220) and the source and/or destination of such data packets. The SIEM system 201 may then inspect the source and/or destination addresses of current data packets and drop data packets that include unusual source and/or destination addresses as indicated by the behavior information. As another example, the SIEM system 201 may store permitted source and/or destination addresses. The SIEM system 201 may block data packets with an address outside of the permitted address values. Behavioral analysis may be performed on malware. For example, a malware specimen may be analyzed for its interactions with computing resources such as file systems, operating system processes and/or components, networks, etc. The SIEM system 201 may provide behavior monitoring tools and create an isolated environment in the system to permit behavioral analysis. The SIEM system 201 may perform behavioral analysis through allowing a malware specimen to infect the isolated environment, analyze interactions of the malware with computing resources, and/or modify computing resources available to the isolated environment to analyze the malware's behavior (e.g., changes in response to modification of available computing resources).

The SIEM system 201 can additionally inspect outbound data packets (e.g., data packets transmitted by the node 110A over the public network 210 or the cellular network 220). Such inspection may be performed for the purpose of data logging and event management (e.g., logging traffic events to particular destination addresses).

The third type of analysis may be a deeper, more granular analysis than the second type of analysis. For example, the SIEM system 201 may commit a larger amount of computing resources to perform the third type of analysis as compared to the second type of analysis. The third type of analysis may also be more resource intensive than the second type of analysis, resulting in a longer analysis period as compared to the second type of analysis.

As described herein, the node 110A may be coupled to other nodes (e.g., nodes 110B and 110C) within the multi-node environment via the dedicated private network 101. The SIEM system 201 of node 110A may route data traffic to and from an external network, such as the public network 210, and/or to and from another node in the multi-node environment. The SIEM system 201 may perform the first type of analysis to inspect data traffic between two nodes on the dedicated private network 101, conceptually represented at the location 806. The SIEM system 201 can inspect both inbound and outbound data packets (e.g., the SIEM system 201 in node 110A may inspect data packets transmitted from node 110A to node 110B and/or transmitted from node 110B to node 110A). A neighboring node (e.g., node 110B) can also have the ability to perform the first type of analysis when receiving data transmitted by the node 110A or any other node in the multi-node environment. Thus, an inspection tag may be attached to a data packet by the SIEM system 201 of the node 110A after completing the first type of analysis such that the receiving node (e.g., node 110B) does not repeat the analysis. For example, this inspection tag indicates whether a corresponding data packet has been inspected by an SIEM system 201 in a node within the dedicated private network 101. The SIEM system 201 may be configured to not inspect data packets that include inspection tags indicating that the respective data packets have already been inspected by another SIEM system 201 in the multi-node environment, thereby eliminating duplicate inspections and increasing efficiency. As an example, the SIEM system 201 may perform firewall blocking, port analysis, and/or in-line blocking during the first type of analysis. These techniques can block exploits based on an analysis of the internal usage of the contents of a data packet. For Example, a Permanent Virtual Circuit (PVC) can be defined by the SIEM system 201 and used to connect an external server to the SIEM system 201. A specific port number may be assigned to a particular server. Data transferring from the server across the PVC can then be restricted to use that assigned specific port number. The firewall can be configured to permit only traffic across this port and block all other traffic. The firewall can inspect the packet header for permitted IP source and destination addresses and for permitted port access. For example, specific services such as Mail (Simple Mail Transfer Protocol or SMTP, Post Office Protocol or POP) and WEB (HTTP port 80, SSL port 443) are commonly used to move specific data through designated ports relative to their services. The SIEM system 201 can be configured to permit only traffic through a port designated to the traffic type.

In relation to the components of the multi-node environment illustrated in FIG. 2A, inbound data traffic can enter node 110A through either public network 210 or private network 101, pass through router 202, active threat detector 203, and firewall 204, and be received by switch 212 if the second and/or third type of analyses do not result in the dropping or blocking of the data packet. Outbound data packets may pass through switch 212, firewall 204, active threat detector 203, and router 202 to either public network 210 or private network 101. Although both public network 210 and private network 101 traffic share the same physical routes within node 110A, the active threat detector 203 and/or the firewall 204 can distinguish public network 210 data packets from private network 101 data packets based on, for example, addresses within the data packets. The active threat detector 203 and/or the firewall 204 can then perform the types of analyses intended for the respective types of traffic. Border Gateway Protocol is an example protocol which may enable traffic management and differentiation.

In an embodiment, the SIEM system 201 performs the first, second, and/or third type of analysis on all data packets transmitted or received via the public network 210, the cellular network 220 (not shown), or the private network 101. In other embodiments, the SIEM system 201 performs the first, second, and/or third type of analysis on selected data packets. For example, a data packet may be selected for the first, second, and/or third type of analysis based on a configuration of the active threat detector 203 and/or the firewall 204 (e.g., the components may be configured to analyze certain types of data packets, data packets that have a certain source address, etc.). As another example, a data packet may be selected for the third type of analysis if the data packet was selected for the second type of analysis (and passed the second type of analysis). As another example, a data packet may be selected for the first, second, and/or third type of analysis based on a received threat alert (e.g., the SIEM system 201 has been notified by an external source or another node in the multi-node environment that a threat is expected or an attack has occurred). The SIEM system 201 may select the first few and/or last few data packets of a data flow when a threat alert is received. As another example, a data packet may be selected for the first, second, and/or third type of analysis if data packets similar to a received or transmitted data packet were dropped or blocked in the past.

Integrated Control and Data Management Interface

Generally, data is collected by various devices and then pushed to a centralized database. Once at the centralized database, the data can be processed (e.g., batch, Hadoop, etc.) and displayed to a user. However, the transfer of data to the centralized database can pose a security risk and cause network latency. For example, the data is often transferred over a public network, such as the Internet, leaving the data vulnerable to interception by malicious actors. Often, the amount of data collected by the various devices is very large (e.g., gigabytes to terabytes of data) and the transfer of the data to the centralized database can reduce the amount of bandwidth available for other traffic. To avoid these issues, the data could be stored locally to the device or system that generated the data. However, it may be difficult to process data across different systems given that each of the systems may reside on a separate private network and the data may be stored in incompatible formats.

Accordingly, described herein is an integrated control and data management interface that can avoid the issues described above. For example, data may be stored in databases local to the devices or systems that generated the data. The devices and/or systems may also be physically coupled to the same private network. The integrated control and data management interface can function in the control plane of the private network, thereby gaining access to the databases without having to access a public network (e.g., the integrated control and data management interface can connect to the databases "out-of-band" (e.g., via a private network) rather than "in-band" (e.g., via a public network)). The integrated control and data management interface can also access and/or process data stored in the databases local to the devices or systems via calls (e.g., application program interface (API) calls) to the various databases. The structure of the calls may remain static such that even if the formatting or mapping of the data in one or more of the databases changes, the integrated control and data management interface can still use the same calls to access and/or process the data. In this way, the integrated control and data management interface can provide a single user interface for device interaction and analysis.

Figure 9:
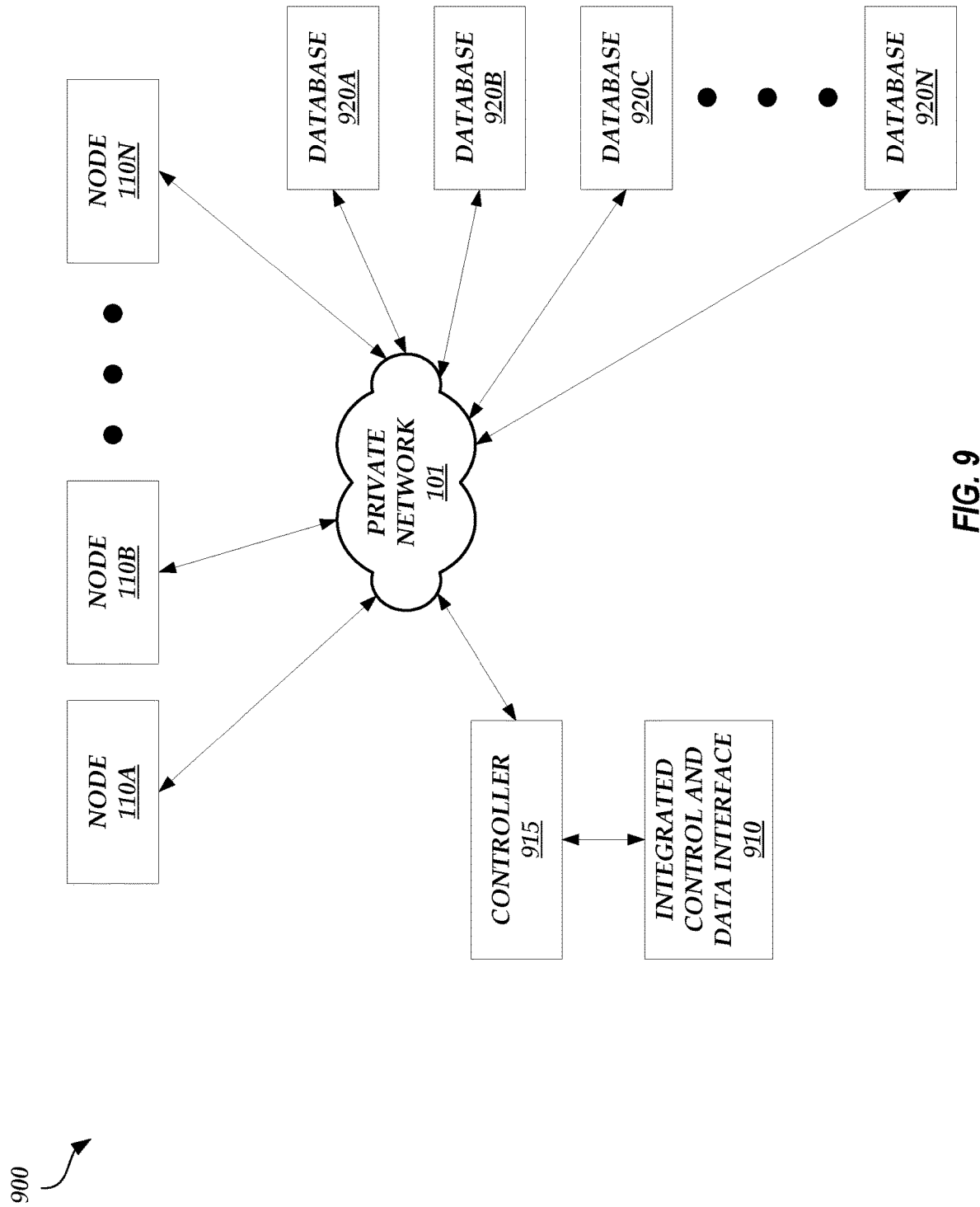
FIG. 9 illustrates an example integrated control and data management interface network.

FIG. 9 illustrates an example integrated control and data management interface network 900. As illustrated in FIG. 9, integrated control and data interface 910 is an example integrated control and data management interface described above. The integrated control and data interface 910 can be any physical computing system, such as a mobile device, desktop, workstation, server, and/or the like. The integrated control and data interface 910 can execute message-oriented middleware (MOM) that supports the sending and receiving of messages between nodes 110A-N and databases 920A-N In an embodiment, the integrated control and data interface 910 communicates with the private network 101 via a controller 915. For example, the controller 915 can represent a network operation center (or a network management center) that includes network monitoring equipment to control, manage, or otherwise monitor the private network 101. The controller 915 may also include a route optimization system (e.g., a MANAGED INTERNET ROUTE OPTIMIZER controller) that automatically manages network protocols (e.g., Border Gateway Protocol (BGP)) and re-routes traffic. Thus, the integrated control and data interface 910 can access the control plane of the private network 101 via the controller 915. In alternative embodiments, the integrated control and data interface 910 communicates directly with the private network 101.

The databases 920A-N can be databases that store data local to a system or device. For example, the databases 920A-N can each be associated with a third party and store data generated by the respective third party. The third parties can be any system or service that generates data, such as a network-accessible ticketing service, a system of sensors (e.g., sensors associated with oil wells or oil pipelines), a credit card processing service, and/or the like.

The nodes 110A-N and databases 920A-N may each be physically located in different geographic locations. However, the nodes 110A-N and the databases 920A-N may have access to the private network 101 and other networks, such as public networks (not shown). Thus, the integrated control and data interface 910 can communicate with the nodes 110A-N and the databases 920A-N via the private network 101, thereby avoiding public networks, such as the public network 210 or the cellular network 220, and the data vulnerabilities associated with such networks.

The integrated control and data interface 910 can use calls (e.g., API calls) to query the databases 920A-N and/or the databases of the nodes 110A-N (e.g., storage servers 208) via the private network 101. For example, the integrated control and data interface 910 can transmit a query call to the database 920A via the private network 101. Instead of creating artifacts associated with the data stored in the database 920A (which can contaminate data and/or results) and/or using private network 101 bandwidth to transfer the data stored in the database 920A to the integrated control and data interface 910, the integrated control and data interface 910 can construct the query call such that any processing associated with the query call is executed locally by the database 920A (or the system operating the database 920A) and a processed result is transmitted to the integrated control and data interface 910 (e.g., a result that includes a response to the query). The integrated control and data interface 910 can transmit the same query to multiple nodes 110A-N and/or databases 920A-N such that the integrated control and data interface 910 effectively processes data stored locally in different databases as if the data was actually all stored in a centralized database.

In addition, the integrated control and data interface 910 can display the results of a query (or stored data) within a single interface, such as a single user interface, without creating multiple connections to different nodes 110A-N and/or databases 920A-N. For example, generally to be able to view data stored in database 920A and data stored in database 920B, a device would need to establish a first connection (e.g., a first tunnel) with the database 920A, collect the desired data from the database 920A, close the first connection, separately establish a second connection (e.g., a second tunnel) with the database 920B, and then collect the desired data from the database 920B. The connections may be serially established and closed because the connections are secure and a device generally cannot establish multiple secure connections at once, especially when such connections require the device to connect with a network outside of the network to which the device is associated.

However, here, the integrated control and data interface 910 may not need to establish two separate connections to access the data stored in the databases 920A-B. Instead, the integrated control and data interface 910 can use the internal routing protocol of the private network 101 (because the integrated control and data interface 910 access the private network 101 via the control plane) to communicate with the various nodes 110A-N and/or the databases 920A-N. For example, the database 920A may be assigned an internal network address. The integrated control and data interface 910 can use this internal network address to access the database 920A (where the internal routing protocol routes packets such that any calls initiated by the integrated control and data interface 910 are received by the database 920A). Thus, there is no need to serially establish and close connections to the nodes 110A-N and/or the databases 920A-N. The integrated control and data interface 910 can access multiple nodes 110A-N and/or the databases 920A-N at the same time (e.g., the internal network address of the database 920A can be used to display database 920A data in a first window of the user interface and the internal network address of the database 920B can be used to display database 920B data in a second window of the user interface concurrently with the first window).

Double-Encryption Network Connection

As described above with respect to FIG. 5, a node 110 can include an encryption key management system 205, where the encryption key management system 205 includes the EKM system 501, the LKM 502, and one or more SEDs 503. As described above with respect to FIG. 6, the EKM system 501 of one node 110 can communicate with the EKM system 501 of another node 110 so that both EKM systems 501 can exchange generated encryption keys. In some embodiments, a node 110 can include the encryption key management system 205 and one or more separate encryption key management systems that are each associated with a specific user. The encryption key management system 205 and the one or more separate encryption key management systems can be used to secure a network connection between the node 110 and a user system, as described below with respect to FIG. 10.

Figure 10:
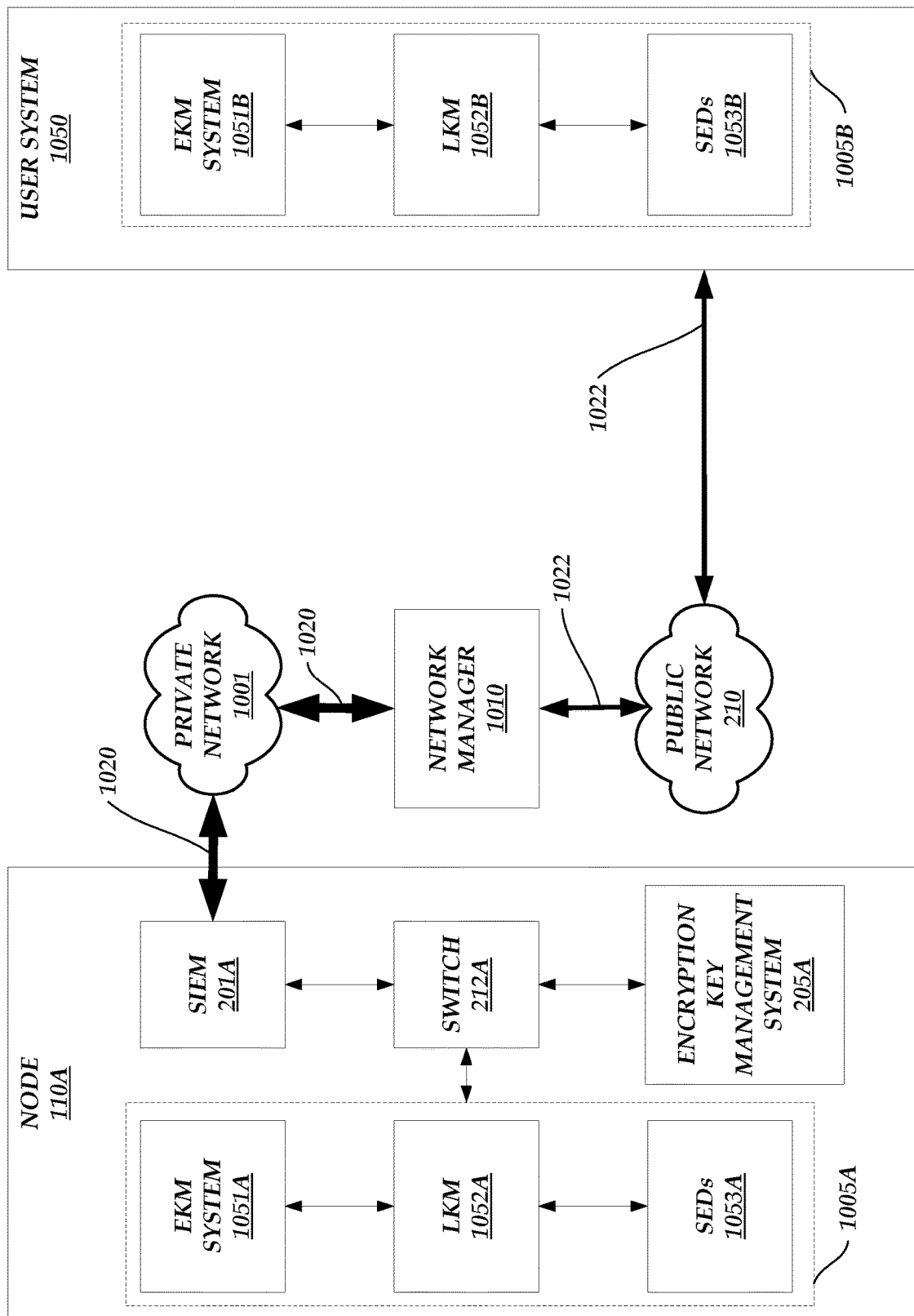
FIG. 10 illustrates a double-encryption environment between a node and a user system.

FIG. 10 illustrates a double-encryption environment between a node 110A and a user system 1050. As illustrated in FIG. 10, the node 110A includes the SIEM system 201A, the switch 212A, the encryption key management system 205A, other components of the node 110A illustrated in FIGS. 2A-2B, and a user encryption key management system 1005A. The user encryption key management system 1005A may include the same components as the encryption key management system 205A. For example, the user encryption key management system 1005A includes an EKM system 1051A, an LKM 1052A, and one or more SEDs 1053A. The user encryption key management system 1005A may be associated with a specific user (e.g., the user that manages the user system 1050) and may be isolated from other components of the node 110A aside from the switch 212A. For example, the data stored in the one or more SEDs 1053A may have restricted access such that only certain components of the node 110A can access such data (e.g., the one or more processing servers 206 may access the data via the switch 212A to perform one or more actions at the request of the user system 1050). While the node 110A is depicted as having a single user encryption key management system 1005A, this is not meant to be limiting. The node 110A can include any number of user encryption key management systems, where each user encryption key management system is associated with a different user and/or user system 1050.

The node 110A may communicate with a network manager 1010 via the SIEM system 201A using a private network 1001 (e.g., a privately accessible network of linked networks, possibly operated by various distinct parties, such as a personal area network, local area network, wide area network, cable network, satellite network, cellular telephone network, etc. or combination thereof, each with access to and/or from the Internet) only accessible to the network manager 1010 and the node 110A. Likewise, the user system 1050 may communicate with the network manager 1010 using the public network 210. Thus, the node 110A and the user system 1050 may communicate via the private network 1001 and the public network 210. Connection 1020 between the SIEM system 201A and the network manager 1010 over the private network 1001 may have double encryption, whereas connection 1022 between the network manager 1010 and the user system 1050 over the public network 210 may have single encryption, as described in greater detail below.

The network manager 1010 may be a system that includes computer hardware (e.g., a processor, memory, modem, etc.) and that is managed by a network provider, such as an Internet service provider. The network provider may manage at least some components within the public network 210. The network provider may also manage the private network 1001 alone or in conjunction with the entity managing the node 110A. The network manager 1010 may serve as an interface between the private network 1001 and the public network 210. In some embodiments, the network manager 1010 can function as a firewall by blocking data packets from being transmitted within the private network 1001 if such data packets or the data within such data packets are not encrypted.

The user system 1050 may be a system managed by a user that locally stores user data (e.g., data measured by electronic or IoT devices 211, transactional data, medical data, etc.). The user system 1050 may include a user encryption key management system 1005B that includes the same components as the user encryption key management system 1005A. For example, the user encryption key management system 1005B may include the EKM system 1051B, the LKM 1052B, and one or more SEDs 1053B. The one or more SEDs 1053B may store user data in an encrypted format (e.g., encrypted using encryption keys generated by the EKM system 1051B). The user system 1050 may also include other storage devices, not shown, for locally storing user data. As an illustrative example, the user system 1050 can be a system located on the premises of an entity (e.g., a manufacturing company, a pipeline operator, a credit card company, a hospital, etc.) that manages and/or owns the user data.

Because the user encryption key management system 1005A is associated with the user system 1050, the user encryption key management system 1005A and the user encryption key management system 1005B may communicate with each other (e.g., the EKM system 1051A and the EKM system 1051B may communicate with each other) to facilitate key exchange. The key exchange may take place to encrypt a connection between the node 110A and the user system 1050 and to allow the node 110A to process user data. For example, while the user data may be stored locally in the user system 1050 (and therefore secure), the amount of user data may be large (e.g., gigabytes, terabytes, etc.) and the cost of processing such data (e.g., aggregating the data, identifying trends in the data using machine-learning or other techniques, filtering the data, etc.) may be high (e.g., financially expensive and expensive in terms of computing resources needed to process the large amount of data). Thus, the processing resources available to the node 110A could be leveraged to perform the desired data processing. However, as described herein, the user data may be extremely sensitive and/or confidential. Accordingly, it may be important for a connection to be secure before a copy of some or all of the user data is transferred across a network.

To secure the connection 1020 and the connection 1022, the EKM system 1051A or 1051B can generate an encryption key that is used to encrypt some or all of the data transferred across the connections 1020 and 1022. For example, user data stored in the one or more SEDs 1053B may be encrypted. The LKM 1052B can retrieve an encryption key to allow the one or more SEDs 1053B to decrypt the user data to be transmitted to the node 110A for processing. The LKM 1052B can then receive the same encryption key or another encryption key from the EKM system 1051B to encrypt the user data for transport across the connection 1022 and the connection 1020. Alternatively, the SEDs 1053B does not decrypt the user data and the encrypted user data is transmitted to the node 110A.

The encrypted user data passes through the connection 1022 and arrives at the network manager 1010. The EKM system 501 of the encryption key management system 205A may generate a second, separate encryption key that is used to encrypt data traveling along the connection 1020. For example, the EKM system 501 may transmit the second encryption key to the network manager 1010. The network manager 1010 can then encrypt the encrypted user data using the second encryption key. Thus, the user data is encrypted twice. The network manager 1010 can then forward the double-encrypted user data along the connection 1020 to the SIEM system 201A.

The SIEM system 201A passes the double-encrypted user data to the switch 212, which then forwards the double-encrypted user data to the user encryption key management system 1005A. The user encryption key management system 1005A can request the second encryption key from the encryption key management system 205A via the switch 212A and decrypt the outer encryption layer of the double-encrypted user data using the second encryption key. Alternatively, the SIEM system 201A or the switch 212A can request the second encryption key from the encryption key management system 205A and decrypt the outer encryption layer of the double-encrypted user data or the double-encrypted user data can be passed to the encryption key management system 205A for decryption of the outer encryption layer.

Because the user data is also encrypted using an encryption key generated by the EKM system 1051B, the EKM system 1051B coordinates with the EKM system 1051A to indicate the encryption key that was used to encrypt the user data. The EKM system 1051B can either forward the encryption key to the EKM system 1051A (e.g., by encrypting the encryption key using another encryption key available to the EKM system 1051A and transmitting the encrypted encryption key along the connections 1020 and 1022) or provide the information necessary for the EKM system 1051A to generate and/or retrieve the same encryption key. For example, both EKM systems 1051A-B may use the same techniques to generate encryption keys such that each generates encryption keys in the same order or sequence. The EKM system 1051B can then indicate to the EKM system 1051A which encryption key in sequence was used to encrypt the user data, which then allows the EKM system 1051A to generate and/or retrieve the appropriate encryption key for decryption of the encrypted user data.

Once the encryption key is identified, the user encryption key management system 1005A can use the encryption key to decrypt the now single-encrypted user data and send the decrypted user data to the one or more processing servers 206 via the switch 212A. The user system 1050 may separately transmit an instruction to the node 110A via the connections 1020 and 1022 that instructs the node 110A to perform a certain operation (e.g., data aggregation, trend identification, data filtering, etc.) such that the one or more processing servers 206 perform the appropriate actions on the decrypted user data. Alternatively, the instruction can be sent in conjunction with the encrypted user data (e.g., the instruction may be encrypted as well and, after the instruction is decrypted, the user encryption key management system 1005A can transmit the decrypted instruction to the one or more processing servers 206 via the switch 212A such that the one or more processing servers 206 process the user data accordingly to the decrypted instruction).

After the decrypted user data is processed, the processed user data is transmitted by the one or more processing servers 206 back to the user encryption key management system 1005A via the switch 212A. The user encryption key management system 1005A can encrypt the processed user data using an encryption key generated by the EKM system 1051A or received from the EKM system 1051B (e.g., either the same encryption key used to encrypt the user data when transmitted by the user system 1050 or a different encryption key). The user encryption key management system 1005A can then request an encryption key from the encryption key management system 205A to use for encrypting the encrypted processed user data. The encryption key provided by the encryption key management system 205A can be the same second encryption key used to encrypt the encrypted user data by the network manager 1010 or a different encryption key. Alternatively, the encrypted processed user data can be passed to the switch 212A, the SIEM system 201A, and/or the encryption key management system 205A to encrypt the processed user data a second time. Thus, the processed user data is encrypted twice: once using an encryption key provided by the user-specific user encryption key management system 205A and once again using an encryption key provided by the encryption key management system 205A.

The double-encrypted processed user data can then be transmitted by the node 110A to the network manager 1010 along the connection 1020 through the private network 1001. The network manager 1010 can then use the encryption key provided by the encryption key management system 205A to decrypt the outer encryption layer of the double-encrypted processed user data. The network manager 1010 can then transmit the now single-encrypted processed user data to the user system 1050 along the connection 1022 through the public network 1022. Once the user system 1050 receives the single-encrypted processed user data, then EKM system 1051B can provide an encryption key that can be used to decrypt the encrypted processed user data (e.g., based on communications with the EKM system 1051A to identify which encryption key was used to encrypt the processed user data and/or to receive the encryption key used to encrypt the processed user data). The decrypted processed user data can then be stored in the one or more SEDs 1053B and/or other storage systems. When stored in the one or more SEDs 1053B, the decrypted processed user data may be encrypted using an encryption key provided by the EKM system 1051B via the LKM 1052B.

While FIG. 10 depicts one user system 1050, this is not meant to be limiting. For example, multiple user systems may connect with the network manager 1010 via the public network 210. Data transmitted between the network manager 1010 and the various user systems (e.g., via connection 1022 and other connections, not shown) may be encrypted using an encryption key provided by the EKM system 1051 of the respective user system. Data transmitted between the network manager 1010 and the node 110A (e.g., via connection 1020) may be double-encrypted, where the data encrypted using the encryption keys provided by the EKM system 1051 of the respective user system is encrypted again using an encryption key provided by the EKM system 501 of the encryption key management system 205A. Thus, the connection 1020 may carry multiple channels of double-encrypted data, where data in each channel is encrypted using a common encryption key (e.g., the encryption key provided by the EKM system 501 of the encryption key management system 205A) and a unique encryption key (e.g., the encryption key provided by the EKM system 1051 of the user system associated with the respective data). Alternatively, data in each channel can be encrypted using unique encryption keys (e.g., the EKM system 501 of the encryption key management system 205A can provide different encryption keys to the network manager 1010, one for each channel).

Device Worlds

As described herein, a user can access a node 110A-N to provide login information and attributes or parameters for an IoT device, such as one of the electronic devices 211, 311, and/or 411. Electronic device attributes or parameters (e.g., IoT device attributes or parameters) can include device settings (e.g., a time of day that the electronic device operates, a temperature value if the electronic device is a thermostat, etc.), device measurements, and/or any other values that define the characteristics of or the behavior of the electronic device.

When providing the login information and attributes or parameters, the user can also group electronic devices into the same environment or device world and assign global parameters (e.g., world parameters) to the device world. As used herein, a "device world" is a user-defined grouping or aggregation of electronic devices, where each electronic device in the device world is configured to operate according to the global parameters assigned to the device world. The electronic devices grouped into the same device world can be related. For example, a user may operate a pipeline. The electronic devices may be sensors that measure various parameters associated with the pipeline, such as temperature, pressure, flow, etc. Because the electronic devices are used to monitor the same structure (e.g., the pipeline), a set of global parameters may govern how the electronic devices operate. As another example, a first electronic device can be a thermostat and a second electronic device can be a wearable human body monitor. The first and second electronic devices may be configured with a set of global parameters such that the temperature of the person wearing the wearable human body monitor has a constant body temperature.

Using the provided login information, the node 110A-N can periodically poll the electronic devices in a device world, a server that manages the electronic devices in the device world (e.g., the server 230), and/or electronic devices not assigned to any device world to determine whether the electronic devices are operating according to the device attributes and/or the global parameters. If the node 110A-N polls the electronic devices directly and determines that an electronic device is operating outside of the defined device attributes and/or global parameters, the node 110A-N can generate an alert or notification to inform the user that the electronic device is operating incorrectly and/or can transmit a message to the electronic device to instruct the electronic device to adjust the device parameter that has caused the electronic device to operate outside of the defined device attributes and/or global parameters. If the node 110A-N polls the server that manages the electronic devices and determines that an electronic device is operating outside of the defined device attributes and/or global parameters based on the feedback provided by the server, the node 110A-N can generate an alert or notification to inform the user that the electronic device is operating incorrectly and/or can transmit a message to the server managing the electronic device to instruct the electronic device to adjust the device parameter that has caused the electronic device to operate outside of the defined device attributes and/or global parameters.

Figure 11:
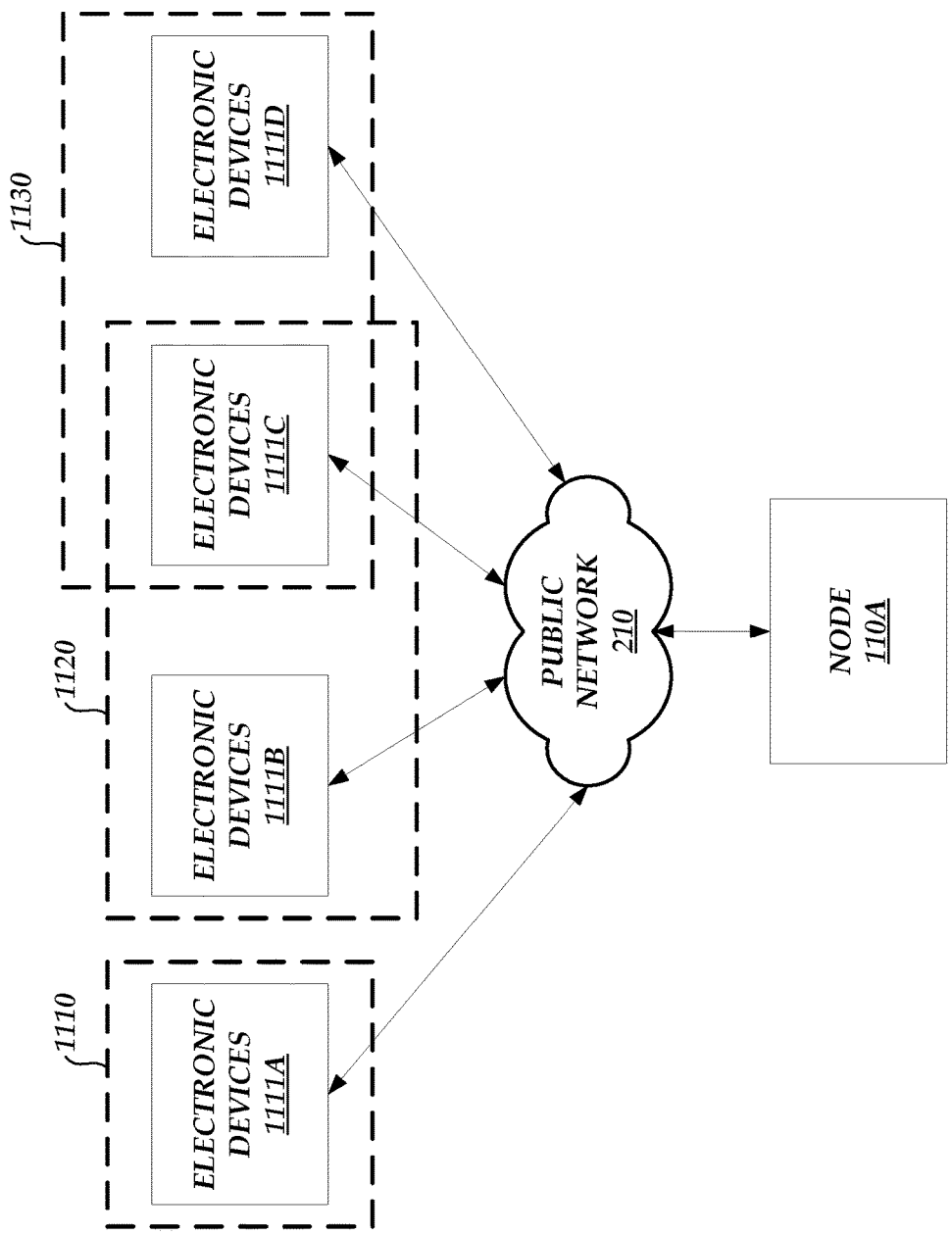
FIG. 11 illustrates a grouping of IoT devices into various device worlds.

FIG. 11 illustrates a grouping of electronic devices 1111A-D into various device worlds 1110, 1120, and 1130. As illustrated in FIG. 11, electronic device 1111A is assigned to device world 1110, electronic devices 1111B-C are assigned to device world 1120, and electronic devices 1111C-D are assigned to device world 1130. Thus, electronic device 1111C is assigned to two different device worlds. In such a situation, the device world 1120 and 1130 global parameters may be set such that the values do not conflict. Alternatively or in addition, as described in greater detail below with respect to FIGS. 13E-13G, a multi-level device world can be set up such that a device world acts as a parent device world and each of the device worlds 1120 and 1130 act as a child device world of the parent device world. The parent device world can have a set of global parameters, and the world parameters assigned to the device worlds 1120 and 1130 may be restricted to values that are consistent with the set global parameter values of the parent device world.

In an embodiment, the node 110A periodically polls the electronic devices 1111A-D to determine the current device settings. The node 110A can poll the electronic devices 1111A-D directly via the public network 210, directly via the cellular network 220, and/or indirectly via the server 230 and the private network 240. The node 110A can poll the electronic devices 1111A-D at regular intervals (e.g., every 5 ms, every 1 second, every 5 minutes, etc.), at times that are determined based on the type of electronic device and/or how sensitive the electronic device or the system that the electronic device monitors is to change (e.g., a thermostat may be polled every 5 minutes, whereas a heart rate monitor or a pressure sensor of a pipeline may be polled every 10 ms), on request by a user, and/or the like.

The node 110A (e.g., the one or more processing servers 206) can receive data transmitted by the electronic devices 1111A-D (e.g., current device settings) in response to the polling and compare such data to the defined device attributes and/or the global parameters to determine whether the respective electronic device 1111A-D is operating as expected. If the values of the current device settings fall outside of the defined device attributes and/or the global parameters, then the node 110A (e.g., the one or more processing servers 206) can take action. For example, the one or more processing servers 206 can generate an alert or notification indicating the issue with the identified electronic device 1111A-D. The alert or notification can be displayed in a user interface generated by the one or more processing servers 206 and viewed by the user. The alert or notification can be transmitted to the router 202 for transmission to a user device operated by the user (e.g., computer, mobile device, tablet, etc.) as an electronic message (e.g., a text message, a chat message, etc.). Alternatively or in addition, the alert or notification can be transmitted to the router 202 for transmission to a server that stores electronic messages accessible by the user (e.g., an email server). As another example, the one or more processing servers 206 can generate an instruction to be transmitted to the identified electronic device 1111A-D and/or the server 230 managing the identified electronic device 1111A-D that causes the identified electronic device 1111A-D to adjust its behavior such that the current device settings fall within the defined device attributes and/or the global parameters. Furthermore, if the node 110A does not receive a response from an electronic device 1111A-D in response to the polling after a set period of time (e.g., 5 seconds, 1 minute, etc.), the node 110A (e.g., the one or more processing servers 206) may assume that the current device settings fall outside of the defined device attributes and/or the global parameters and proceed as described above.

Figure 12A:
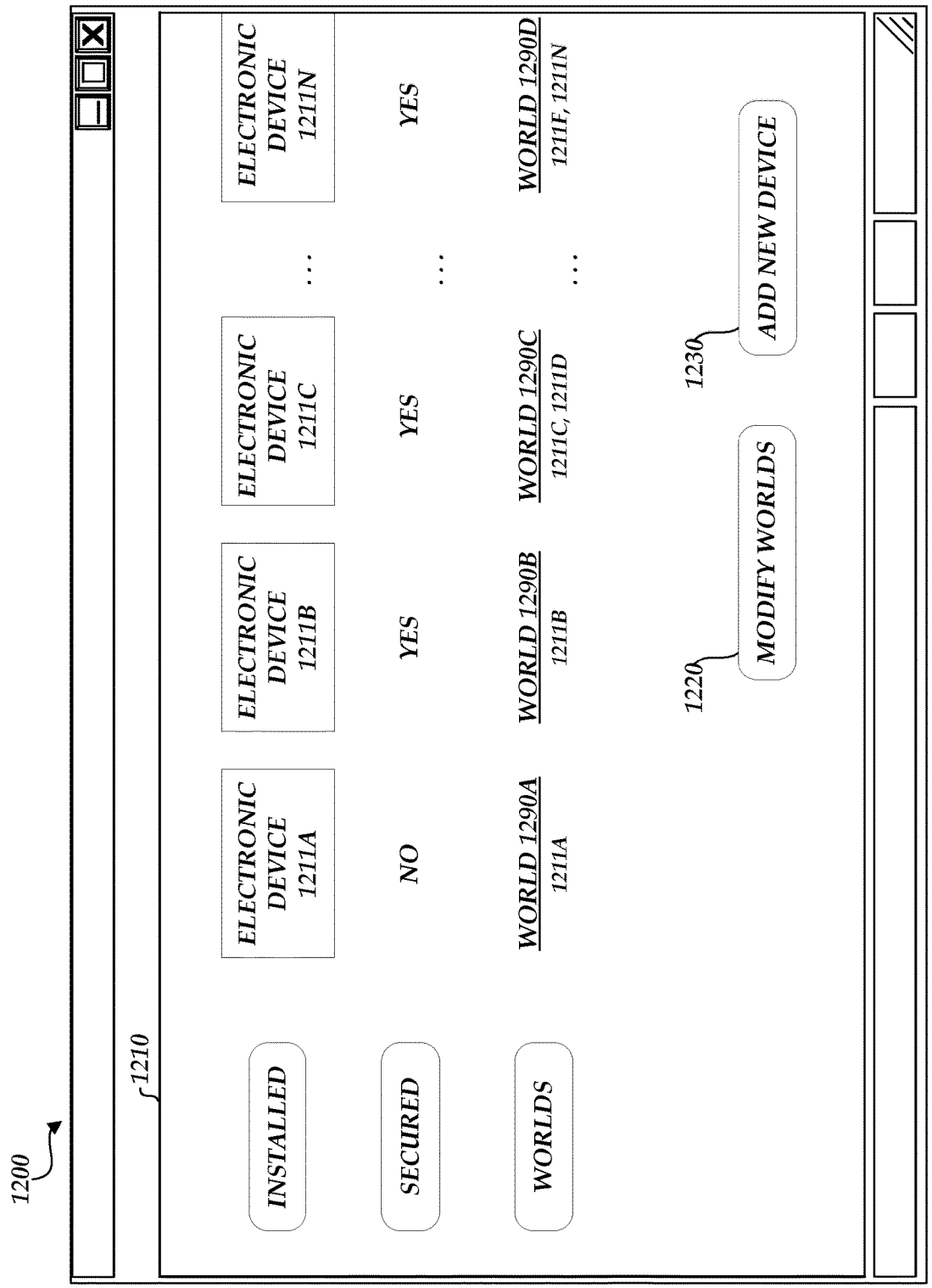
FIGS. 12A-12C illustrate a user interface depicting the configuration of an IoT device.
Figure 12B:
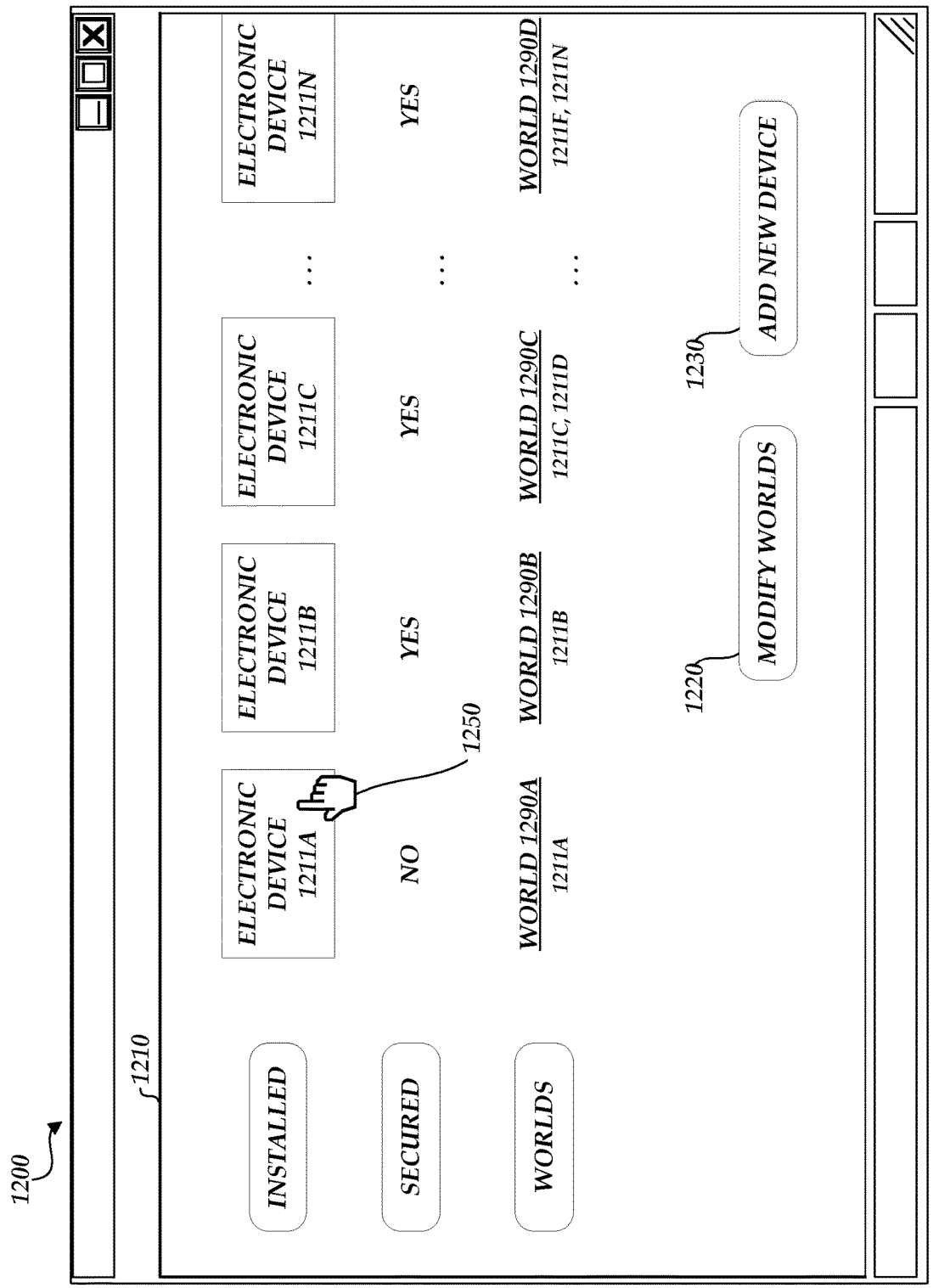
Figure 12C:
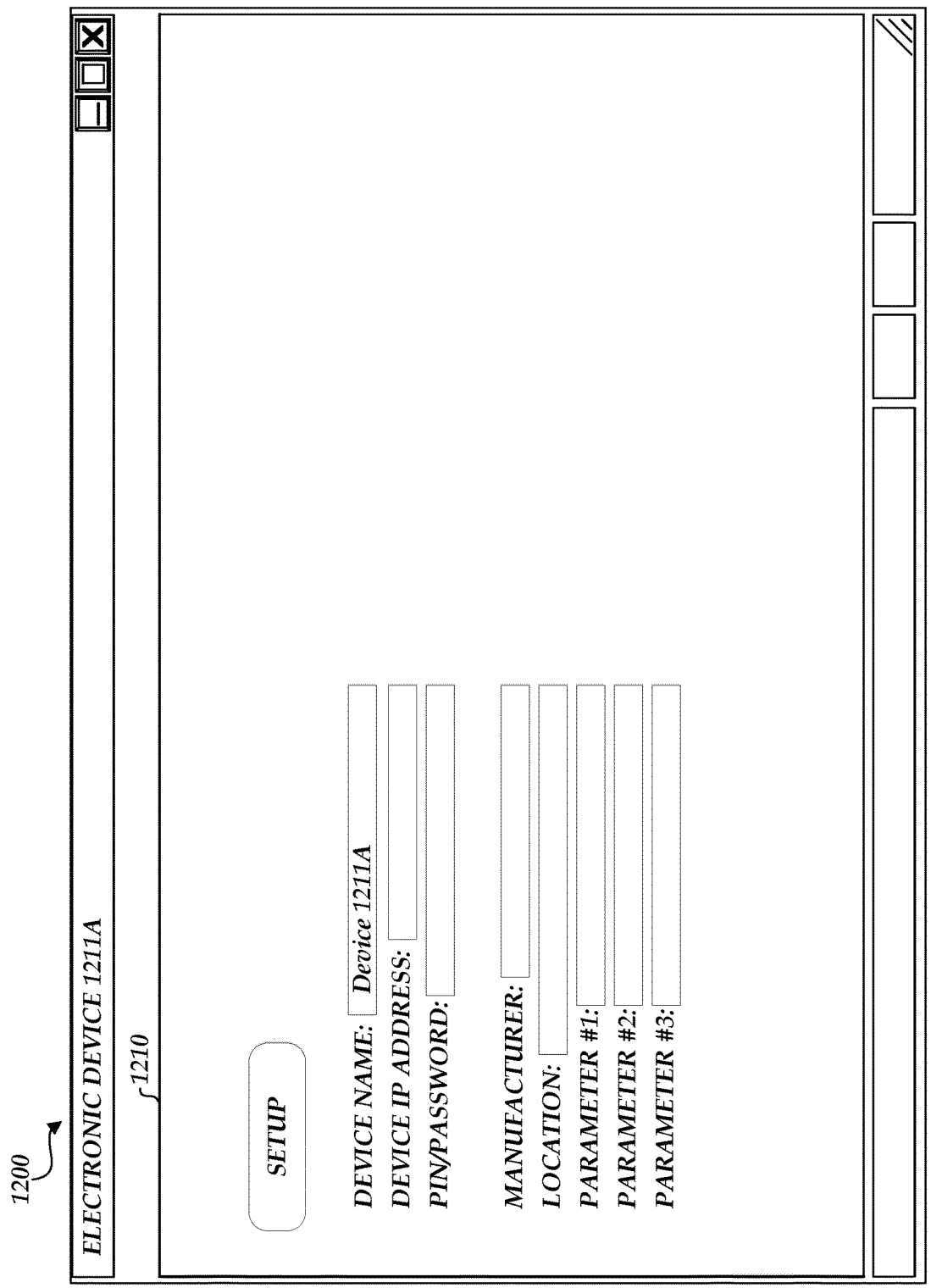

FIGS. 12A-12C illustrate a user interface 1200 depicting the configuration of an IoT device, such as one or more of the electronic devices 1211A-N. The user interface 1200 can be generated by any of the nodes 110A-N (e.g., the one or more processing servers 206) when a user accesses the respective node 110A-N to configure and store device attributes for an electronic device. As illustrated in FIG. 12A, the user interface 1200 includes a window 1210 that displays a list of selectable installed electronic devices 1211A-N (e.g., electronic devices for which a user has already gone through a set up process so that the node 110A-N understands how to access the electronic device for polling purposes and what the defined device attributes and/or global parameters should be), an indication of whether each installed electronic device 1211A-N is secured (e.g., whether an electronic device 1211A-N can be accessed without a username and password or other such security feature), and an indication of to which device world(s) 1290A-D the respective electronic device 1211A-N is assigned.

The window 1210 further displays a modify worlds button 1220 and an add new device button 1230. The modify worlds button 1220, when selected, allows a user to modify the global parameters or other settings of a device world 1290A-D, as illustrated in FIGS. 13B-13G. The add new device button 1230, when selected, allows a user to set up a new electronic device and the user interface displayed may be similar to the user interface 1200 illustrated in FIG. 12C.

As illustrated in FIG. 12B, a user, using cursor 1250, selects electronic device 1211A. Selection of any electronic device 1211A-N allows a user to enter and/or modify the electronic device 1211A-N identification information, the login information, and the defined device attributes of the respective electronic device 1211A-N, as illustrated in FIG. 12C. For example, the user can enter or modify a device name (e.g., here, device 1211A was entered), a device physical, logical, and/or network address (e.g., a MAC address, an IP address, etc.), a username (not shown), a pin/password, a manufacturer name, a location of the electronic device 1211A (e.g., a virtual or geographic location), and one or more device attributes or parameters.

The device name, address, username, pin/password, manufacturer, and/or location information can be used by the node 110A to access the electronic device 1211A for polling purposes and/or to change device settings. While three fields are depicted in the window 1210 for entering device attribute or parameter information, this is not meant to be limiting. The user may be provided with an opportunity to set any number of device attributes or parameters (e.g., 0, 1, 2, 3, 4, 5, 6, 7, etc.). As described above, these attributes or parameters can be any values or settings (or range of values or settings) that define the behavior or operation of the electronic device 1211A. For example, the attributes or parameters can be a temperature setting (e.g., 75 degrees), a time interval for measuring a physical parameter like voltage, current, pressure, etc. (e.g., every 50 ms), a time or date to turn on or shut off (e.g., Oct. 1, 2015, Saturday, 7 pm, etc.), and/or the like. The attributes or parameters entered in the user interface 1200 depicted in FIG. 12C are associated with the electronic device 1211A itself.

Figure 13A:
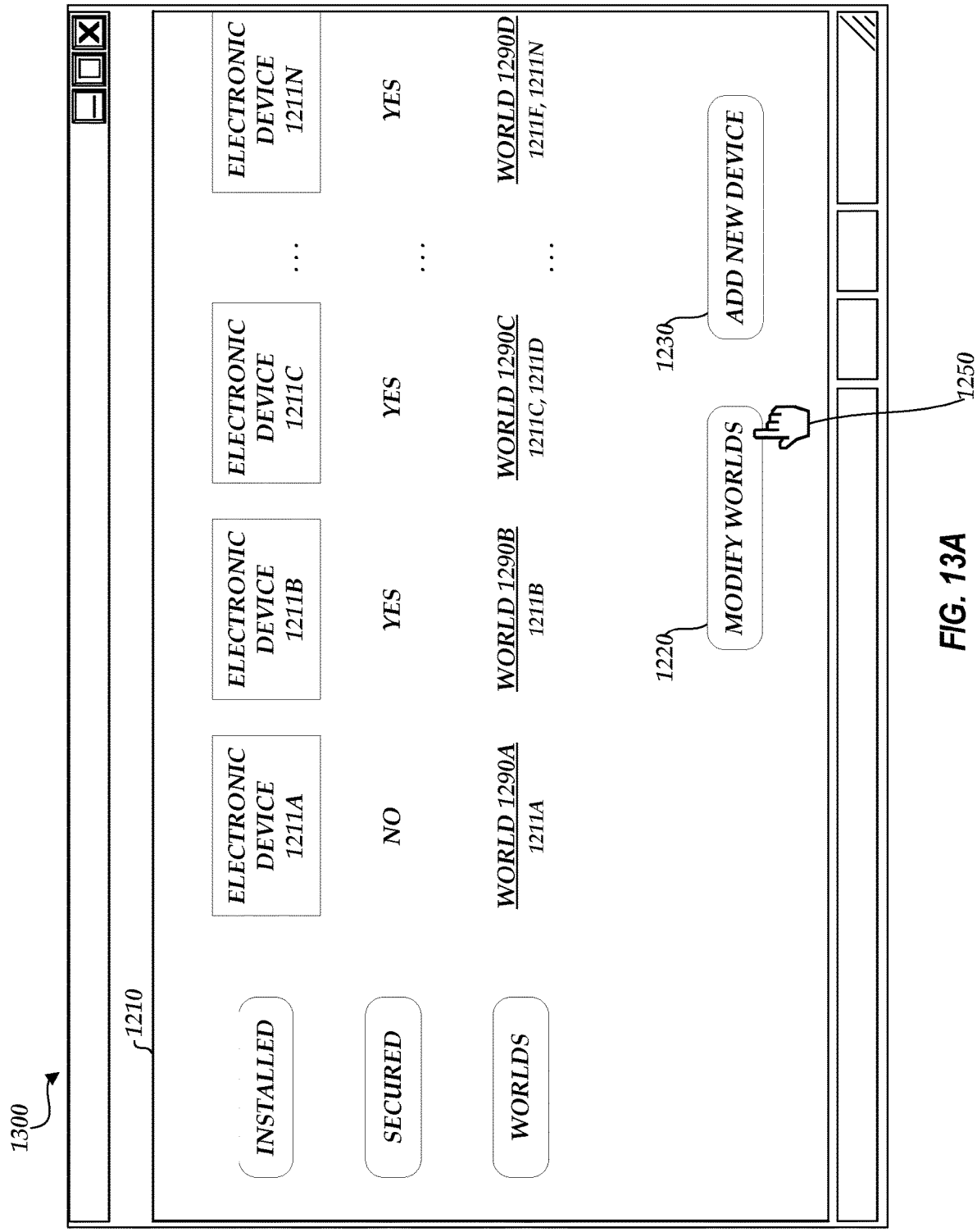
FIGS. 13A-13D illustrate a user interface depicting the configuration of a device world.
Figure 13B:
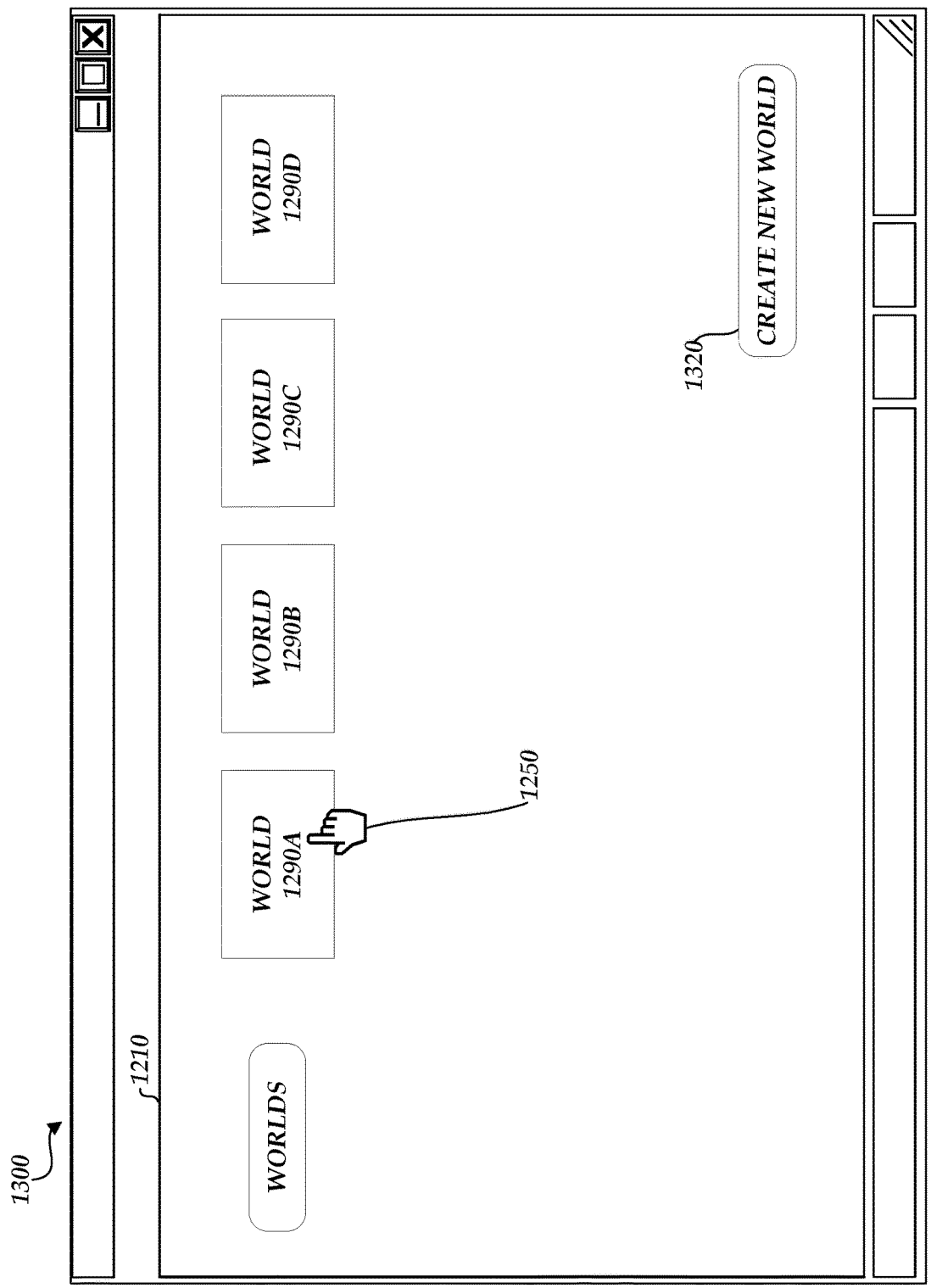

FIGS. 13A-13D illustrate a user interface 1300 depicting the configuration of a device world. The user interface 1300 can be generated by any of the nodes 110A-N (e.g., the one or more processing servers 206) when a user accesses the respective node 110A-N to configure and store global parameters for a device world. As illustrated in FIG. 13A, the user interface 1300 includes the window 1210, which includes the modify worlds button 1220. When the modify worlds button 1220 is selected via the cursor 1250, the window 1210 displays a list of selectable device worlds 1290A-D that have already been set up, as illustrated in FIG. 13B. The window 1210 also displays a create new world button 1320.

Figure 13C:
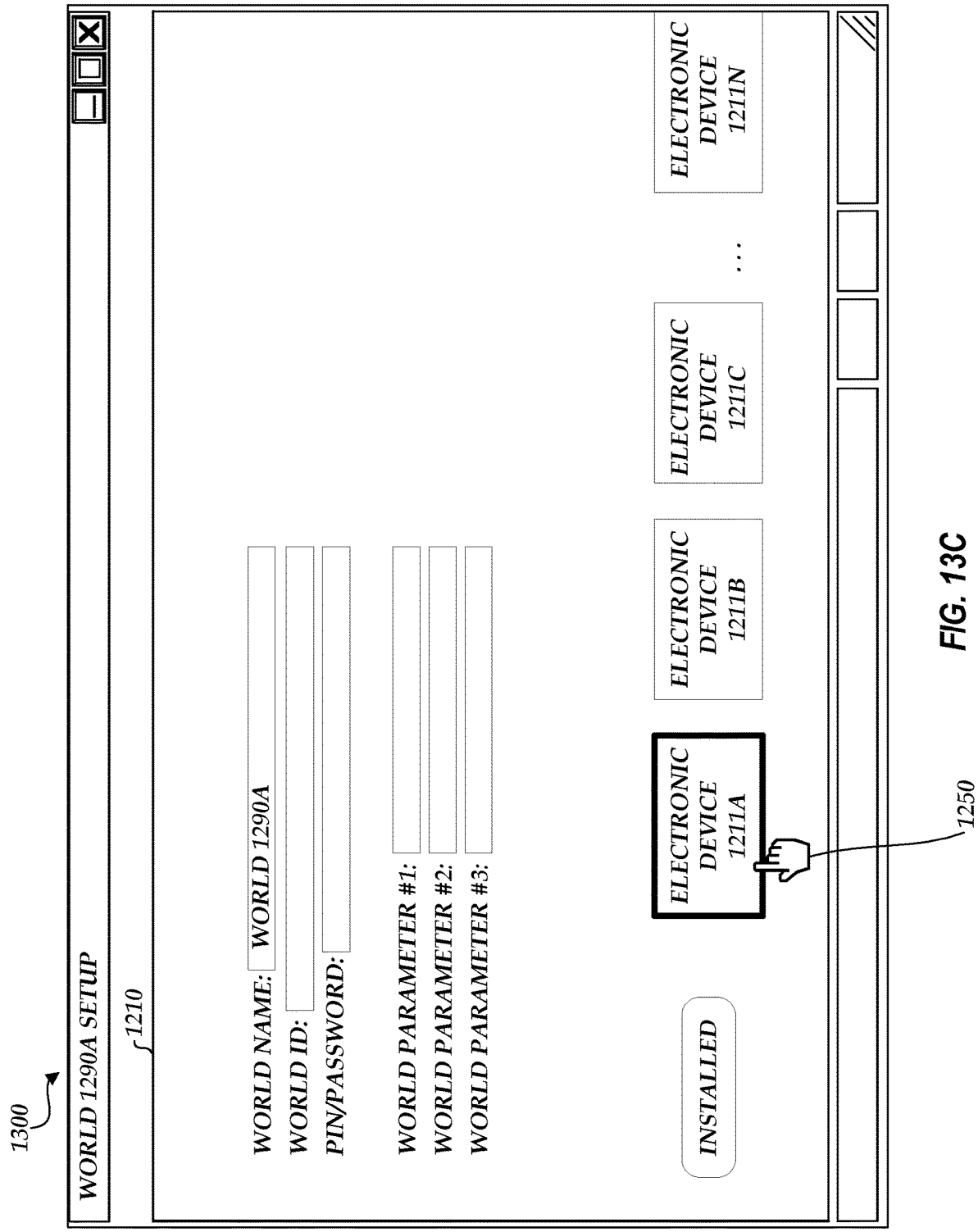

Selecting a device world 1290A-D, such as the device world 1290A, via the cursor 1250 causes the user interface 1300 to display fields that allow a user to enter and/or modify the device world 1290A identification information, the login information, and the defined global parameters of the device world 1290A, as illustrated in FIG. 13C. For example, the user can enter or modify a device world 1290A name (e.g., here, world 1290A was entered), a device world identification or username, a pin/password, and one or more global parameters.

The device world 1290A name, username, and/or pin/password can be used by the node 110A to verify that the user has access to the device world 1290A information (e.g., by prompting the user to enter such information when logging in). This information can also be used in conjunction with other factors (e.g., a fingerprint scan, a vein scan, a smart card/RFID scan, behavioral data, etc.) to verify that the user has access to the device world 1290A information. While three fields are depicted in the window 1210 for entering global parameter values, this is not meant to be limiting. The user may be provided with an opportunity to set any number of global parameters (e.g., 0, 1, 2, 3, 4, 5, 6, 7, etc.). As described above, these attributes or parameters can be any values or settings (or range of values or settings) that define the behavior or operation of a set of electronic devices that are assigned to the device world 1290A. In some embodiments, the device world 1290A inherits the attributes or parameters assigned to the individual electronic devices that are associated with the device world 1290A. In addition, the user is provided with the opportunity to define a set of global parameters that encompass the inherited attributes or parameters. For example, if a first electronic device associated with the device world 1290A has a defined parameter of operating at 77 degrees and a second electronic device associated with the device world 1290A has a defined parameter of operating at 80 degrees, the user can set a global parameter that defines a range of acceptable temperature values (e.g., between 75 and 80 degrees).

Selecting a device world 1290A-D, such as the device world 1290A, via the cursor 1250 also causes the user interface 1300 to display a list of selectable available electronic devices 1211A-N (e.g., electronic devices that have already been set up for polling and/or behavior manipulation) that can be assigned to the device world 1290A. As an example in FIG. 13C, electronic device 1211A is selected and assigned to the device world 1290A.

Furthermore, any of the electronic devices 1211A-N can be selected to view the parameters that would be (if the electronic device is not assigned to the device world 1290A yet) or are (if the electronic device is assigned to the device world 1290A already) inherited by the device world 1290A. For example, if the electronic device 1211A is selected via the cursor 1250, the window 1210 displays the device attributes or parameters of the electronic device 1211A that have been inherited by the device world 1290A as global parameters, as illustrated in FIG. 13D.

Figure 13D:
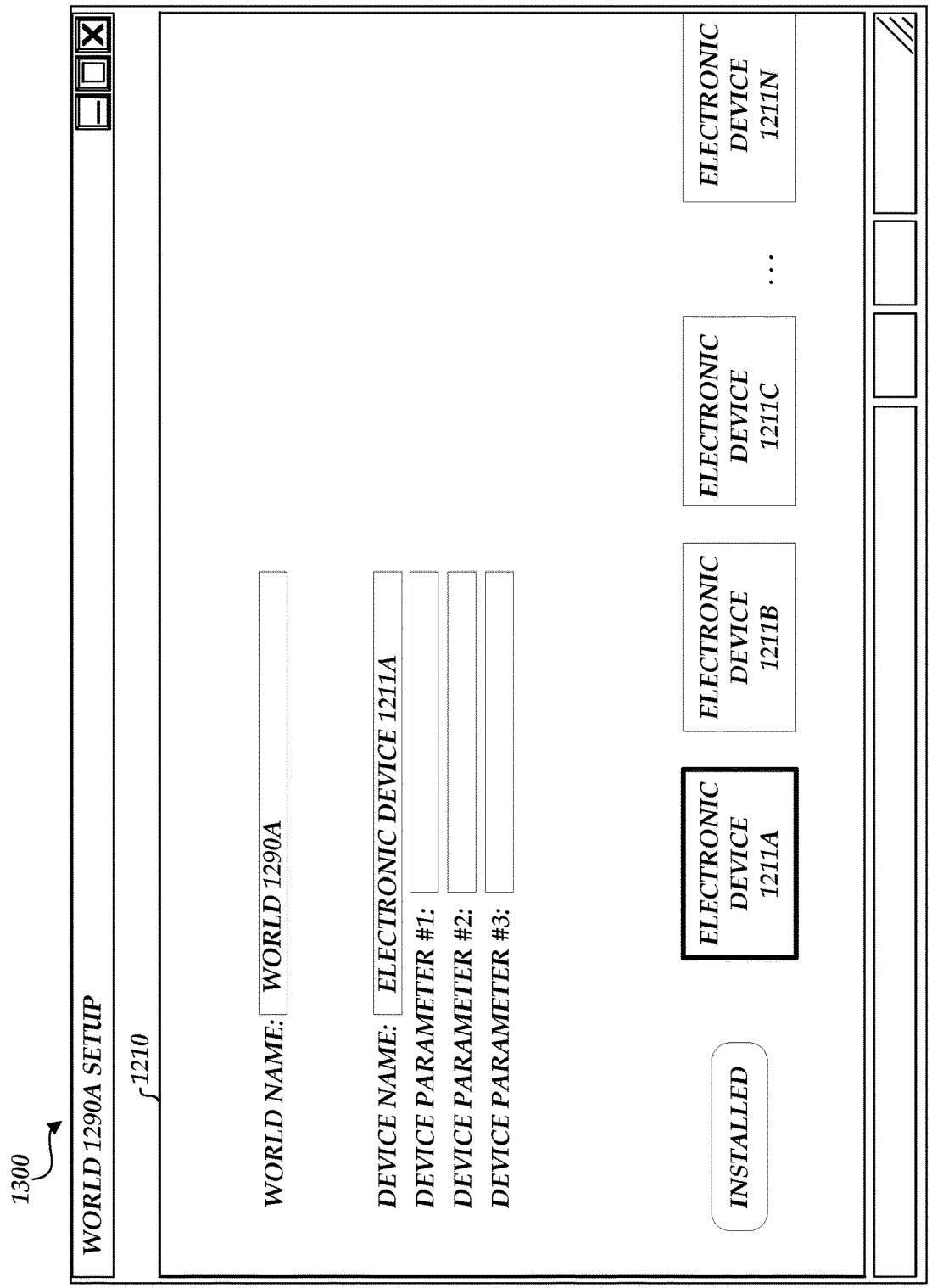
Figure 13E:
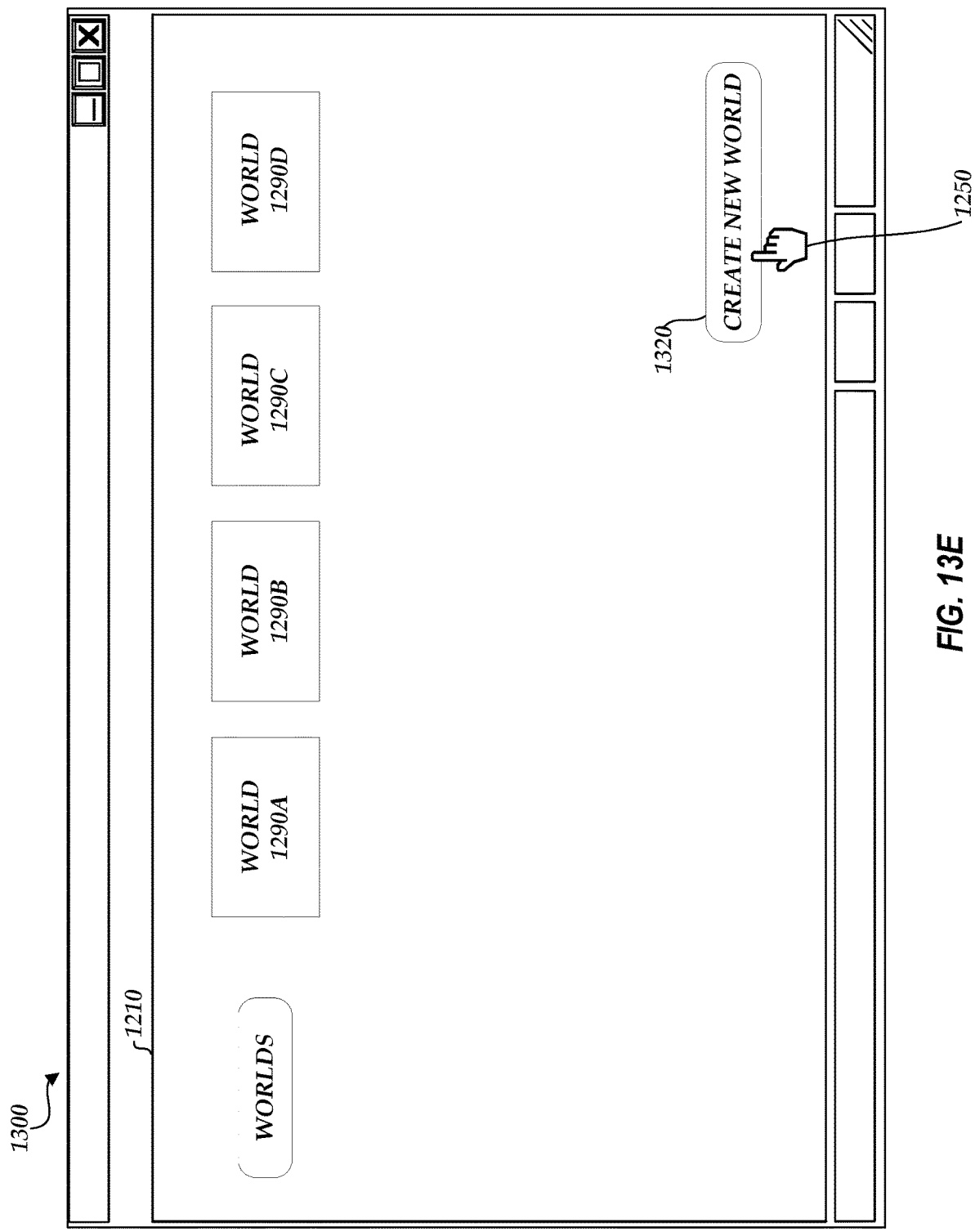
FIGS. 13E-13G illustrate a user interface depicting the configuration of a multi-level device world.
Figure 13F:
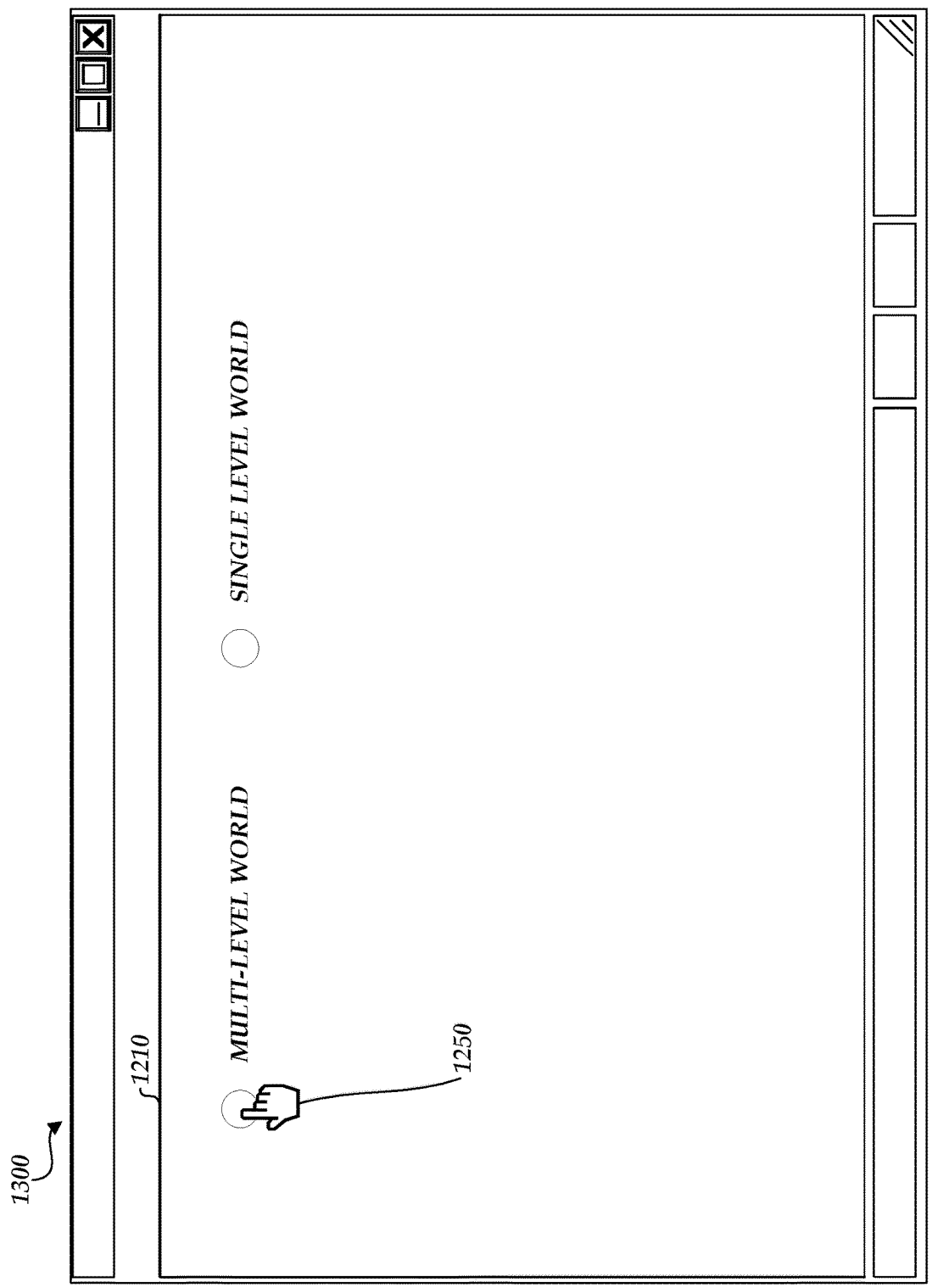
Figure 13G:
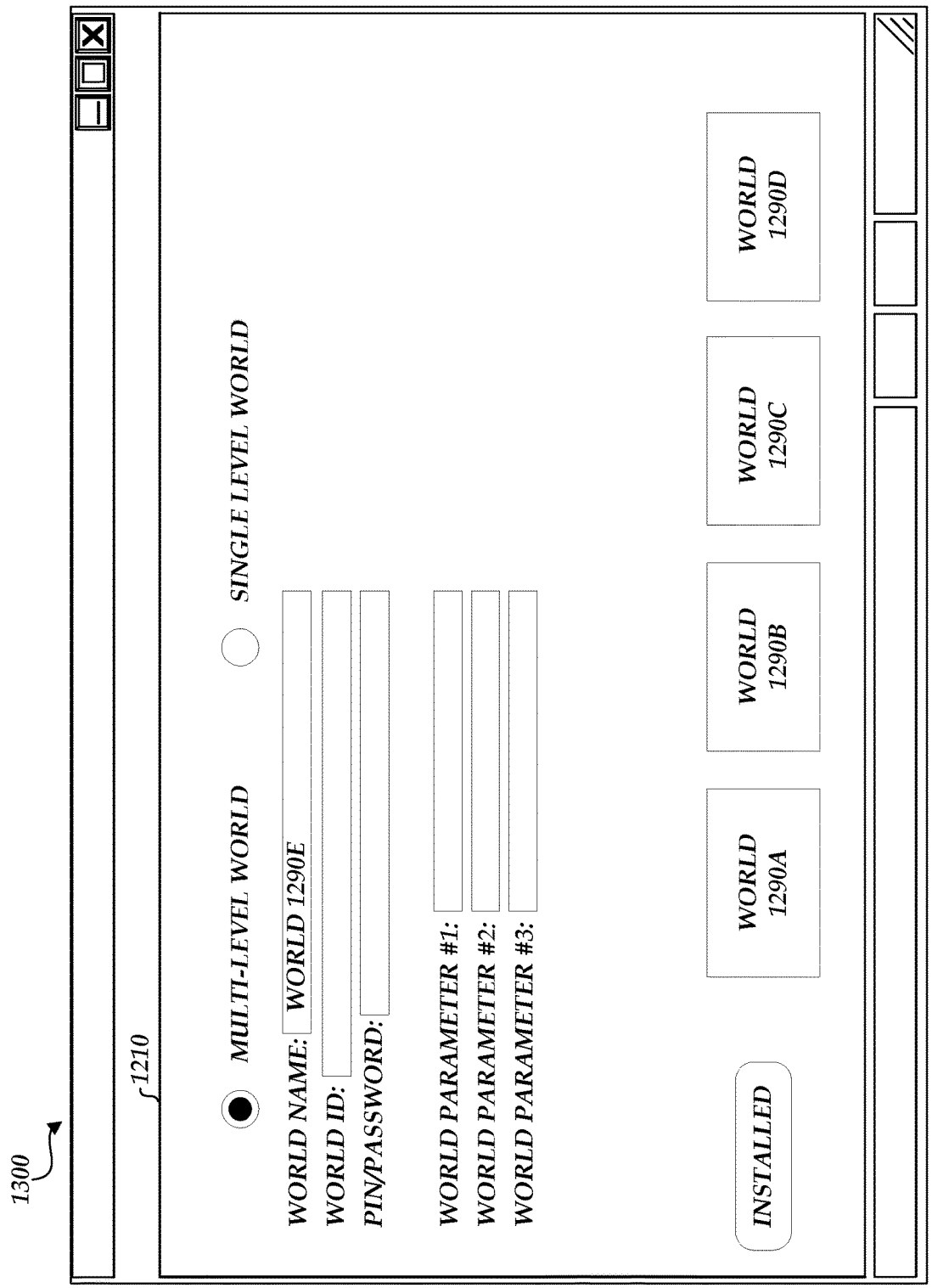

FIGS. 13E-13G illustrate the user interface 1300 depicting the configuration of a multi-level device world. As illustrated in FIG. 13E, the user can select the create new world button 1320 via the cursor 1250. Selection of the create new world button 1320 causes the user interface 1300 to display two options, as illustrated in FIG. 13F: multi-level world or single level world. A multi-level device world is a hierarchical tier of device worlds, where the global parameters of a parent device world govern the global parameters of a child device world. A single level device world is a device world in which the device world has no parent or child device worlds (e.g., the device world is just associated with global parameters that govern the operation of the electronic device assigned to the device world).

Selection of the single level world option causes the user interface 1300 to display information similar to the information displayed in FIG. 13D. Selection of the multi-level world option causes the user interface 1300 to display content as illustrated in FIG. 13G. For example, the window 1210 displays fields that allow a user to enter and/or modify the device world identification information, the login information, and the defined global parameters of the device world. For example, the user can enter or modify a device world name (e.g., here, world 1290E is entered), a device world identification or username, a pin/password, and one or more global parameters (e.g., where the global parameters are inherited from the child device worlds and/or set by the user in a manner that is consistent with the global parameters of the child device worlds).

Selecting the multi-level world option also causes the user interface 1300 to display a list of selectable available device worlds 1290A-D (e.g., device worlds that have already been set up) that can be assigned to be child device worlds of the newly created device world (e.g., the device world 1290E). The user can repeat this process described in FIGS. 13E-13G to create any number of parent device worlds.

Example Process for Securely Monitoring an Electronic Device

Figure 14:
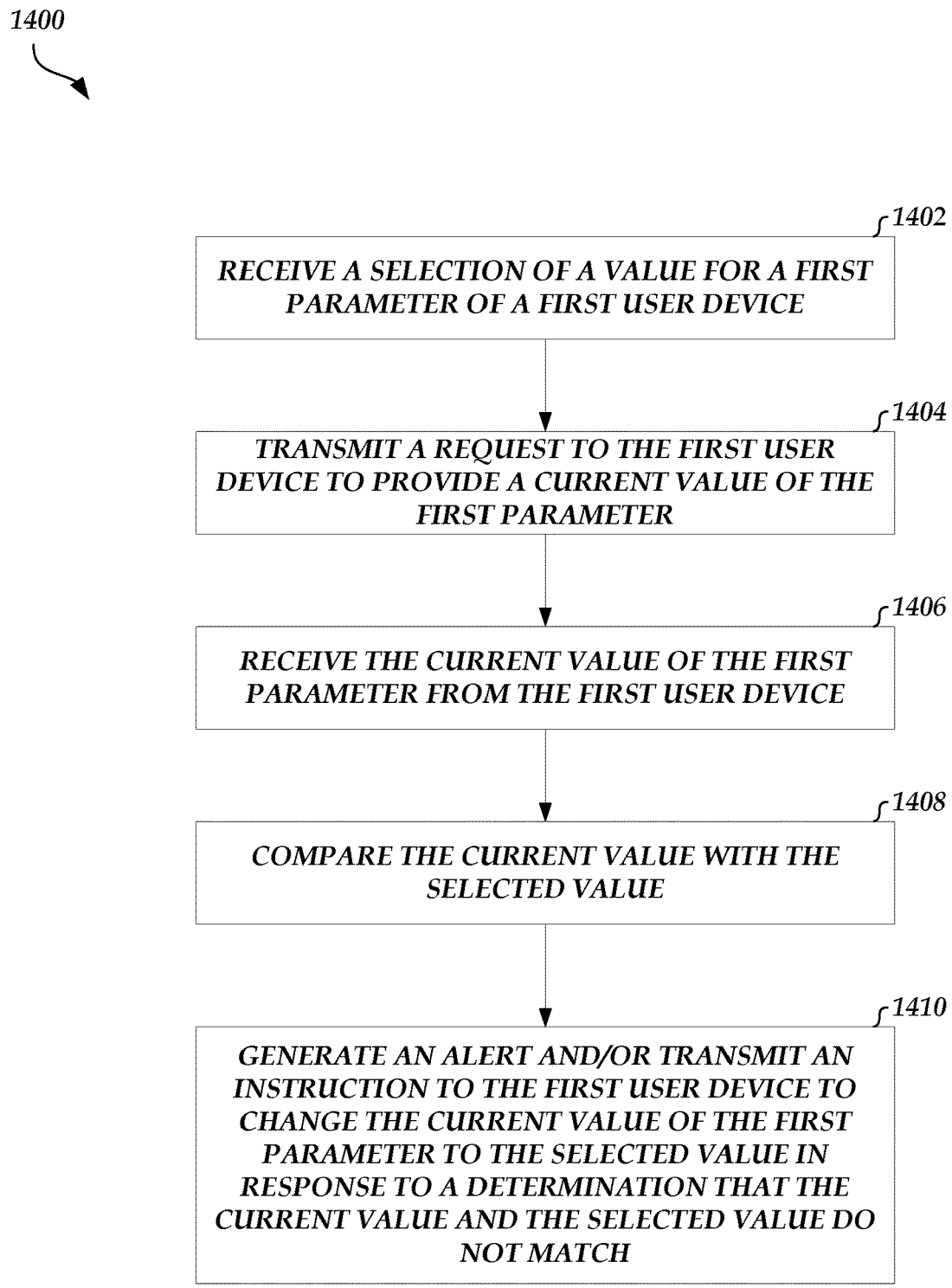
FIG. 14 illustrates a process that may be implemented by a node of FIG. 1 to monitor changes in the parameters of an IoT device.

FIG. 14 illustrates a process 1400 that may be implemented by any of the nodes 110A-N to monitor changes in the parameters of an IoT device, such as one of the electronic devices 211, 311, 411, 1111, or 1211. For example, the process 1400 can be implemented by the one or more processing servers 206. The process 1400 begins at block 1402.

At block 1402, a selection of a value for a first parameter of a first user device (e.g., IoT or electronic device) is received. For example, a user can provide an attribute or parameter for the first user device that represents a desired setting or mode of behavior for the first user device. The provided first parameter can be stored in the one or more storage servers 208 (e.g., in a portion of an SED associated with the user and/or the first user device).

At block 1404, a request is transmitted to the first user device to provide a current value of the first parameter. For example, the one or more processing servers 206 can generate a polling message and the node 110A-N can transmit the polling message via the router 202 and one of the public network 210, the cellular network 220, or the private network 240 directly to the first user device or to a server managing the first user device (e.g., the server 230) to receive the current value.

At block 1406, the current value of the first parameter is received from the first user device. For example, the current value of the first parameter can be received by the router 202 and forwarded to the one or more processing servers 206. The current value is received directly from the first user device if the node 110A-N is in direct communication with the first user device via the public network 210 or the cellular network 220. The current value is received indirectly from the first user device via the server 230 (e.g., the server 230 can poll the first user device and store the current parameter values) if the node 110A-N is in direct communication with the server 230 via the private network 240.

At block 1408, the current value is compared with the selected value. For example, the selected value can be stored in the one or more storage servers 208. The one or more processing servers 206 can retrieve the selected value from the one or more storage servers 208 and compare the selected value to the current value. The comparison yields a match if the current value and the selected value are identical or if the current value falls within a range defined by the selected value.

At block 1410, an alert is generated and/or an instruction is transmitted to the first user device to change the current value of the first parameter to the selected value in response to a determination that the current value and the selected value do not match. For example, the one or more processing servers 206 can generate the instruction and the router 202 can transmit the instruction (e.g., after the instruction is transmitted from the one or more processing servers 206 to the switch 212, the firewall 204, the active threat detector 203, and the router 202). The instruction can be transmitted to the server 230 for relay by the server 230 to the first user device if the node 110A-N is in direct communication with the server 230 via the private network 240.

Virtual Clouds

FIG. 15 illustrates a block diagram of an environment for accessing applications operating within the multi-node environment of FIG. 1. As illustrated in FIG. 15, one or more user devices 1511 can communicate with a node 110 (e.g., any of nodes 110A-N) via the public network 210 (and/or cellular network 220). A user device 1511 can be a computing device, such as an IoT device (e.g., similar to the electronic device 211) or a non-IoT device (e.g., a desktop, laptop or tablet computer, personal computer, wearable computer, server, personal digital assistant (PDA), hybrid PDA/mobile phone, mobile phone, electronic book reader, set-top box, voice command device, camera, digital media player, etc.). The user device 1511 can execute a local application (also referred to herein as a "virtual cloud" application, which may be a browser, a third-party application, etc.) that allows a user operating the user device 1511 to access and use applications executing within the node 110.

For example, a user operating the user device 1511 can launch the local application. Once launched, the local application may generate and display a user interface prompting the user to provide one or more user credentials for authentication (e.g., username, password, security answer, fingerprint, vein reading, iris scan, digital certificate, security token, etc.). The local application can transmit the user credential(s) to the node 110 for authentication (e.g., to the processing server 206 via the SIEM system 201 and the switch 212, where an authentication component in the processing server 206, not shown, performs the authentication). If the provided user credential(s) are authenticated, the node 110 optionally can prompt the user to provide a second (and/or third, fourth, etc.) authentication factor (e.g., user credentials other than the user credentials already provided).

Once the node 110 has authenticated the provided user credential(s) and any secondary authentication factors, the user device 1511 is granted access to a container or other virtual computing environment in which virtual computing resources can be allocated to a user or user device 1511 (e.g., a virtual machine instance). For example, a container may be a logical unit that can be utilized to isolate execution of a task from other processes executing in the same environment. As an illustrative example, the processing server 206 may run an operating system (OS), and multiple containers can execute in the processing server 206 and share the same OS. The processes executed by each container, however, may be isolated from one another. Each container may be formed from one or more container images and a top container layer. Each container image may further include one or more image layers, where each image layer represents an executable instruction. Any changes made to the container can be stored in the top container layer. The executable instructions that form the image layers may be code, runtime, system tools, system libraries, and/or the like that can be executed to run applications, such as text editors, email clients, messaging applications, browser applications, image processing applications, camera applications, video applications, file manager applications, contact applications, calculator applications, clock applications, voice call applications, and/or the like.

Each container may be associated with an individual user or user device 1511. In some embodiments, the processing server 206 initializes one or more containers, each as a standalone executable. Thus, the initialized containers can share the same OS (e.g., the OS running on the processing server 206). In other embodiments, the processing server 206 hosts one or more virtual machine instances, where one or more containers are initialized within each virtual machine instance. A virtual machine instance may emulate a physical computer and run an OS and applications using virtual memory, where the virtual memory corresponds to physical memory of a physical computing device allocated to the virtual machine instance. Each virtual machine instance may run an OS, and thus each container initialized in a virtual machine instance may share the OS of the virtual machine instance. In still other embodiments, the processing server 206 hosts one or more virtual machine instances, and no containers are initialized in the virtual machine instances. Rather, each virtual machine instance is associated with an individual user or user device 1511 and can run applications, such as text editors, email clients, messaging applications, browser applications, image processing applications, camera applications, video applications, file manager applications, contact applications, calculator applications, clock applications, voice call applications, and/or the like.

The first time a user or user device 1511 successfully authenticates with the node 110, virtual instance executor 1564 within the processing server 206 initializes a virtual instance (e.g., a standalone container, a virtual machine instance, etc.) associated with the user or user device 1511. The virtual instance executor 1564 provides a virtual computing environment in which multiple virtual instances can be initialized. The virtual instances may be independent and/or isolated such that data managed by a virtual instance is not shared or accessible by other virtual instances.

Users and/or user device 1511 (and/or the corresponding user credentials) may be associated with permissions that define the types of applications that can be accessed via the node 110. The permissions may be based on the user's security clearance, access level, assigned permissions, and/or the like. For example, applications data store 1582 in storage server 208 may store source files for one or more applications (e.g., text editors, email clients, messaging applications, browser applications, image processing applications, camera applications, video applications, file manager applications, contact applications, calculator applications, clock applications, voice call applications, etc.). Permissions (which may be stored in a permissions data store in the storage server 208, in the processing server 206, or in another component of the node 110, not shown) may define which applications a user or user device 1511 can access and/or a level of access. For example, permissions may define that a first user or user device 1511 can use a text editor application to read and/or write text files. The permissions may also define that a second user or user device 1511 can use a text editor application only to read text files. The permissions may further define that a third user or user device 1511 cannot access the text editor application at all.

When initializing a virtual instance, the virtual instance executor 1564 may instruct application retriever 1562 in the processing server 206 to retrieve the source files of some or all applications to which a user or user device 1511 has access. The application retriever 1562 can query the permissions data store to identify the applications and/or a level of access to the applications to which the user or user device 1511 is permitted access. Based on the results of the query, the application retriever 1562 can query the applications data store 1582 for the source files of some or all of the applications to which the user or user device 1511 is permitted access. The application retriever 1562 can then forward the source files to the virtual instance executor 1564, and the virtual instance executor 1564 can initialize the virtual instance with the retrieved application source files. In particular, the virtual instance executor 1564 may initialize the virtual instance such that the virtual instance can run the applications corresponding to the source files at various access levels as determined by the permissions. Thus, the virtual instance, once initialized, provides a virtual computing environment in which the applications corresponding to the retrieved source files can be used to read and/or write data, receive and/or transmit information, and/or perform other similar actions.

Once initialized, the user device 1511 can communicate with the processing server 206 via the SIEM system 201 and the switch 212 to use applications, create and/or modify files, and/or the like. In particular, the local application may provide an interface through which the user operating the user device 1511 can view and use applications executing in a virtual instance, create and/or modify files using a virtual instance, and/or the like. The application(s) available to the user operating the user device 1511 may be restricted to those applications to which the user has permission to access. For example, the local application may display a virtual desktop or start screen that displays a list of applications that the user and/or user device 1511 can access. The applications may appear to be available or running locally on the user device 1511, but are in fact available or running in the virtual instance initialized by the virtual instance executor 1564. Like with any OS running natively on a user device, the user can provide touch inputs (e.g., swipes, gestures, virtual keyboard inputs, etc.) and/or inputs via physical buttons using the user device 1511 to open or close an application, enter text, transmit and/or receive information, save or open files, etc.

However, no source data is actually communicated between the user device 1511 and the processing server 206. For example, if a user opens a file using a text editor running in the initialized virtual instance, the file itself is not transmitted from the processing server 206 to the user device 1511 (nor is any temporary version of the file). Any communications over a network (e.g., such as the public network 210 and/or the cellular network 220), even if encrypted, may be susceptible to compromise. For example, a malicious device can sniff data packets transmitted between a node 110 and a user device 1511, potentially compromising the data present in the data packet. In addition, user devices 1511 often store data locally that can be recovered by a sophisticated actor, even if a user attempts to delete such data from memory beforehand. If a user device 1511 is compromised (e.g., the unlocking passcode or mechanism is known, the device is not patched with the latest security updates, malware is installed, viruses are present, etc.) or lost, sensitive data stored locally on the device may be exposed. This can be especially problematic if the user device 1511 is used to access sensitive and/or confidential data stored locally in the node 110.

To reduce the likelihood that user data becomes compromised in situations in which the public network 110 and/or cellular network 220 is unsecure and/or a user device 1511 is compromised or lost, the processing server 206 does not transmit any source user data to the user device 1511 via the SIEM system 201, the switch 212, and the public network 210 (and/or the cellular network 220). In fact, the processing server 206 may not transmit source user data outside of the nodes 110A-N at all. Rather, source user data may remain stored in user data store 1584 in the storage server 208 and may only be accessed by the virtual instance executor 1564 (e.g., the individual virtual instances that create, modify, and/or delete source user data). However, to enable users to access and modify source user data using a device remote from the nodes 110A-N and/or otherwise outside of a secure computing environment (e.g., the user device 1511), the virtual instance executor 1564 generates and transmits a graphical representation (e.g., a representation that does not itself include any text data, but includes pixel-level image data of a screenshot image in which text may be displayed) of the virtual instance to the user device 1511 for display within the local application. For example, the virtual instance executor 1564 can transmit screenshots of a virtual instance (e.g., images), instructions for rendering an image representing a graphical view of the virtual instance, and/or other data that causes the local application running on the user device 1511 to render a user interface displaying the virtual instance. The graphical representation can also include multiple images and/or tiles that correspond to different respective portions of a display screen.

The virtual instance executor 1564 can generate and transmit a graphical representation of the virtual instance each time an action is performed that causes a graphical view of the virtual instance to change. For example, the virtual instance executor 1564 may initially transmit a graphical representation of the virtual instance to the user device 1511 once the virtual instance is initialized. The user, using the user device 1511, may then provide a command to open an email client (which the user may have permission to access). The virtual instance executor 1564 can receive the command from the user device 1511, instruct the initialized virtual instance to open the email client, generate a graphical representation of the virtual instance with the email client open, and transmit the graphical representation to the user device 1511. This graphical representation may include a graphical representation of text shown within the email client, and the user may perceive the display as if no conversion to an image format has occurred. If the user, using the user device 1511, then provides an input to scroll down through a list of emails, then the virtual instance executor 1564 can receive the input from the user device 1511, instruct the initialized virtual instance to scroll down through a list of emails in the email client, generate a graphical representation of the virtual instance after the scrolling is complete, and transmit the graphical representation to the user device 1511.

When the user device 1511 receives a new graphical representation from the virtual instance executor 1565, the local application running on the user device 1511 can stop displaying a previous graphical representation and begin displaying the new graphical representation. Optionally, the local application may delete the previous graphical representation. By deleting the previous graphical representations, the user device 1511 may further limit the amount of sensitive and/or confidential data stored locally. For example, while source user data may not be transmitted by the virtual instance executor 1564 to the user device 1511, the graphical representation of the virtual instance may nonetheless include a graphical representation of a portion of the source user data. Deleting previous virtual instance graphical representations may then control how much of the source user data is potentially exposed.

By running applications in virtual instances, the virtual instance executor 1564 provides additional technical benefits. For example, because applications are run in virtual instances at access levels determined by the permissions and the applications displayed to and available to a user are only those applications to which the user is permitted to access (as determined by the permissions), an administrator does not have to manage each user device 1511 operated by a user. Rather, the administrator can manage user accounts (e.g., by assigning specific applications to specific users, by assigning specific users to specific permission levels, by assigning specific applications to specific permission levels, and/or any combination thereof) and the appropriate applications are automatically available to the user via the user device 1511 once a user logs in.

As another example, network conditions (e.g., interference, volume of users, etc.) may result in a poor connection between the user device 1511 and the node 110. In some instances, the user device 1511 may disconnect from the node 110 due to the poor connection. In conventional systems, such as remote desktop applications, the user would lose an operating state in these situations. In other words, if the user opened two applications and configured the remote desktop display settings in a certain way, a disconnection would result in the two applications no longer being open and the remote desktop display settings being reset once the user reconnected.

However, the virtual instance executor 1564 can maintain the user's operating or access state, even if the user device 1511 disconnects from the node 110. For example, the virtual instance executor 1564 can continue operating a virtual instance even if a disconnection occurs (e.g., the virtual instance executor 1564 can decline to deallocate virtual computing resources devoted to the virtual instance) and/or can store container image(s) and/or a top container layer corresponding to a container in the user data store 1584 (in embodiments in which the virtual instance includes a container). The virtual instance executor 1564 can continue operating the virtual instance indefinitely or for a threshold period of time after a disconnection. If the user device 1511 later reconnects with the node 110, the virtual instance executor 1564 can optionally retrieve and re-initialize the container image(s) and/or top container layer (in embodiments in which the virtual instance includes a container). The virtual instance executor 1564 can then generate (if not generated before the disconnection) and/or transmit a graphical representation of the virtual instance to the user device 1511. Because the virtual instance is maintained and/or stored, the virtual instance remains in the state that the user last viewed before the disconnection occurred. For example, if the user had opened two applications and configured the virtual instance display settings prior to the disconnection, the two applications would remain open and the virtual instance display settings would remain in the same configuration after the reconnection. Thus, the graphical representation transmitted to the user device 1511 causes the local application to display a user interface in which it appears that the user can continue using the virtual instance where the user left off. When a user device 1511 reconnects with a node 110, the local application may prompt the user to select whether to start a new session (e.g., initialize a new virtual instance or reset a current virtual instance associated with the user or user device 1511) or continue a previous session.

If a user device 1511 is compromised or lost, the node 110 may be notified (e.g., by an administrator). In some embodiments, in response, the node 110 may deny access to the user device 1511, regardless of whether the provided user credentials can be authenticated. In other embodiments, in response, the node 110 may allow the user device 1511 access to the applications that the user or user device 1511 are permitted to access. However, the virtual instance executor 1564 may not allow the user to access user source data stored in the user data store 1584. For example, if a user attempts to open a file in an application running in the virtual instance, the virtual instance may produce an error or otherwise fail to retrieve the file. In still other embodiments, in response, the node 110 may allow the user device 1511 access to the application that the user or user device 1511 are permitted to access. The virtual instance executor 1564 may not allow the user to access any actual user source data, but the virtual instance executor 1564 may allow the user to access data that appears to be the actual user source data. The data, however, may be incorrect or fake data. The user, who may be unauthorized due to the fact that the user device 1511 is compromised or lost, may then believe that the user device 1511 is operating normally and that the unauthorized user has access to the authorized user's data. The virtual instance executor 1564 may provide incorrect or fake data in an attempt to provide authorities with additional time to track and locate a compromised or lost user device 1511.

In some embodiments, the connection between the user device 1511 and the node 110 is encrypted. Thus, the graphical representations transmitted by the virtual instance executor 1564 to the user device 1511 may be encrypted (e.g., by the virtual instance executor 1564). The local application running on the user device 1511 may have been provided with decryption keys beforehand to allow the local application to decrypt and display the received encrypted graphical representations. For example, the encryption key management system 205 may have provided the local application with the appropriate decryption keys. The local application may decrypt the encrypted graphical representation for display, but then re-encrypt the graphical representation for storage (if previous graphical representations are stored). By encrypting the graphical representations, it may be more difficult for a sophisticated actor to recover graphical representations of the virtual instance stored locally on a user device 1511 in the event that the user device 1511 is compromised or lost. In fact, even if the sophisticated actor could decrypt an encrypted graphical representation, the graphical representation likely only includes a graphical representation of a portion of the source user data rather than the entire source user data itself. Thus, the sophisticated actor may only obtain a partial view of the source user data.

In addition, the node 110 (e.g., the encryption key management system 205) may periodically change the keys used to encrypt and/or decrypt the transmitted graphical representations. Thus, some encrypted graphical representations stored on the user device 1511 may be decrypted using one key, and other encrypted graphical representations stored on the user device 1511 may be decrypted using a second key. Thus, even if an unauthorized user managed to gain access to a user device 1511 and one set of decryption keys, the unauthorized user may still not be able to access all of the graphical representations stored locally on the user device 1511 (and thus may only have a partial view of the source user data).

In further embodiments, the user device 1511 (e.g., the local application) can periodically decrypt and re-encrypt some or all of the stored graphical representations using new encryption and/or decryption keys received from the encryption key management system 205. For example, each time a new set of keys is received, the user device 1511 can decrypt stored graphical representations and encrypt the decrypted files with the new set of keys. Thus, if the user device 1511 is compromised or lost and an unauthorized user has access to an old set of keys, the old set of keys may not allow the unauthorized user to decrypt the encrypted graphical representations.

The processing servers 206 include a single physical computing device or multiple physical computing devices that are interconnected using one or more computing networks (not shown), where the physical computing device(s) execute computer-executable instructions for implementing the application retriever 1562, the virtual instance executor 1564, and/or other components (not shown). The storage servers 208 similarly include a single physical computing device or multiple physical computing devices that are interconnected using one or more computing networks (not shown), where the physical computing device(s) host the applications data store 1582 and/or the user data store 1584. In alternate embodiments, not shown, the applications data store 1582 and/or the user data store 1584 are located outside of the storage server(s) 208.

Figure 16A:
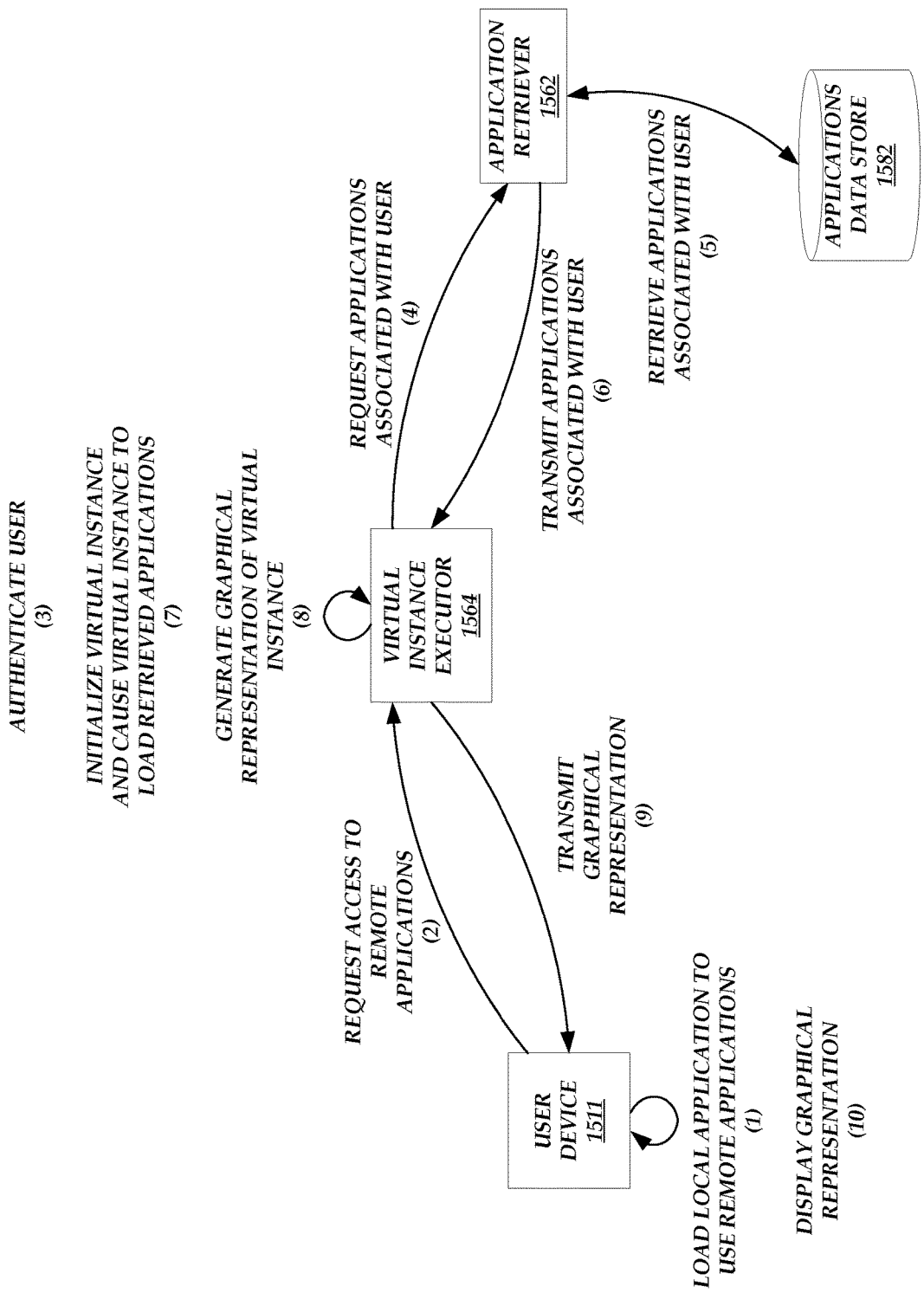
FIG. 16A is a block diagram of the environment for accessing applications operating within the multi-node environment of FIG. 1 illustrating the operations performed by the components of the environment to provide a user device 1511 access to applications running in the node 110.

FIG. 16A is a block diagram of the environment for accessing applications operating within the multi-node environment of FIG. 1 illustrating the operations performed by the components of the environment to provide a user device 1511 access to applications running in the node 110. As illustrated in FIG. 16A, the user device 1511 loads a local application (e.g., a virtual clouds application) in order to use remote applications (e.g., applications running in the node 110) at (1). For example, the user device 1511 may have several applications installed, including the local application. A user operating the user device 1511 can select an icon representing the local application (e.g., via a touch interface) to cause the user device 1511 to load the local application.

Once loaded, the local application may prompt the user to provide user credentials. The user can provide user credentials, causing the user device 1511 to request, from the virtual instance executor 1564, access to the remote applications at (2). Alternatively, the user device 1511 can send the request to another component in the node 110 (e.g., an authentication component, not shown). The virtual instance executor 1564 can authenticate the user at (3) and request the application retriever 1562 to provide application(s) associated with the user (or user device 1511) at (4).

The application retriever 1562 can query a permissions data store, not shown, to identify which applications (and/or what level of access to the applications) that the user or user device 1511 is permitted or authorized to access, and retrieve the appropriate applications from the applications data store 1582 at (5). For example, the application retriever 1562 can retrieve the source files corresponding to the applications that the user or user device 1511 is permitted to access. The application retriever 1562 can then transmit the applications (e.g., the source files) to the virtual instance executor 1564 at (6).

The virtual instance executor 1564 can initialize a virtual instance and cause the virtual instance to load the retrieved applications at (7). The initialized virtual instance may be associated with the user or user device 1511 such that no other user or user device 1511 (or virtual instance) may access the initialized virtual instance. The virtual instance can be a container or a virtual machine instance that does or does not include a container. Loading the retrieved applications may include the virtual instance storing the application source files and/or creating icons or menu items corresponding to the applications such that a user, when using the virtual instance, can locate and select a representation of an application (e.g., an icon, a menu item, etc.) to open the application.

The virtual instance executor 1564 may generate a graphical representation of the virtual instance at (8) (e.g., by running a rendering process to store pixel data in a screen buffer of the virtual instance executor 1564, storing the contents of the screen buffer, and/or converting the contents into a graphical representation), and transmit the graphical representation to the user device 1511 at (9). Reception of the graphical representation may cause the local application running on the user device 1511 to display the graphical representation at (10). For example, the local application may display the graphical representation such that the graphical representation fills the entire screen of the user device 1511, thereby causing it to appear as if the virtual instance (and any open applications running in the virtual instance) is running locally on the user device 1511.

Figure 16B:
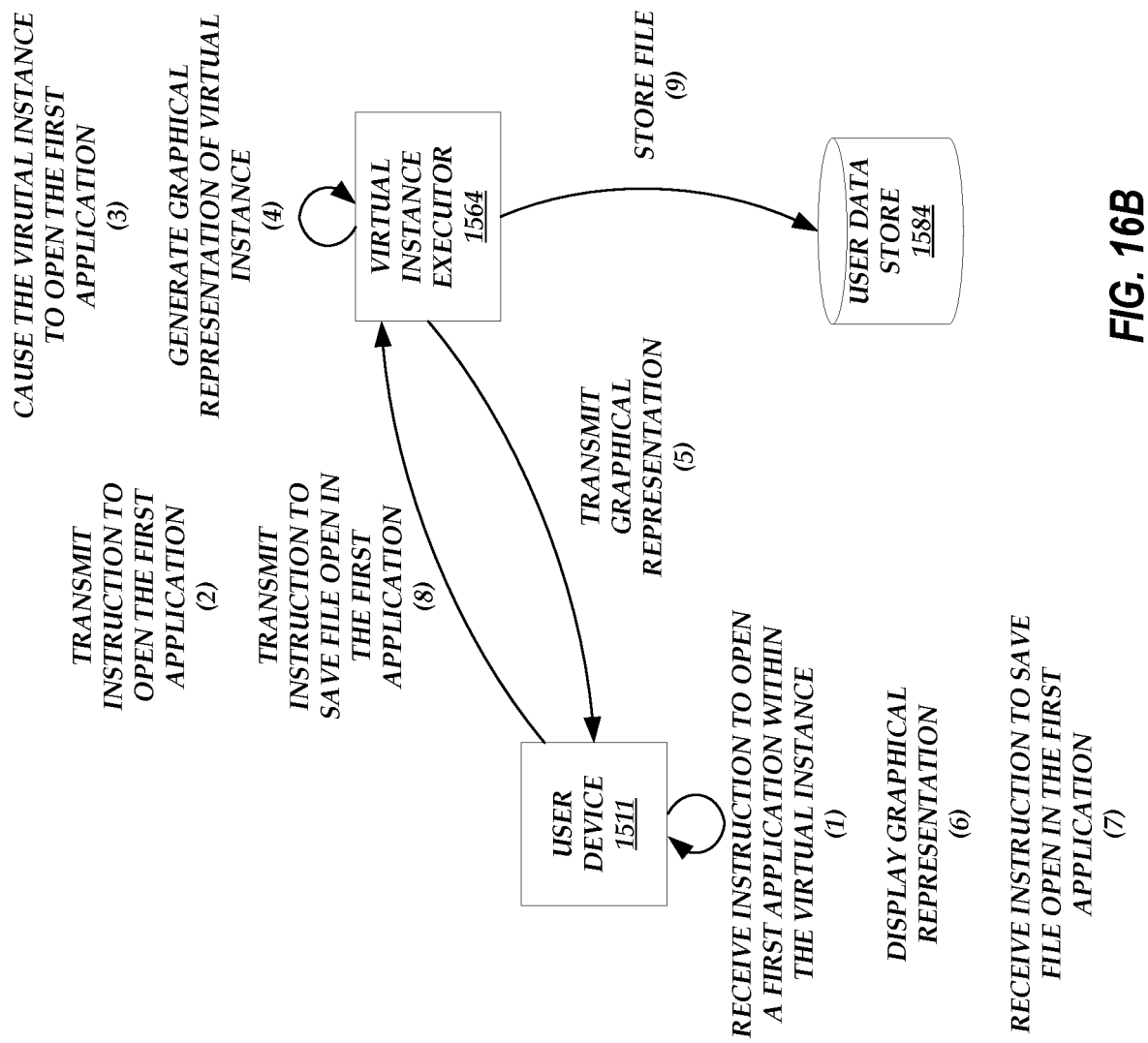
FIG. 16B is a block diagram of the environment for accessing applications operating within the multi-node environment of FIG. 1 illustrating the operations performed by the components of the environment to allow a user to interact with applications running in the node 110.

FIG. 16B is a block diagram of the environment for accessing applications operating within the multi-node environment of FIG. 1 illustrating the operations performed by the components of the environment to allow a user to interact with applications running in the node 110. As illustrated in FIG. 16B, the user device 1511 receives an instruction to open a first application within the virtual instance at (1). For example, the user device 1511 may display a graphical representation of the virtual instance in which one or more icons are displayed, where each icon represents an application (e.g., an application shortcut). The user may select one of the icons by, for example, touching or swiping on the user device's 1511 touch interface at the location where the icon for the first application is displayed. The user device 1511 may recognize the pixel coordinates of where the touch event (e.g., touch, swipe, tap, double tap, etc.) occurred, and determine that the pixel coordinates correspond to the icon of the first application (e.g., using an image map associated with the graphical representation and provided by the virtual instance executor 1564, where the image map maps particular pixel coordinates to selectable display elements).

Upon receiving the instruction, the user device 1511 can transmit an instruction to the virtual instance executor 1564 to open the first application at (2). The virtual instance executor 1564 may then cause the virtual instance to open the first application at (3). Because opening the first application is an action that may result in a graphical view of the virtual instance changing, the virtual instance executor 1564 can generate a graphical representation of the virtual instance at (4), and transmit the graphical representation to the user device 1511 at (5). The virtual instance executor 1564 can alternatively transmit information identifying a difference between the graphical representation previously generated and the graphical representation currently generated at (4) and/or a partial graphical representation corresponding to the portion of the graphical view that changed. The user device 1511 can then display the graphical representation at (6), replacing a previous graphical representation that was displayed. Optionally, the user device 1511 may delete the previous graphical representation from memory to protect further the source user data.

At a later time, the user device 1511 may receive an instruction to save a file open in the first application at (7). For example, a user may select a portion of the touch interface of the user device 1511 corresponding to a save icon in the first application. The user device 1511 may then transmit an instruction to the virtual instance executor 1564 to save the file open in the first application at (8). The virtual instance executor 1564 may then cause the virtual instance to save the file, where the virtual instance executor 1564 then stores the file in the user data store 1584 at (9). Access to the file may be restricted with permissions such that only the virtual instance that saved the file or another virtual instance associated with the user or user device 1511 is allowed to access the file from the user data store 1584. Thus, the user can create and save a file using applications running in the node 110 without any source data corresponding to the file being transmitted to the user device 1511 operated by the user.

Figure 16C:
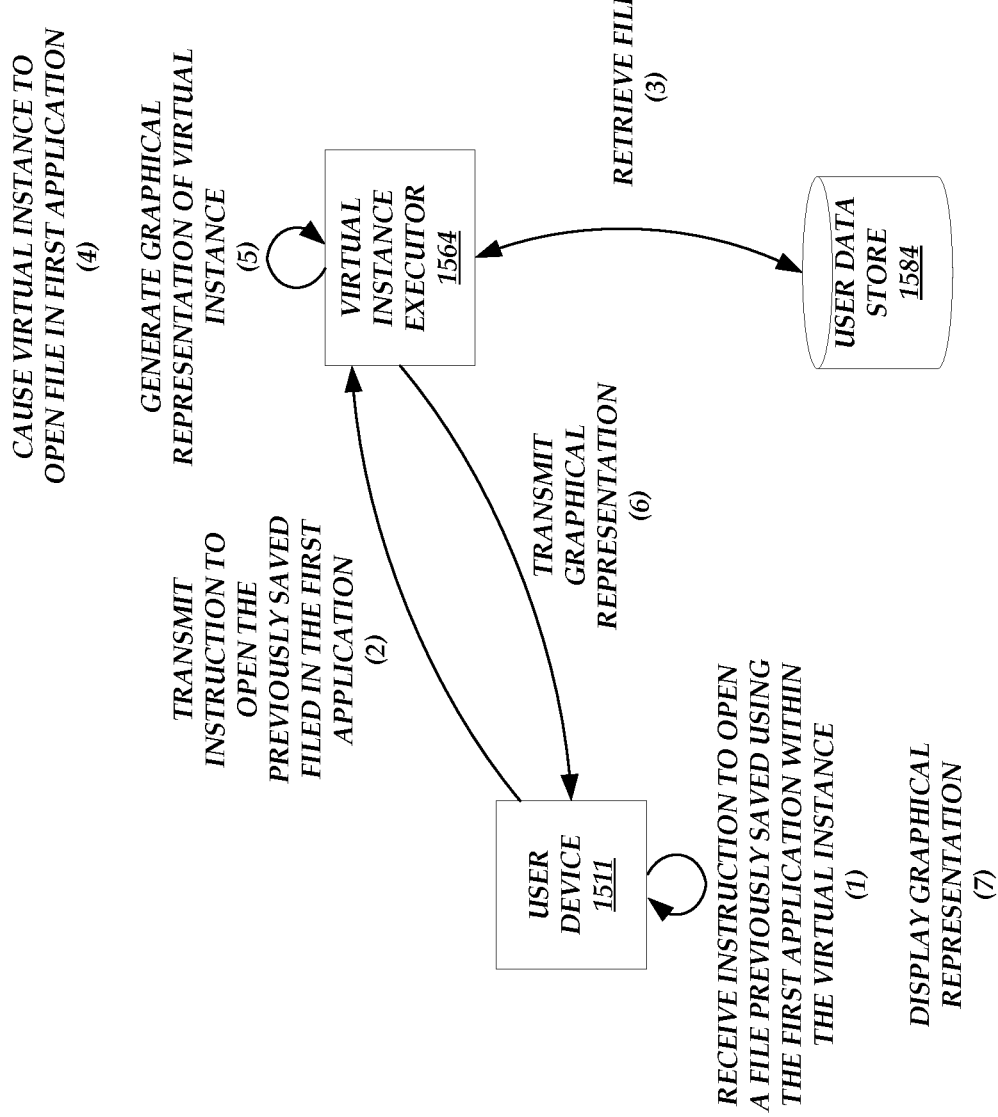
FIG. 16C is a block diagram of the environment for accessing applications operating within the multi-node environment of FIG. 1 illustrating the operations performed by the components of the environment to allow a user to access user data using applications running in the node 110.

FIG. 16C is a block diagram of the environment for accessing applications operating within the multi-node environment of FIG. 1 illustrating the operations performed by the components of the environment to allow a user to access user data using applications running in the node 110. As illustrated in FIG. 16C, the user device 1511 receives an instruction to open a file previously saved using the first application within the virtual instance at (1). For example, the user may select a portion of the touch interface of the user device 1511 corresponding to an open icon in the first application. The user device 1511 may then transmit an instruction to the virtual instance executor 1564 to open the previously saved file in the first application at (2).

The virtual instance executor 1564 may then retrieve the file from the user data store 1584 at (3), and cause the virtual instance to open the file in the first application at (4). The virtual instance executor 1564 may retrieve the file and cause the virtual instance to open the file after verifying that the virtual instance is authorized to access the file (e.g., by checking the permissions associated with the file to see if the user or user device 1511 is permitted to access the file).

Because opening the file is an action that may result in a graphical view of the virtual instance changing, the virtual instance executor 1564 can generate a graphical representation of the virtual instance at (5), and transmit the graphical representation to the user device 1511 at (6). The user device 1511 (e.g., the local application) can then display the graphical representation at (7), replacing a previous graphical representation that was displayed. Optionally, the user device 1511 (e.g., the local application) may delete the previous graphical representation from memory to protect further the source user data.

Figure 16D:
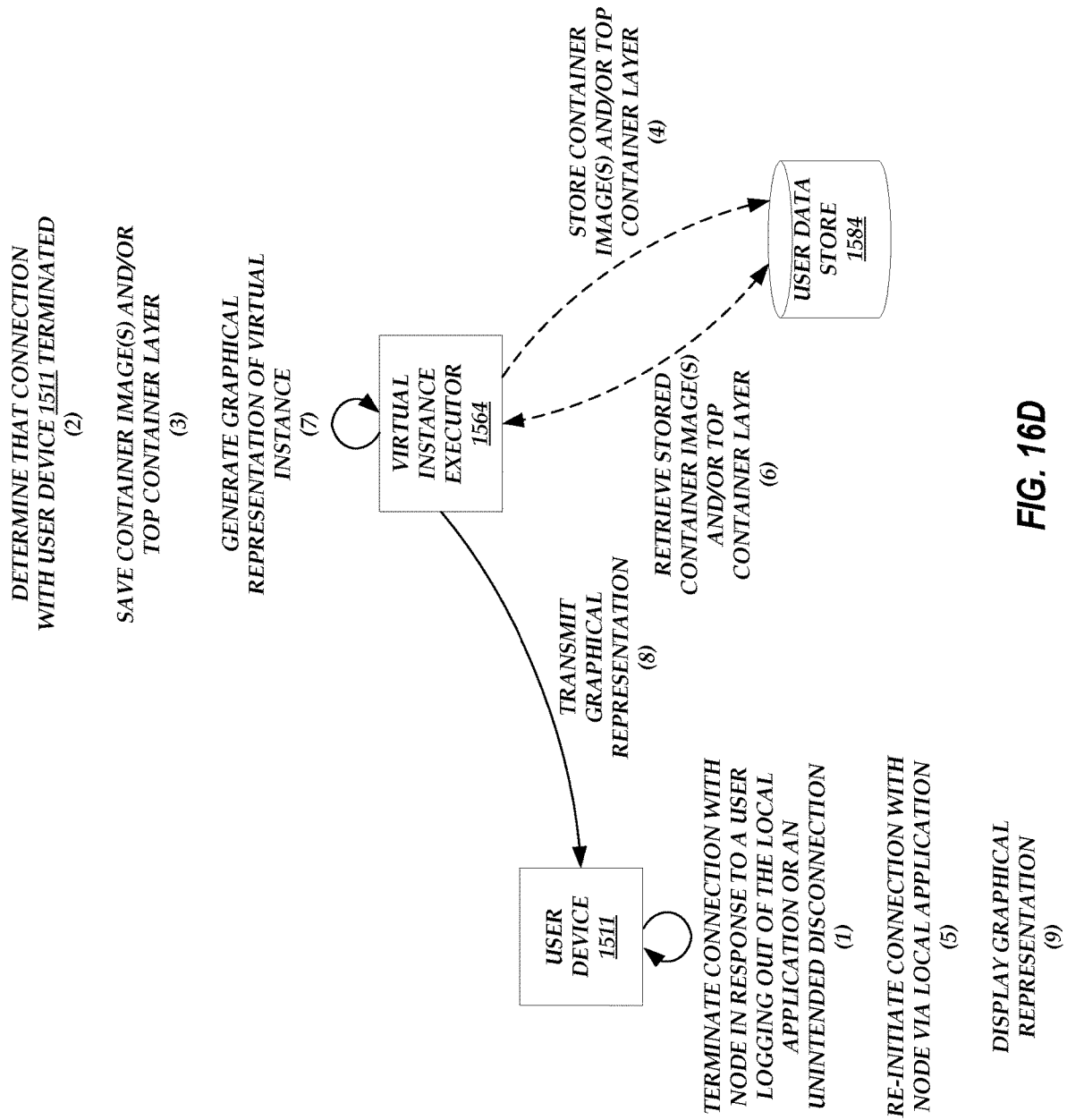
FIG. 16D is a block diagram of the environment for accessing applications operating within the multi-node environment of FIG. 1 illustrating the operations performed by the components of the environment to maintain a user's operating or access state following a disconnection.

FIG. 16D is a block diagram of the environment for accessing applications operating within the multi-node environment of FIG. 1 illustrating the operations performed by the components of the environment to maintain a user's operating or access state following a disconnection. As illustrated in FIG. 16D, the user device 1511 terminates a connection with the node 110 in response to a user logging out of the local application or an unintended disconnection (e.g., due to a poor connection, network outage, loss of signal, user device 1511 shutting off, user device 1511 timing out of authenticated session with node 110 due to inactivity, etc.) at (1).

The virtual instance executor 1564 may determine (or be notified) that connection with the user device 1511 is terminated at (2). In response, the virtual instance executor 1564 can optionally save container image(s) and/or the top container layer of the virtual instance (e.g., in embodiments in which the virtual instance is a container or is a virtual machine instance that includes a container) at (3), and store the saved container image(s) and/or top container layer in the user data store 1584 at (4). By saving the container image(s) and/or top container layer, the operating or access state of the user may be preserved. For example, information concerning display settings, states of applications (e.g., open, closed, active, inactive, etc.), position of windows, etc. may be stored in the top container layer (and/or in the container image(s)) such that if another container (or an existing container) is initialized using the container image(s) and/or top container layer, the container may be initialized with the previous operating or access state of the user (e.g., the display settings would be as set previously by the user before the disconnection, the state of the applications would be the same as before the disconnection, the position of windows would be the same as before the disconnection, etc.). In embodiments in which the virtual instance is a virtual machine instance without a container, the virtual instance executor 1564 can decline to reallocate the virtual computing resources allocated to the virtual machine instance, thereby preserving the operating or access state of the virtual machine instance.

At a later time, the user device 1511 may re-initiate a connection with the node 110 using the local application at (5). For example, the user may log back in to the node 110 using user credentials. In response (and/or in response to a user selecting to resume a previous session), the virtual instance executor 1564 can optionally retrieve the stored container image(s) and/or top container layer at (6) (e.g., in embodiments in which the virtual instance is a container or is a virtual machine instance that includes a container) and re-initialize the virtual instance.

The virtual instance executor 1564 can optionally generate a graphical representation of the virtual instance at (7). For example, because the current graphical view of the virtual instance should be the same as the graphical view of the virtual instance prior to the disconnection, the virtual instance executor 1564 may have already generated the graphical representation of the virtual instance and would not need to generate another copy. The virtual instance executor 1564 can then transmit the graphical representation to the user device 1511 at (8). The user device 1511, and specifically the local application, can then display the graphical representation at (9). Thus, the user can resume use of the applications running in the node 110 from where the user left off prior to the intentional or unintentional disconnection.

As described herein, communications between the user device 1511 and the processing server 206 may pass through the SIEM system 201 and the switch 212. However, for the purposes of simplicity, the SIEM system 201 and switch 212 are omitted from FIGS. 16A-16D.

Figure 17:
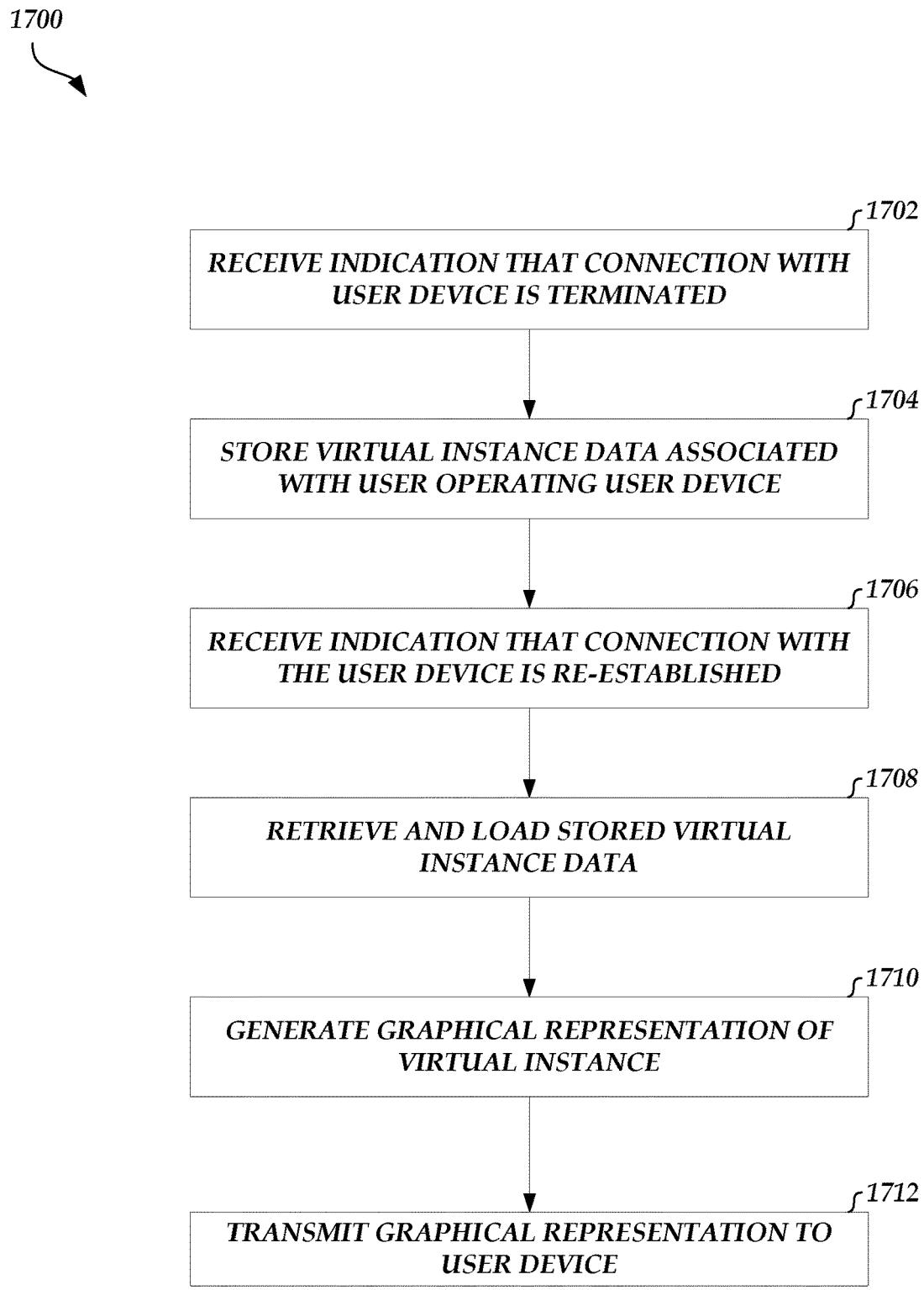
FIG. 17 illustrates a process that may be implemented by any of the nodes to maintain an operating or access state of a user after a user device is disconnected from any of the nodes 110A-N while accessing applications running in one or more of the nodes.

FIG. 17 illustrates a process 1700 that may be implemented by any of the nodes 110A-N to maintain an operating or access state of a user after a user device 1511 is disconnected from any of the nodes 110A-N while accessing applications running in one or more of the nodes 110A-N. For example, the process 1700 can be implemented by the one or more processing servers 206 (e.g., the virtual instance executor 1564). The process 1700 begins at block 1702.

At block 1702, an indication is received that a connection with a user device is terminated. For example, the connection may be terminated intentionally (e.g., the user logs out of the local application running on the user device 1511) or unintentionally (e.g., poor network conditions, signal loss, network outage, user device 1511 shuts off, user device 1511 timed out of authenticated session with node 110 due to inactivity, etc.).

At block 1704, virtual instance data associated with the user operating the user device 1511 is stored. For example, the virtual instance data may be container image(s) and/or a top container layer of a container that forms the virtual instance or of a container included within a virtual machine instance that forms the virtual instance. This operation is optional and may not occur if, for example, the virtual instance is a virtual machine instance, in which case the virtual machine instance may be maintained (e.g., the virtual computing resources allocated to the virtual machine instance may not be deallocated).

At block 1706, an indication may be received that a connection with the user device is re-established. For example, the user may log back into the node 110 using the local application running on the user device.

At block 1708, the stored virtual instance data is retrieved and loaded. For example, the virtual instance executor 1564 may initialize a new container or modify an existing container using the retrieved container image(s) and/or top container layer. This operation is optional and may not occur if, for example, the virtual instance is a virtual machine instance, in which case the virtual machine instance is already operational.

At block 1710, a graphical representation of the virtual instance is generated. This operation is optional and may not occur if, for example, the virtual instance executor 1564 previously generated the graphical representation prior to the user device disconnecting from the node 110.

At block 1712, the graphical representation is transmitted to the user device. The user device can then display the graphical representation, and it will appear to the user as if the user is resuming use of the virtualized environment provided by the virtual instance in the operating or access state that was present prior to the disconnection.

SDN-DTN-IoT

Figure 18:
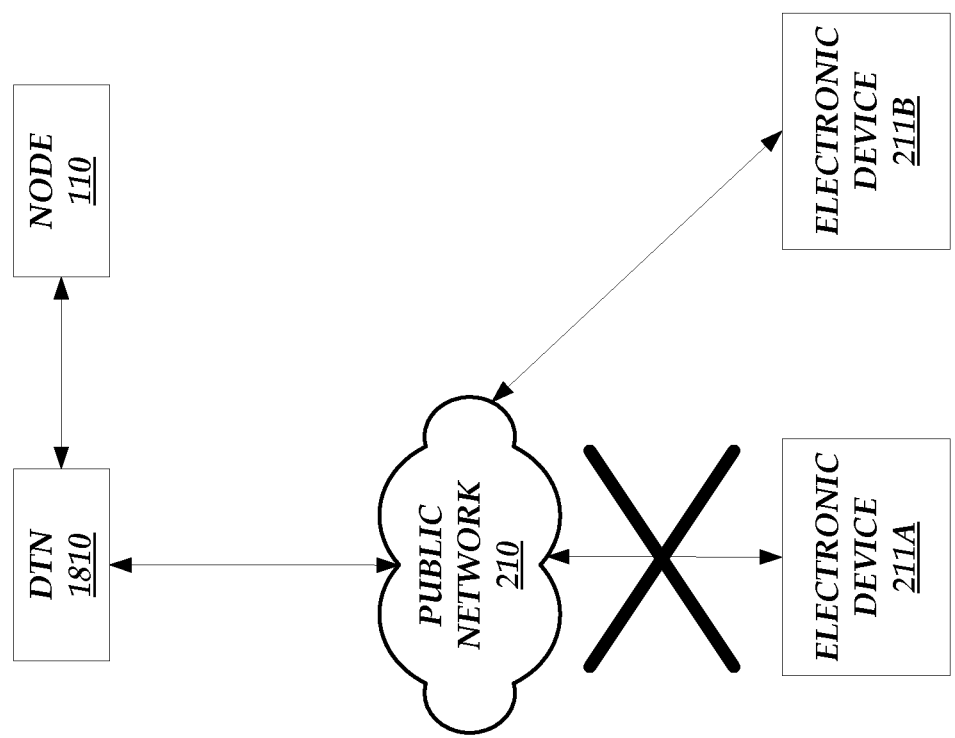
FIG. 18 illustrates a delayed/disruption tolerant network (DTN) architecture that uses software-defined network (SDN) policies to manage IoT data during network disruption.

FIG. 18 illustrates a delayed/disruption tolerant network (DTN) architecture that uses software-defined network (SDN) policies to manage IoT data during network disruptions. The DTN architecture described herein may be implemented within the multi-node environment of FIG. 1. For example, IoT devices, such as electronic devices 211A-B illustrated in FIG. 18, generally require a network to operate. This operation includes the IoT devices sensing parameters, gathering data, and/or transmitting information to a collection depository (e.g., a network-accessible data store) via a network connection. Not all IoT device(s), however, may be connected to a network at all times. For example, electronic device 211B may be connected to the public network 210 (and/or cellular network 220), but electronic device 211A may not be connected to the network 210 (and/or the cellular network 220) (e.g., electronic device 211A may have previously been connected to the network 210, but recently lost a connection to the network 210). Because some IoT devices, such as the electronic device 211A, may temporarily be disconnected from a network, the integrity of the information gathered by the IoT device(s) may be questioned. In some cases, the IoT device(s) may gather information at the time that the IoT device(s) is disconnected from the network, and connection to a network may be an important component in validating the integrity of the gathered data.

Accordingly, the nodes 110A-N may implement a secure SDN policy via a DTN 1810. The nodes 110A-N may represent a secure data platform (OSDP) as a foundation for an IoT device (e.g., electronic devices 211, 311, 411, 1111, and/or 1211) to operate. The SDN policy may operate at Layers 4 and/or 5 (e.g., of the open systems interconnection (OSI) model).

As an illustrative example, the DTN 1810 may be an edge network router (e.g., a CISCO router) that implements DTN protocols and serves as an interface between IoT devices (e.g., the electronic devices 211A and 211B) and the nodes 110A-N. The DTN 1810 may support "store-forward" transmissions, where the DTN 1810 instructs the electronic devices 211A and 211B to store gathered data when the electronic devices 211A and 211B are disconnected from the public network 210 (and/or the cellular network 220) such that the gathered data can be transmitted by the electronic devices 211A and 211B to the node 110 via the DTN 1810 once the electronic devices 211A and 211B establish a connection with the public network 210 (and/or cellular network 220). The DTN 1810 may instruct the electronic devices 211A and 211B to temporary store the gathered data (e.g., the DTN 1810 may instruct the electronic devices 211A and 211B to delete the data once the transmission via a network 210 and/or 220 is complete).

Figure 19:
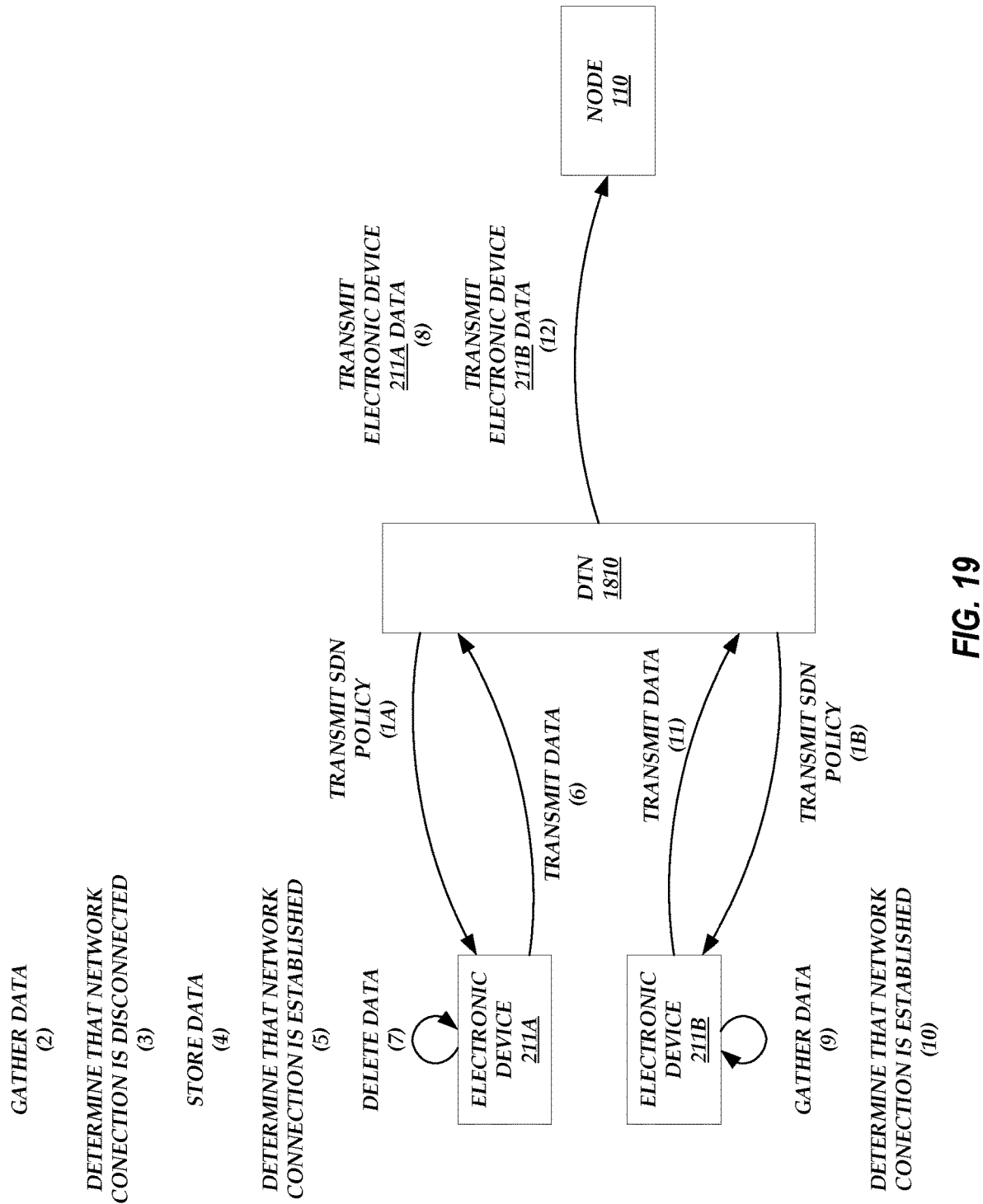
FIG. 19 is a block diagram of the DTN architecture illustrating the operations performed by the components in the architecture to gather and transmit data according to SDN policies.

FIG. 19 is a block diagram of the DTN architecture illustrating the operations performed by the components in the architecture to gather and transmit data according to SDN policies. As illustrated in FIG. 19, the DTN 1810 transmits an SDN policy to the electronic device 211A at (1A) and an SDN policy to the electronic device 211B at (1B). The DTN 1810 may transmit the SDN policy to each electronic device 211A and 211B and/or other electronic devices when such electronic devices 211A-211B are connected to a network, such as the public network 210 and/or the cellular network 220. The SDN policy may include instructions that cause the electronic device 211A-211B to temporarily store gathered or measured data when a network connection is unavailable, transmit the gathered data to the DTN 1810 when a network connection becomes available, and/or delete the gathered data once the data is transmitted to the DN 1810.

At a later time, the electronic device 211A may gather data at (2). For example, the electronic device 211A may measure or obtain data using an integrated sensor (e.g., temperature data, humidity data, images, video, etc.). The electronic device 211A may intend to transmit the gathered data to the node 110 via the DTN 1810. However, the electronic device 211A may determine that a network connection is disconnected at (3). For example, the electronic device 211A may have previously been connected to the public network 210, but is no longer connected to the public network 210 (and/or any other network). Thus, the electronic device 211A stores the gathered data at (4) per the SDN policy.

In the future, the electronic device 211A may determine that a network connection is established at (5). For example, the electronic device 211A may re-connect to the public network 210. Thus, the electronic device 211A transmits the gathered data to the DTN 1810 at (6), and then deletes the gathered data from local memory at (7). The DTN 1810 may then transmit the data gathered by the electronic device 211A to the node 110 at (8).

The electronic device 211B may also gather data at (9). However, unlike the electronic device 211A, the electronic device 211B may determine that a network connection is established at (10). For example, the electronic device 211B may determine that a connection to the public network 210 is available. Thus, the electronic device 211B may not temporarily store the gathered data. Rather, the electronic device 211B may transmit the gathered data to the DTN 1810 at (11), and the DTN 1810 may transmit the data gathered by the electronic device 211B to the node 110 at (12).

Figure 20:
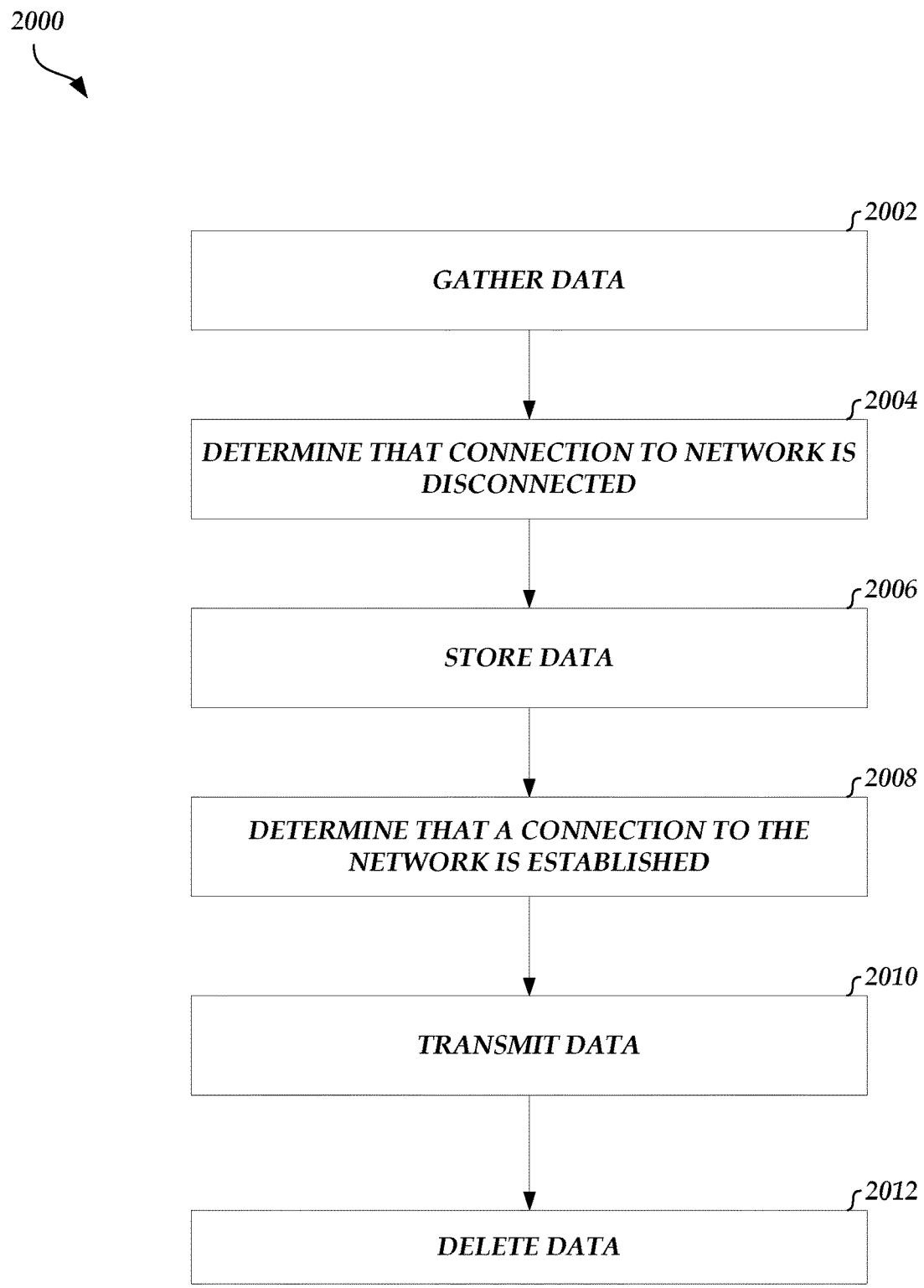
FIG. 20 illustrates a process that may be implemented by any of the electronic devices of FIGS. 2A-2B, 3A-3C, 4, 11, and/or 12A-12C to gather and transmit data according to an SDN policy.

FIG. 20 illustrates a process 2000 that may be implemented by any of the electronic devices 211, 311, 411, 1111, and/or 1211 to gather and transmit data according to an SDN policy. For example, the process 2000 can be implemented by the electronic device 211B of FIG. 18. The process 2000 begins at block 2002.

At block 2002, data is gathered. For example, the electronic device 211B may measure or obtain data using an integrated sensor (e.g., temperature data, humidity data, images, video, etc.).

At block 2004, it is determined that a connection to a network is disconnected. For example, the electronic device 211B may have previously been connected to the public network 210, but network conditions or a poor connection may have resulted in the electronic device 211B no longer being connected to the public network 210 and/or to any other network (e.g., a network connection is unavailable).

At block 2006, the data is stored. For example, the electronic device 211B may have previously received an SDN policy from the DTN 1810, which causes the electronic device 211B to store gathered data when a network connection is unavailable.

At block 2008, it is determined that a connection to the network is established. For example, during the period in which the electronic device 211B was disconnected from the public network 210, the electronic device 211B may have been attempting to re-connect with the public network 210, and the re-connection attempt has now become successful.

At block 2010, the data is transmitted. For example, the electronic device 211B may transmit the gathered data to the DTN 1810, and the DTN 1810 may forward the data to one or more of the nodes 110A-N.

At block 2012, the data is deleted. For example, the electronic device 211B may deleted the stored data from local memory now that the gathered data has been transmitted to the node 110 for storage.

Various security and data transmission features described herein can be incorporated by the electronic devices 211A and 211B and/or the DTN 1810 to ensure the security of the gathered data and the transmission thereof.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for executing remote applications, the system comprising:
    an applications data store; and
    a hardware processor in communication with the applications data store and configured with computer-executable instructions, wherein the computer-executable instructions, when executed, cause the hardware processor to:
        process a request to access a first application received from a local application running on a user device via a network;
        retrieve first source files for the first application from the applications data store;
        initialize a container formed from a container image and a top container layer, wherein the container shares an operating system with other containers initialized by the hardware processor and is isolated from the other containers;
        cause the container to load the first application using the first source files;
        generate a graphical representation of the container;
        encrypt the graphical representation of the container using a first key;
        transmit the encrypted graphical representation of the container to the user device, wherein reception of the encrypted graphical representation of the container causes the local application running on the user device to decrypt the encrypted graphical representation of the container, display the decrypted version of the graphical representation of the container such that the first application that is loaded by the container appears to be available locally on the user device, and encrypt the decrypted version of the graphical representation of the container using the first key for storage;

encrypt a second graphical representation of the container using a second key different than the first key; and transmit the encrypted second graphical representation of the container to the user device, wherein reception of the encrypted second graphical representation of the container causes the local application running on the user device to decrypt the encrypted second graphical representation of the container, display the decrypted version of the second graphical representation of the container, and encrypt the decrypted version of the second graphical representation of the container using the second key for storage.

2. The system of claim 1, wherein the container is initialized within a virtual machine instance.

3. The system of claim 1, wherein the computer-executable instructions, when executed, further cause the hardware processor to:

process an instruction to open the first application received from the local application;

cause the container to open the first application;

generate the second graphical representation of the container; and transmit the encrypted second graphical representation of the container, wherein reception of the encrypted second graphical representation of the container causes the local application to display the decrypted version of the second graphical representation of the container in place of the decrypted version of the graphical representation of the container.

4. The system of claim 3, wherein the computer-executable instructions, when executed, further cause the hardware processor to:

determine that a connection with the user device is terminated; and store at least one of the container image or the top container layer corresponding to the container in a user data store in response to the determination that the connection with the user device is terminated to preserve an access state of a user operating the user device.

5. The system of claim 4, wherein the computer-executable instructions, when executed, further cause the hardware processor to:

determine that the connection with the user device is established;

retrieve at least one of the container image or the top container layer from the user data store;

initialize the container using at least one of the container image or the top container layer such that the container is initialized with the access state of the user;

generate a third graphical representation of the container; and transmit the third graphical representation of the container to the user device, wherein reception of the third graphical representation of the container causes the local application to display the third graphical representation of the container.

6. The system of claim 3, wherein reception of the second graphical representation of the container further causes the local application to delete the encrypted graphical representation of the container.

7. The system of claim 1, wherein the computer-executable instructions, when executed, further cause the hardware processor to determine that the user device is authorized to access the first application.

8. The system of claim 1, wherein the computer-executable instructions, when executed, further cause the hardware processor to cause the container to load the first application at an access level associated with the user device.

9. A computer-implemented method for executing remote applications, the computer-implemented method comprising:

as performed by a computing system comprising a processor and accessible via a network, receiving, from a local application running on a user device via the network, a request to access a first application;

retrieving first source files for the first application;

initializing a container formed from a container image and a top container layer, wherein the container shares an operating system with other containers initialized by the computing system and is isolated from the other containers;

causing the container to load the first application using the first source files;

generating a graphical representation of the container;

encrypting the graphical representation of the container using a first key;

transmitting the encrypted graphical representation of the container to the user device, wherein reception of the encrypted graphical representation of the container causes the local application running on the user device to decrypt the encrypted graphical representation of the container, display the decrypted version of the graphical representation of the container such that the first application that is loaded by the container appears to be available locally on the user device, and encrypt the decrypted version of the graphical representation of the container using the first key for storage;

encrypting a second graphical representation of the container using a second key different than the first key; and transmitting the encrypted second graphical representation of the container to the user device, wherein reception of the encrypted second graphical representation of the container causes the local application running on the user device to decrypt the encrypted second graphical representation of the container, display the decrypted version of the second graphical representation of the container, and encrypt the decrypted version of the second graphical representation of the container using the second key for storage.

10. The computer-implemented method of claim 9, wherein the container is initialized within a virtual machine instance.

11. The computer-implemented method of claim 9, further comprising:

receiving, from the local application, an instruction to open the first application;

causing the container to open the first application;

generating the second graphical representation of the container; and transmitting the encrypted second graphical representation of the container, wherein reception of the encrypted second graphical representation of the container causes the local application to display the decrypted version of the second graphical representation of the container in place of the decrypted version of the graphical representation of the container.

12. The computer-implemented method of claim 11, wherein the computer-implemented method further comprises:
   determining that a connection with the user device is terminated; and
   storing at least one of the container image or the top container layer corresponding to the container in a user data store in response to the determination that the connection with the user device is terminated to preserve an access state of a user operating the user device.

13. The computer-implemented method of claim 12, further comprising:
   determining that the connection with the user device is established;
   retrieving at least one of the container image or the top container layer from the user data store;
   initializing the container using at least one of the container image or the top container layer such that the container is initialized with the access state of the user;
   generating a third graphical representation of the container; and
   transmitting the third graphical representation of the container to the user device, wherein reception of the third graphical representation of the container causes the local application to display the third graphical representation of the container.

14. The computer-implemented method of claim 11, wherein reception of the second graphical representation of the container further causes the local application to delete the graphical representation of the container.

15. Non-transitory, computer-readable storage media comprising computer-executable instructions for executing remote applications, wherein the computer-executable instructions, when executed by a computer system accessible via a network, cause the computer system to perform operations comprising:
   processing a request to access a first application received from the user device via the network;
   retrieving first source files for the first application;
   initializing a container formed from a container image and a top container layer, wherein the top container layer stores changes to the container, and wherein the container shares an operating system with other containers initialized by the computer system and is isolated from the other containers;
   causing the container to load the first application using the first source files;
   generating a graphical representation of the container;
   encrypting the graphical representation of the container using a first key;
   transmitting the encrypted graphical representation of the container to the user device, wherein reception of the encrypted graphical representation of the container causes the user device to decrypt the encrypted graphical representation of the container, display the decrypted version of the graphical representation of the container, and encrypt the decrypted version of the graphical representation of the container using the first key for storage;
   encrypting a second graphical representation of the container using a second key different than the first key; and
   transmitting the encrypted second graphical representation of the container to the user device, wherein reception of the encrypted second graphical representation of the container causes the local application running on the user device to decrypt the encrypted second graphical representation of the container, display the decrypted version of the second graphical representation of the container, and encrypt the decrypted version of the second graphical representation of the container using the second key for storage.

16. The non-transitory, computer-readable storage media of claim 15, wherein the computer-executable instructions, when executed, further cause the computer system to perform operations comprising:
   processing an instruction to open the first application received from the user device;
   causing the container to open the first application;
   generating the second graphical representation of the container; and
   transmitting the encrypted second graphical representation of the container, wherein reception of the encrypted second graphical representation of the container causes the user device to display the decrypted version of the second graphical representation of the container in place of the decrypted version of the graphical representation of the container.

17. The non-transitory, computer-readable storage media of claim 16, wherein the computer-executable instructions, when executed, further cause the computer system to perform operations comprising:
   determining that a connection with the user device is terminated; and
   storing at least one of the container image or the top container layer corresponding to the container in a user data store in response to the determination that the connection with the user device is terminated to preserve an access state of a user operating the user device.

18. The non-transitory, computer-readable storage media of claim 17, wherein the computer-executable instructions, when executed, further cause the computer system to perform operations comprising:
   determining that the connection with the user device is established;
   retrieving at least one of the container image or the top container layer from the user data store;
   initializing the container using at least one of the container image or the top container layer such that the container is initialized with the access state of the user;
   generating a third graphical representation of the container; and
   transmitting the third graphical representation of the container to the user device, wherein reception of the third graphical representation of the container causes the local application to display the third graphical representation of the container.

* * * * *